United States Patent [19]

Schulz et al.

[11] Patent Number: 4,860,219

[45] Date of Patent: Aug. 22, 1989

[54] HIGH SPEED PRINTER

[75] Inventors: Daniel R. Schulz, Crystal Beach; Benton B. Warren, Clearwater; Michael K. Reed, Largo, all of Fla.

[73] Assignee: National Business Systems, Inc., Mississauga, Canada

[21] Appl. No.: 19,222

[22] Filed: Feb. 26, 1987

[51] Int. Cl.[4] .......................................... G06F 15/626
[52] U.S. Cl. .................... 364/519; 340/727; 364/518; 101/131
[58] Field of Search ............................. 364/518–523; 382/44–46; 355/20, 23, 24, 40; 101/131; 340/727

[56] References Cited

U.S. PATENT DOCUMENTS

| | | | |
|---|---|---|---|
| 4,005,652 | 2/1977 | Petry | 101/131 |
| 4,225,929 | 9/1980 | Ikeda | 364/521 |
| 4,271,476 | 6/1981 | Lotspiech | 364/515 |
| 4,312,045 | 1/1982 | Jean et al. | 364/900 |
| 4,452,136 | 6/1984 | Boynton et al. | 101/93.05 |
| 4,467,443 | 8/1984 | Shima | 364/900 |
| 4,542,377 | 9/1985 | Hagen et al. | 340/727 |
| 4,545,069 | 10/1985 | Kermisch | 382/46 |
| 4,554,638 | 11/1985 | Iida | 364/521 |
| 4,555,763 | 11/1985 | Dahme | 364/521 |
| 4,560,980 | 12/1985 | Tillich | 340/727 |
| 4,570,158 | 2/1986 | Bleich et al. | 340/727 |
| 4,636,783 | 1/1987 | Omachi | 340/727 |
| 4,675,833 | 6/1987 | Cheek et al. | 364/523 |
| 4,699,365 | 10/1987 | Smith et al. | 355/23 X |
| 4,722,064 | 1/1988 | Suzuki | 364/518 |

Primary Examiner—Gary V. Harkcom
Assistant Examiner—H. R. Herndon
Attorney, Agent, or Firm—Antonelli, Terry & Wands

[57] ABSTRACT

An electronic printing system for printing digitally stored images which achieves extremely high throughputs as a consequence of control of the addressing of various memory sections being allocated to hardware assist units which operate independently of the processing unit. The processing unit rotates words retrieved from a font storage memory with respect to word boundaries in a page memory of a raster storage unit at high speed to achieve proper positioning of the words for storage in the page memory. The system further has a readout system for reversing the order of readout of the significance of pixels of words stored in both the font storage memory and from the combined output of the raster storage unit and the raster form storage unit which cuts in half the necessary storage requirements of character orientations in the font storage unit for duplex printing and printing on either side of a page for pages which have been punched for storage in ring binders. Finally, an addressing unit is provided for the raster storage unit which generates all addresses for storage of words in the page memories independently of the operation of the processing unit with the exception of the first word of the first character which is generated by the processing unit.

49 Claims, 92 Drawing Sheets

Microfiche Appendix Included
(873 Microfiche, 9 Pages)

PORTRAIT

LANDSCAPE

PORTRAIT DUPLEX

LANDSCAPE DUPLEX

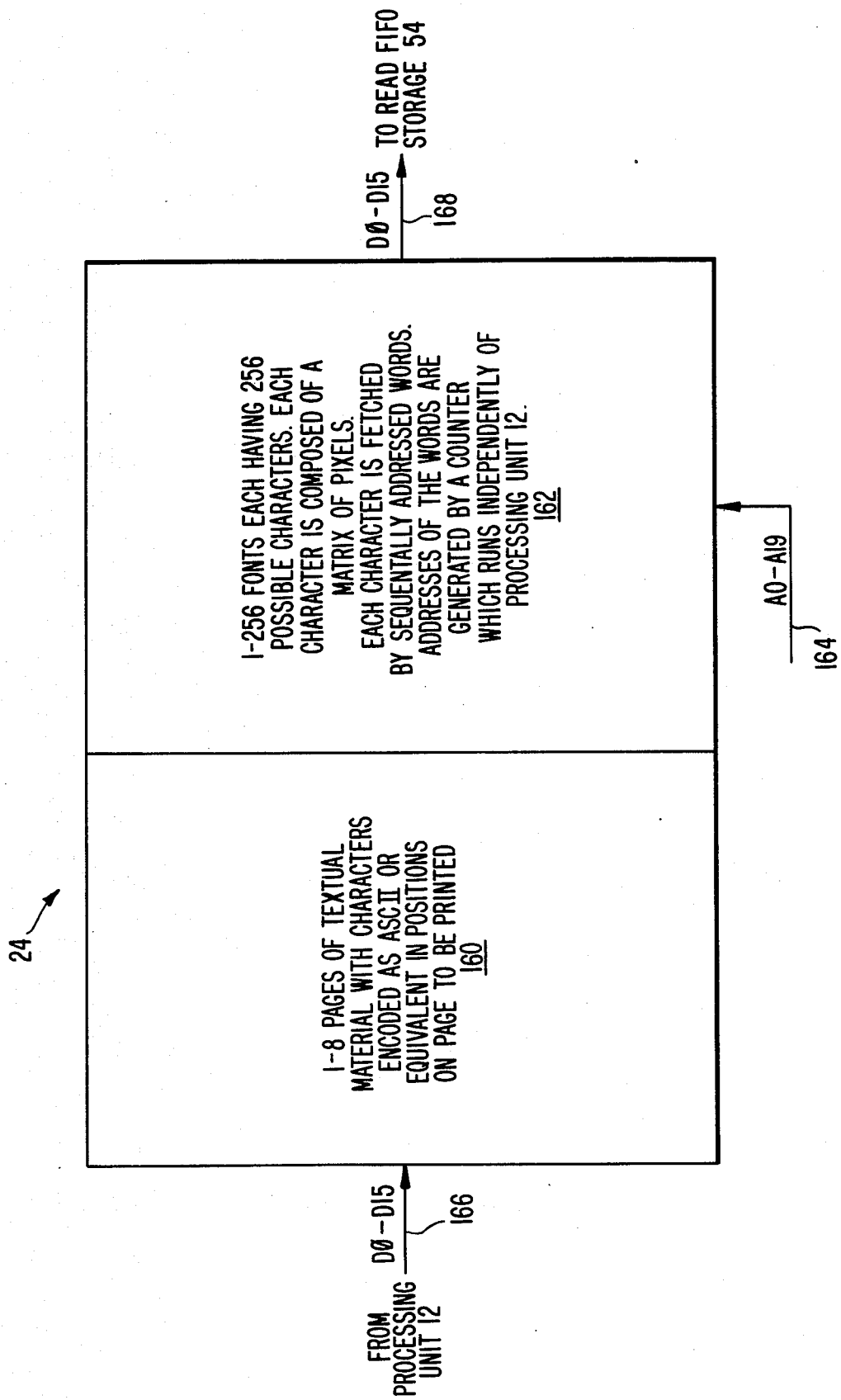

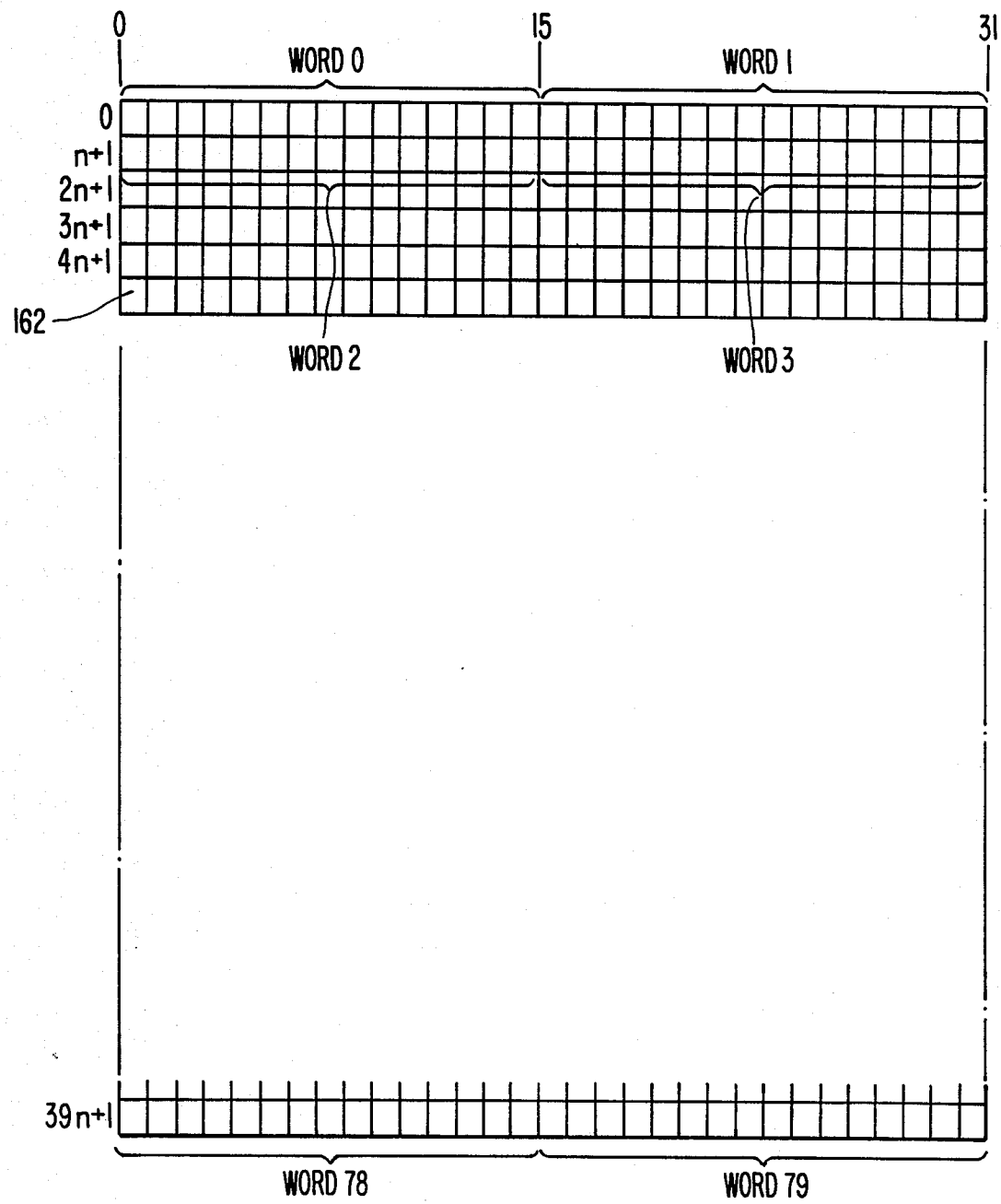

FIG. 11.

A: bits D15...D0 = [15,14,13,12,11,10,9,8,7,6,5,4,3,2,1,0]
SYSTEM POSITION – WORD FROM FONT MEMORY 162

B: bits D15...D0 = [15,14,13,12,11,10,9,8,7,6,5,4,3,2,1,0]
SYSTEM POSITION – WORD STORED IN FIFO STORAGE 54

C: bits D31...D16...D11 D0 = [4,3,2,1,0 | 15,14,13,12,11,10,9,8,7,6,5,4,3,2,1,0]
REMAINDER OF WORD FROM PREVIOUS PROCESSING CYCLE OF PROCESSING UNIT | CURRENT WORD
SYSTEM POSITION – ALU CONTENTS AFTER ROTATION AND MERGER

D: bits D31...D16...D11 D0 = [4,3,2,1,0 | 15,14,13,12,11,10,9,8,7,6,5 | 4,3,2,1,0]
WORD TO BE TRANSMITTED TO FIFO STORAGE 98 | REMAINDER TO BE MERGED WITH NEXT WORD
SYSTEM POSITION – ALU CONTENTS AFTER ROTATION AND MERGER

E: bits D15...D0 = [4,3,2,1,0,15,14,13,12,11,10,9,8,7,6,5]
SYSTEM POSITION – FIFO STORAGE 98 CONTENTS

F: D4...D0 | D15...D0 | D15...D0 = [9,8,7,6,5 | 4,3,2,1,0,15,14,13,12,11,10,9,8,7,6,5 | _ _ _ _ _]
PREVIOUS WORD | NEW WORD | NEXT WORD TO BE STORED
SYSTEM POSITION – CONTENTS OF PAGE MEMORY

EXPANDED MEMORY MAP OF LINES
OF TEXT OF PAGE MEMORY

FIG. 13.
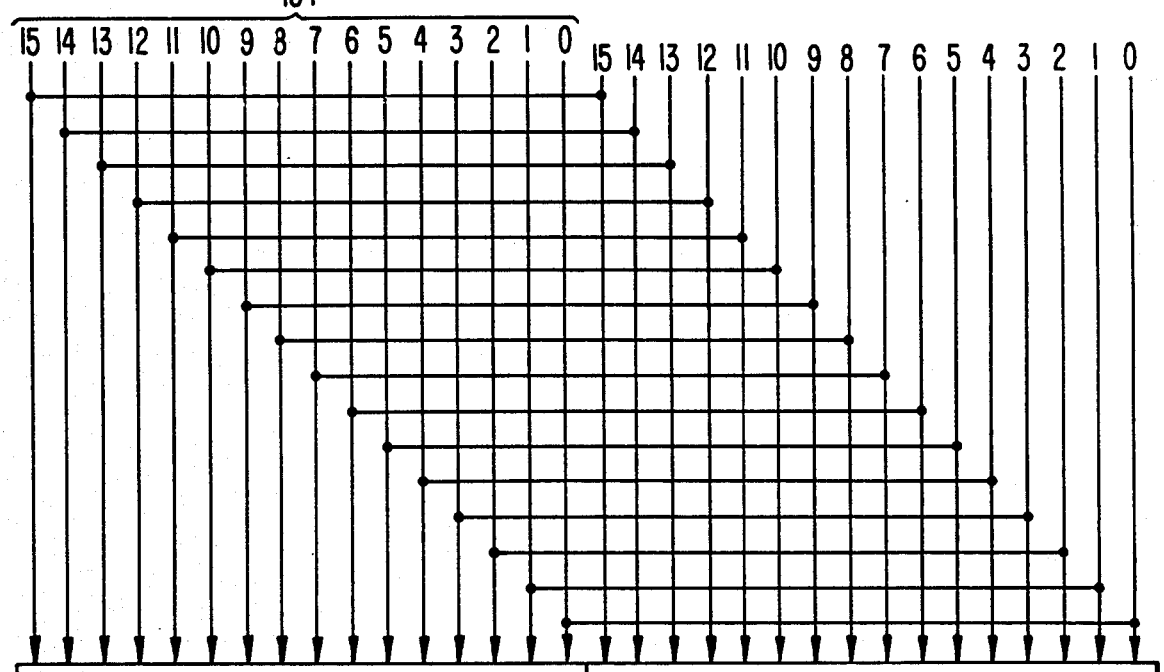
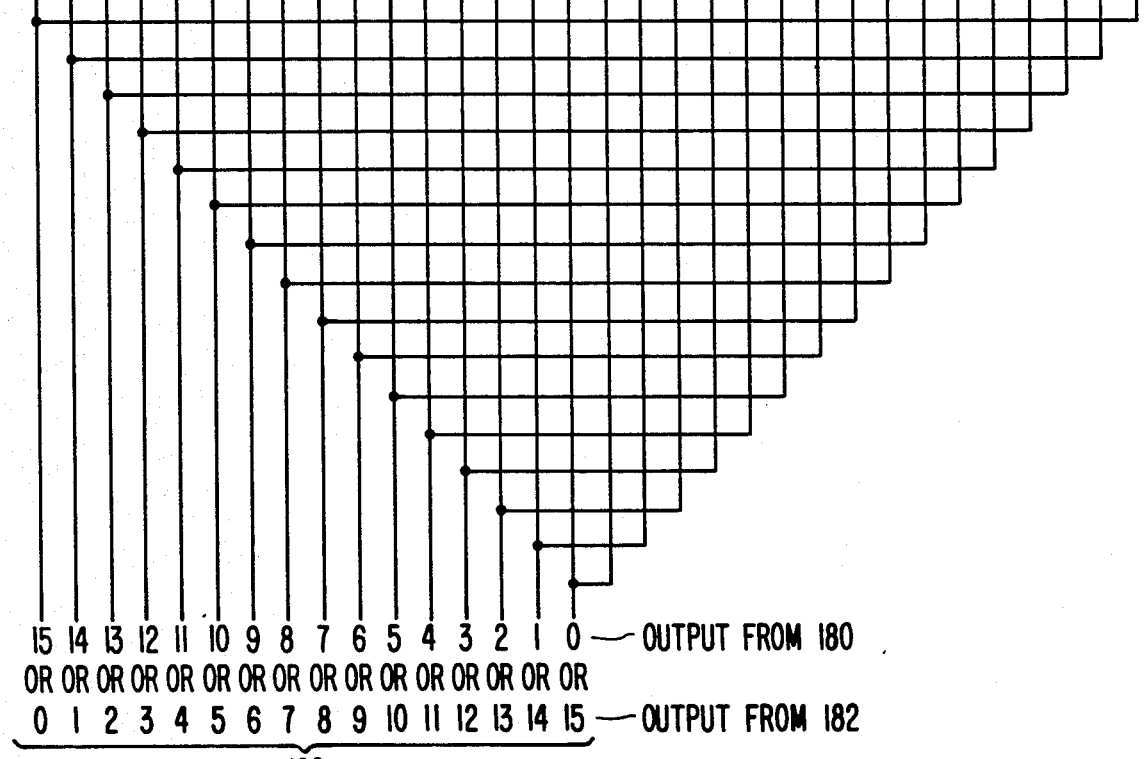

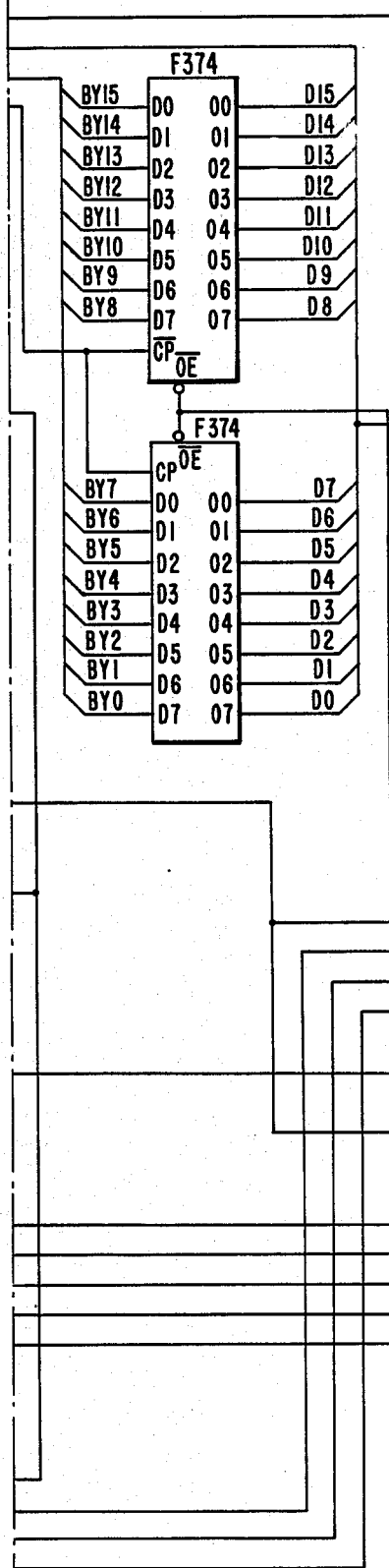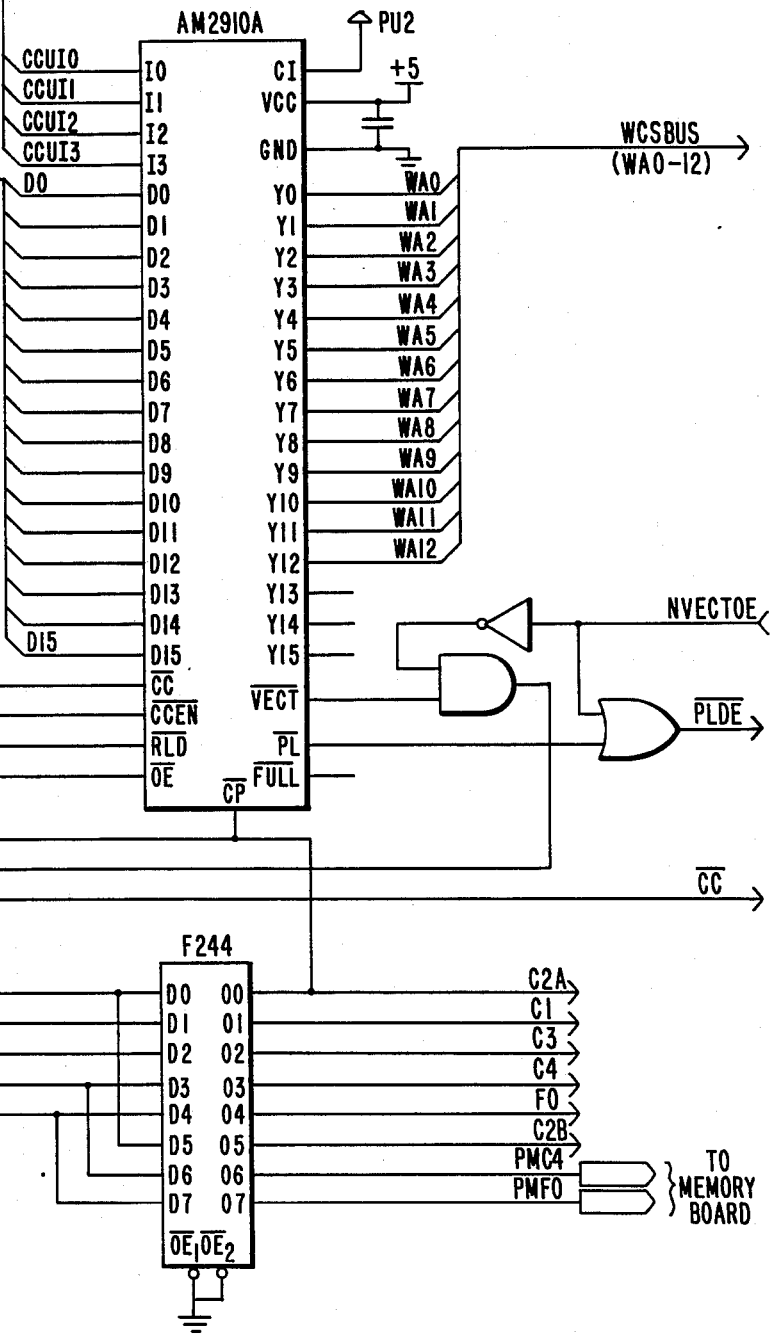
FIG. 28B.

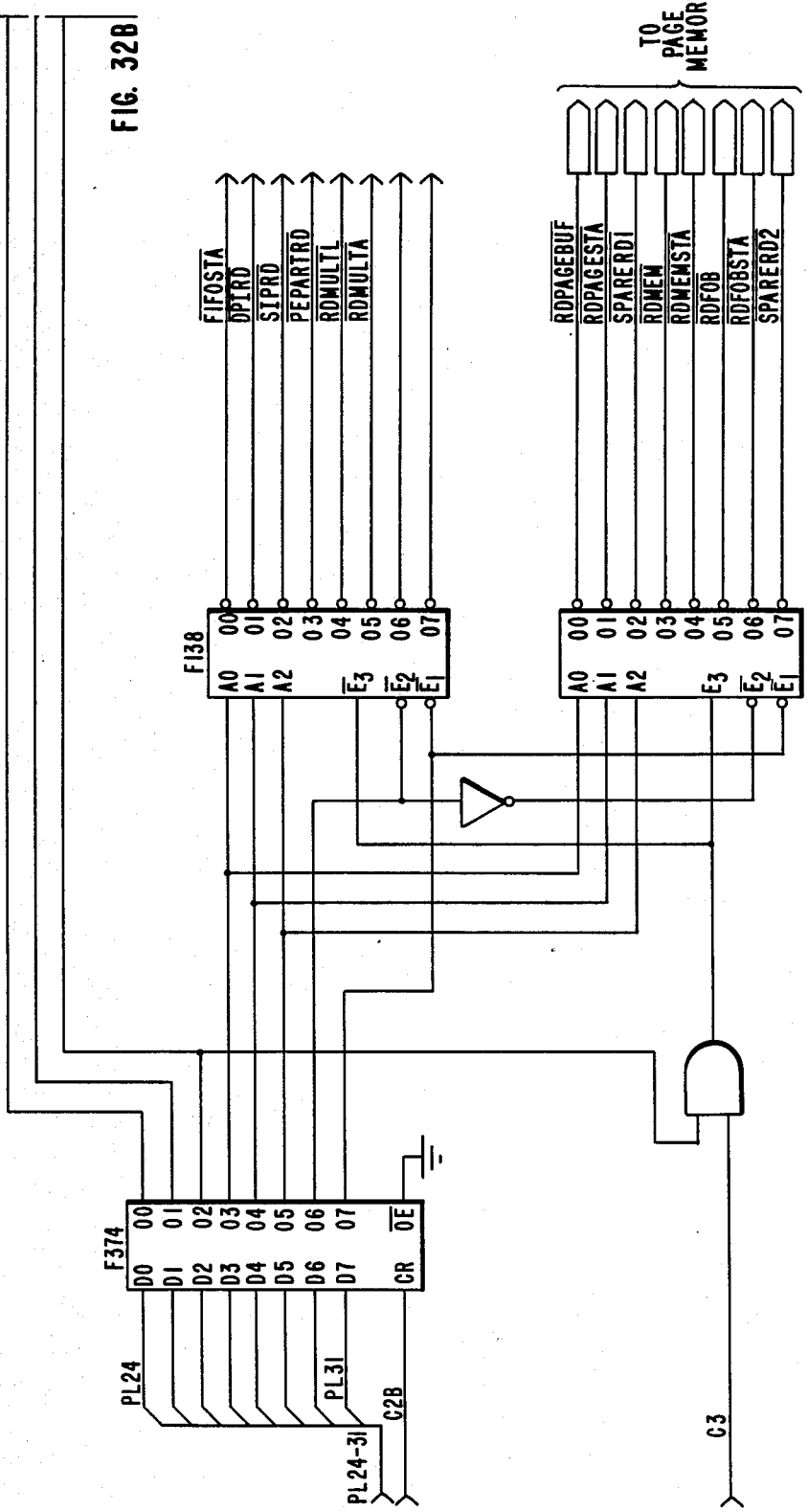

FIG. 37B.
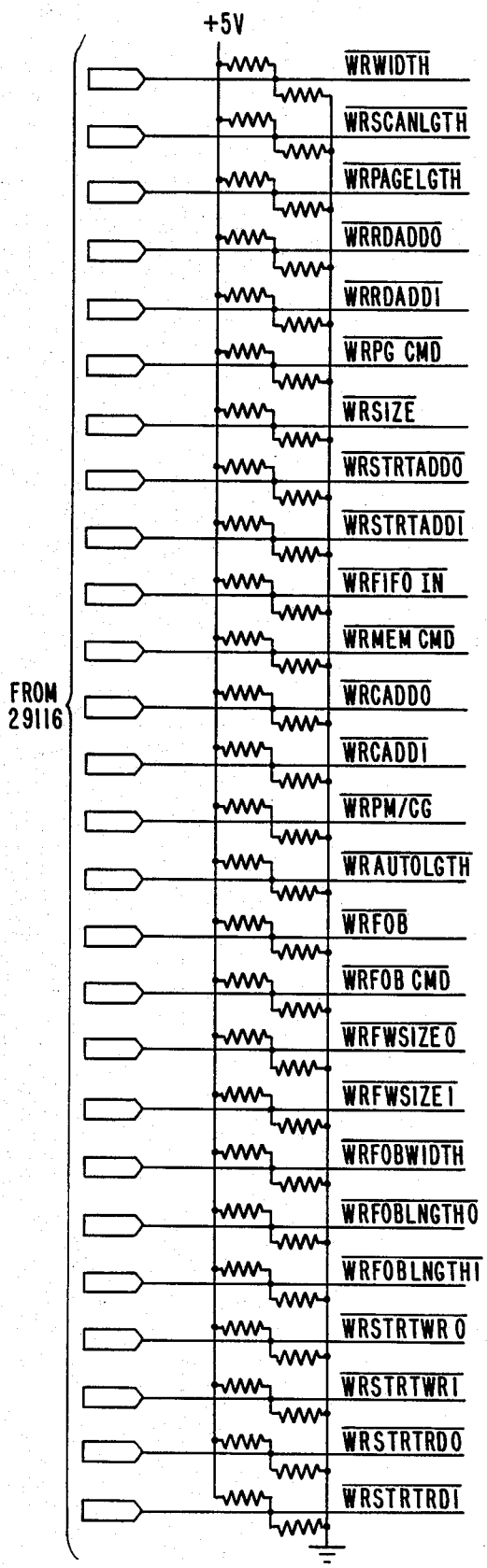
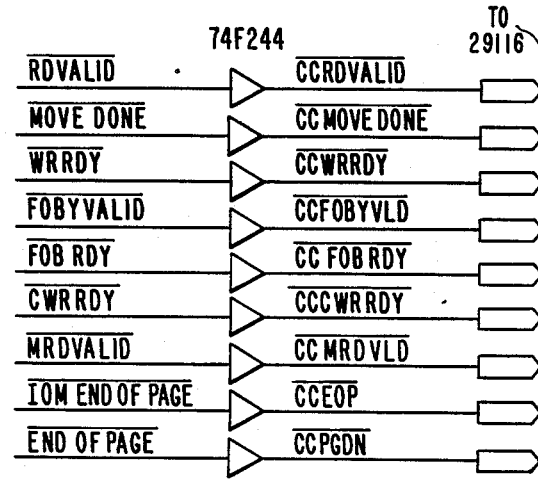
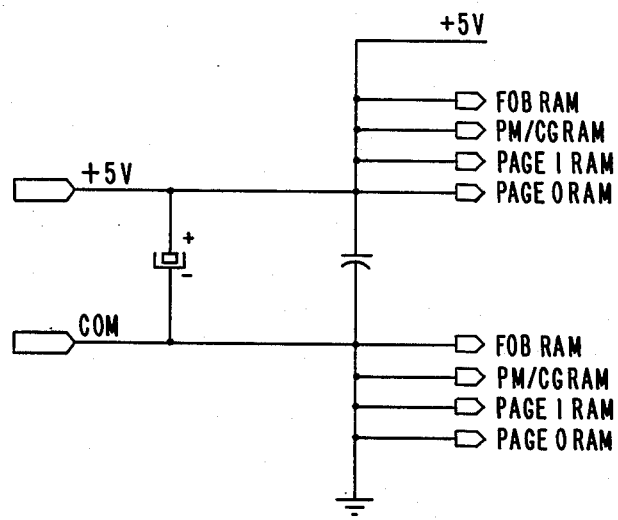
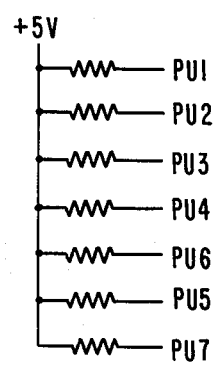

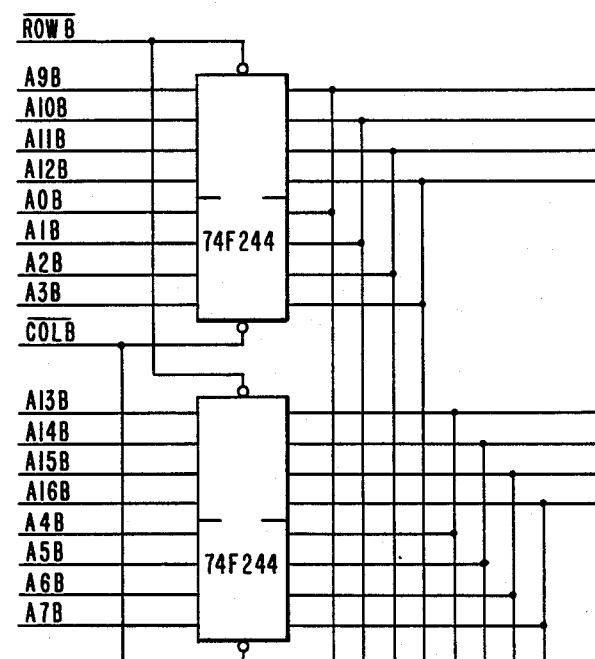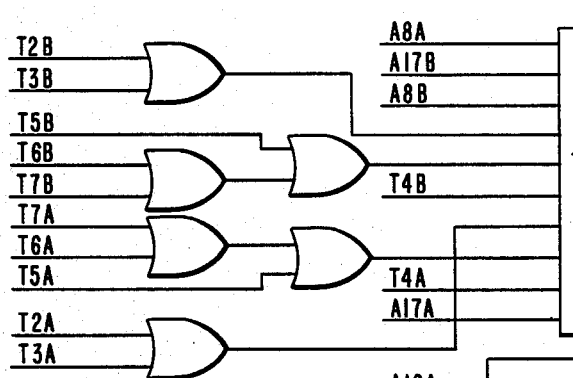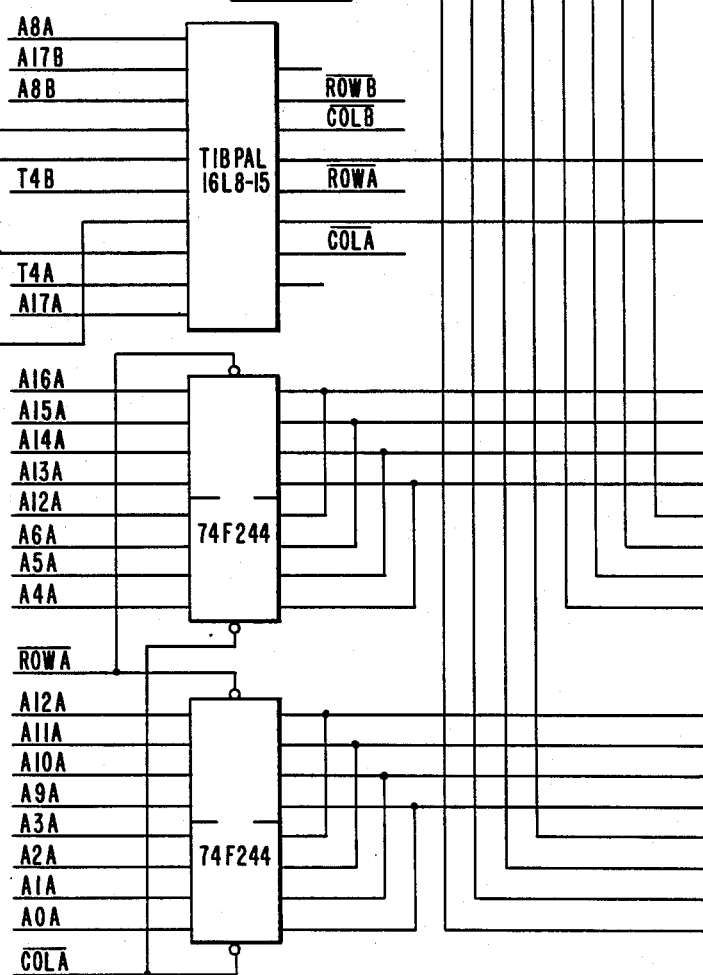
FIG. 40A.

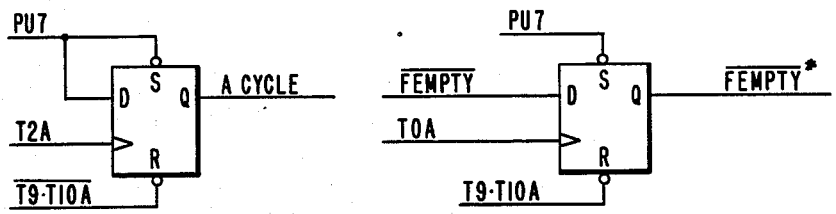
FIG. 44A.
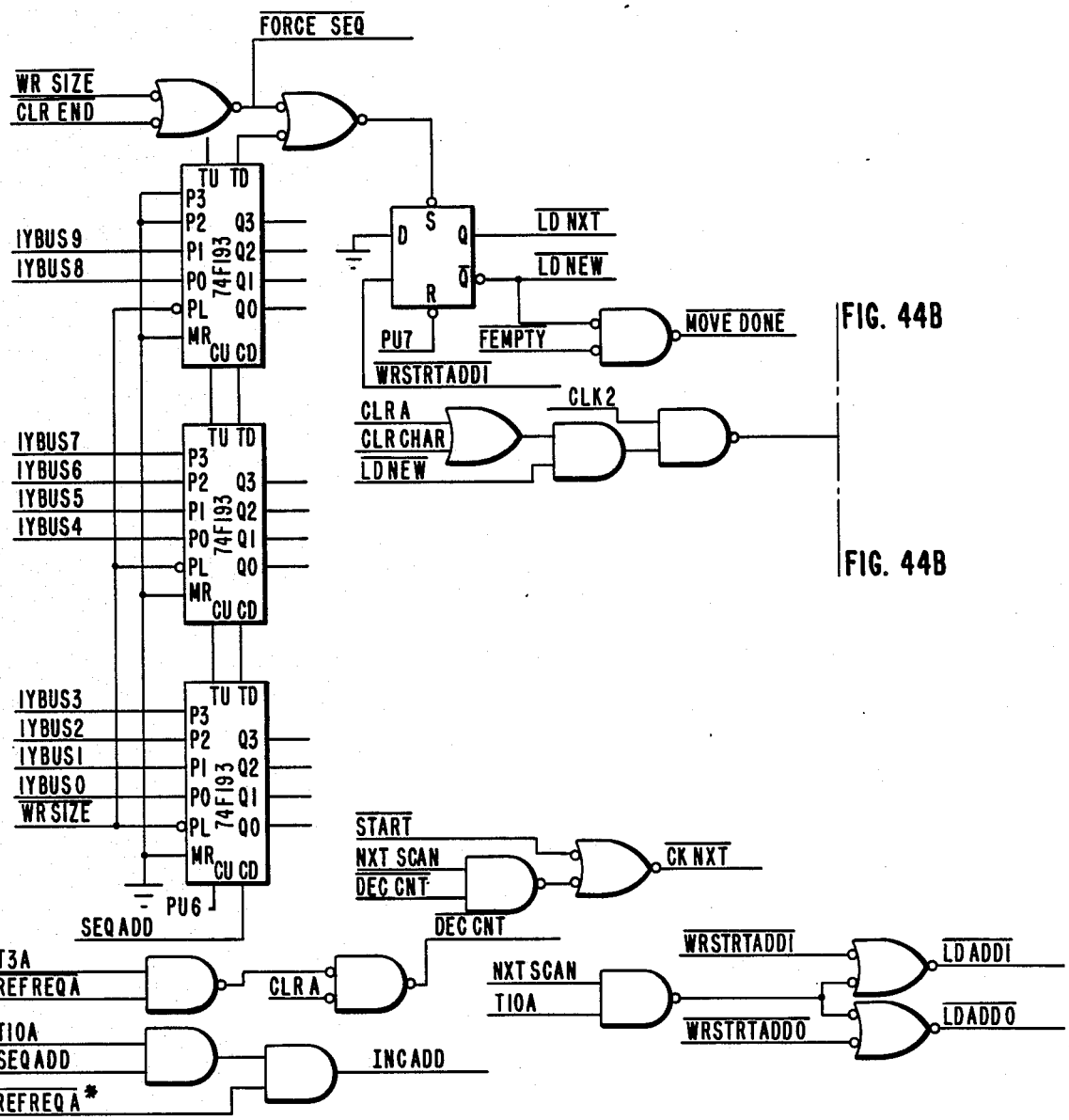

FIG. 49A.

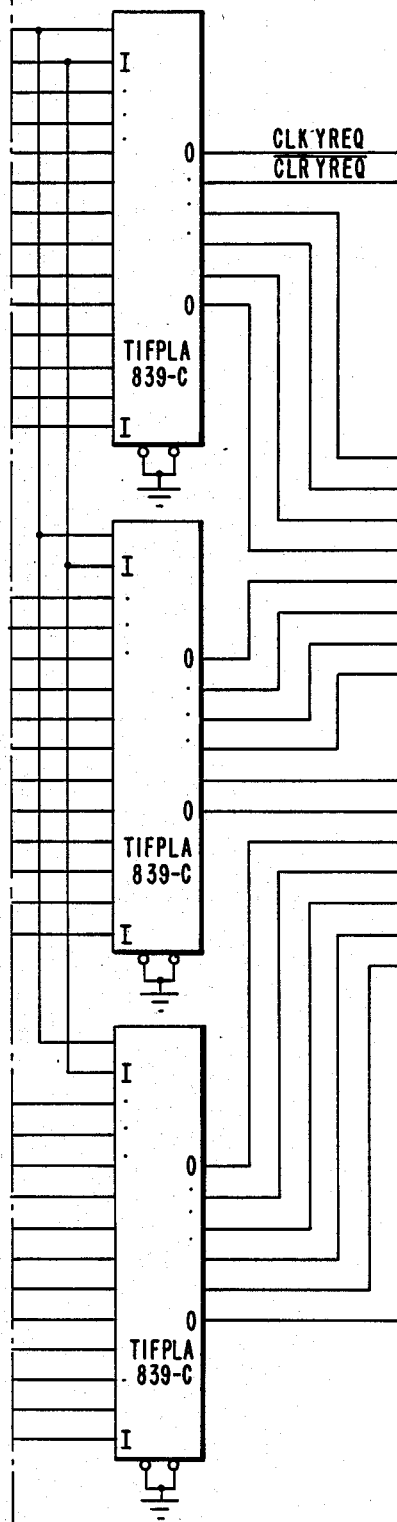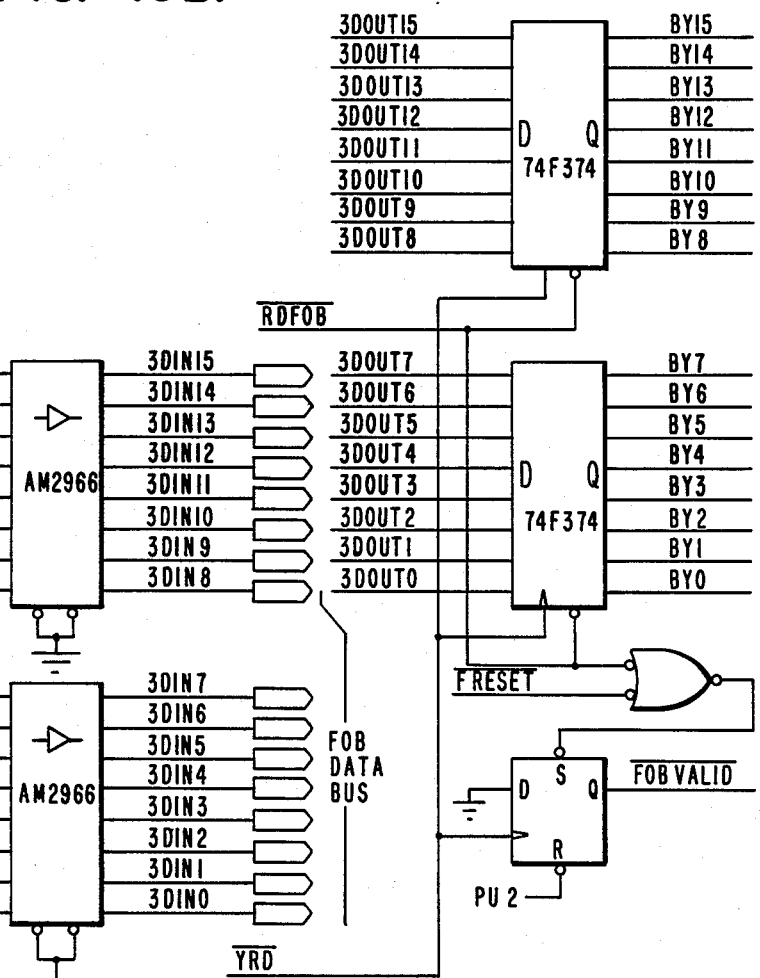
FIG. 49B.

HIGH SPEED PRINTER

MICROFICHE APPENDIX

A Microfiche Appendix contains a source code listing of routines utilized by the processing unit and control of other parts of the printing system of the present invention containing 9 microfiche having a total of 873 frames. The specific routines are a control for memory management units, an emulator, general subroutines, input/output support routines, self-test module, assembler directive, escape and control sequence introduce subroutines, interface, data movement routines, input/output support routines, printer controller, printer controller definitions, printer controller, forms overlay buffer shade area, forms buffer load raster routines, forms overlay buffer routines, and forms overlay shade area. The Microfiche Appendix contains subject matter which is copyrighted. A limited license is granted to anyone who requires a copy of the program disclosed therein for purposes of understanding or analyzing the present invention, but no license is granted to make a copy for any other purpose, including the loading of a processing device with code in any form or language.

BACKGROUND OF THE INVENTION

1. Field of the Invention

The present invention relates to high speed printers capable of printing up to at least 350 pages per minute.

2. Description of the Prior Art

Prior art printers which store a digital image of information to be printed are generally of two different types. The first type is based in hardware which processes a page very quickly to implement standard printing functions but is not capable of a wide diversity of printing functions. The assignee's Mercurion printer is a high speed printer utilizing a hardware base which permits printing up to 80 pages per minute. The second type of printer is based upon a microprocessor control which is capable of a high degree of programmability to implement different printing functions but does not operate at high speeds. Systems of this type typically have a throughput of between 10 and 20 pages per minute.

Neither of the foregoing types of prior art systems utilize a processing unit which issues commands to a character generator to retrieve characters stored as a pixel matrix of words of pixels in a font storage memory with all addresses for fetching the words of the characters from the font storage memory being generated independently of the operation of the processing unit, which processes words of each retrieved character word to position the words at particular pixel locations with respect to word boundaries in a page memory where the words are to be stored, and which specifies only the absolute address of the page memory where the first word of each character is to be stored with all of the absolute addresses in the page memory where the remaining words of each character are to be stored being generated independently of the processing unit. The prior art microprocessor based systems have the control of all operations for supporting the system assigned to the microprocessor including the generation of addresses which produces a slow throughput when compared with the present invention which utilizes the processing unit to perform functions in supporting the operation of the system without bearing the substantial overhead of generating addresses to operate the system memories.

The prior art systems for duplex printing (printing on both sides of a page) have a font storage memory storing four separate character orientations for each of the characters to be printed. The first orientation is for characters used in the portrait mode (lines running across the width of the paper) which is represented by the letter "A" of FIG. 1A and the second orientation is for characters used in the landscape mode (characters running across the length of the paper) which is represented by the letter "A" of FIG. 1B. The portrait mode is used for printing characters on one side of a page in books and similar types of printing applications. The landscape mode is used for printing characters in presenting graphical data and other types of information on one side of a page where it is desirable to have the textual material running in lines across the length of the paper. The third and fourth orientations are respectively 180° rotations of the aforementioned first and second orientations which are useful for printing the backside of pages in the "duplex" mode of printing for the aforementioned portrait and landscape orientations and are respectively represented by the letter "A" in FIGS. 1C and 1D.

While not illustrated in FIGS. 1A-1D, it should be understood that each character of each font is stored as a matrix of pixels which are readout in a manner similar to a raster of a television scanning pattern with the individual pixels representing points within the raster which are stored as binary values with one binary value indicating a light area and the other binary value indicating a dark area with the net effect of all of the binary values creating the visual appearance of the character. The disadvantage of the prior art method of storage of characters, as illustrated in FIGS. 1A-1D to implement both "simplex" (printing on only one side of a sheet) and duplex printing, is that each particular character must be stored in four separate orientations which requires double the amount of character memory for only simplex printing.

Systems are known for rotating stored images or individual characters in multiples of 90° of rotation in display or printing systems. Systems of the aforementioned type are disclosed in U.S. Pat. Nos. 4,271,476, 4,312,045, 4,542,377, 4,545,069, 4,554,638, 4,560,980, 4,570,158 and 4,636,783. U.S. Pat. 4,271,476 discloses a system for rotating a stored digital image 90° from a horizontal to a vertical format. U.S. Pat. No. 4,312,045 discloses a printing system which selectively rotates images 90°. U.S. Pat. No. 4,545,069 discloses a system for selectively rotating digital images by 90°. U.S. Pat. No. 4,544,638 discloses a display system which permits an image to be rotated in multiples of 90°. U.S. Pat. No. 4,560,980 discloses a printer which permits selective rotation of characters by 90°. U.S. Pat. No. 4,570,158 discloses a system which permits an image to be written into memory in either a left to right or a right to left direction and then read out in either a top to bottom direction or a bottom to top direction. U.S. Pat. No. 4,636,783 discloses a system for rotating a stored digital image by multiples of 90°. None of the aforementioned patents discloses the selective readout of stored words in a first direction in which the individual pixels of each word are transmitted in parallel format to a display or printing device in a first order and in a second direction, opposite to the first direction, in which the individual pixels of each word are transmitted in parallel format to a display or printing device with the order of the pixels of each word reversed with respect to the significance of the pixel positions (i.e., the most significant pixel is exchanged for the least significant pixel, the next most significant pixel is exchanged for the next least significant pixel etc.) of the first direction.

U.S. Pat. No. 4,225,929 discloses a system for rotating a television frame 180° about its central point by reversing the order of addressing a stored frame in memory and the order of the readout of the individual pixels. The address generation of U.S. Pat. No. 4,225,929 permits only a full frame to be read out. No provision is made for areas within the frame to be read out which is of extreme importance in a printing system of the present invention where either individual characters are to be read out from a font storage unit in either a first orientation or an inverted orientation or where a part of a page of information or a full page of information stored in a page memory are to be read out in either the first orientation or the inverted orientation for duplex printing of individual sheets or printing of sheets having holes printed on one side for containment in a ring binder.

U.S. Pat. No. 4,555,763 discloses a printer in which a first microprocessor receives, controls and formats character representing digital data and associated control data received from an interface device and a second microprocessor controls selection of characters from stored fonts and dual line storages of data to be displayed. The individual character cells are read in 6 or 8 bit words.

U.S. Pat. No. 4,452,136 discloses a printing system which utilizes two microprocessors. The first microprocessor controls communications with a host system and the second microprocessor controls the operation of a motor driven head which prints a dot matrix.

SUMMARY OF THE INVENTION

The present invention is a high speed printer with proportional character spacing capability (characters having different widths) having a throughput of at least 350 page per minute. A printer of this capability is achieved by providing a processing unit which performs various tasks for controlling the operation of the system without having the overhead of generating the addresses for retrieving stored words of pixels which define individual characters in a font storage memory and generation of addresses for controlling the location of where the retrieved words which define each character are to be stored in a page memory storing textual information to be printed by an associated print engine.

The processing unit performs several functions in the processing of characters to be printed. The processing unit continually receives textual material to be printed and controls its storage in a page memory which is part of a combined page memory and font storage unit. The processing unit thereafter sequentially issues commands to fetch individual characters from the page memory of the page memory and font storage unit which are stored in encoded form. Upon receipt of each character from the page memory of the page memory and font storage unit, the processing unit identifies the font to which the retrieved character belongs and identifies which character has been retrieved. Thereafter, the processing unit issues a command to the font storage memory of the page memory and font storage unit to fetch the pixel matrix defining the character. The individual characters are sequentially retrieved from the character memory as a series of multiple pixel words with each character typically being allotted two or three words per line with the last word per line being partially filled in the case of proportionately spaced characters with a plurality of lines such as forty lines. Each word is addressed by an address generator which generates each of the addresses for fetching the words independently of the operation of the processing unit. A FIFO (first in/first out) storage stores the words which are fetched from the font storage prior to transmission to the processing unit. A flag associated with the FIFO storage signals when one or more words are stored therein which signals the processing unit to fetch the first word. An arithmetic logic unit of the processing unit calculates the storage address of the first word of each character and the position of the first pixel of every word within the character with respect to word boundaries in a raster storage unit. The absolute pixel address of where the first pixel of each word of each character is to be positioned in the page memory of the processing unit is calculated by the processing unit. This address is augmented by the pixel width of each successive character, which is stored within a header in the font storage memory for each character. The absolute pixel address is divided by the number of pixels per word to determine the absolute word address within the line where the beginning word will be stored. The absolute word address for each successive word of a line is calculated by augmenting the previous word address by one until all of the words across a single line have been processed. The remainder for the division operation of the immediately preceding character determines the number of positions that all of the words of the current character must be rotated to properly position the character within the page memory of a raster storage unit to accomplish proper positioning. Each word that is fetched from a character stored in the font storage memory is rotated by a number of pixel positions equal to the calculated remainder by the arithmetic logic unit of the processing unit and then merged with the remainder of the preceding word by the processing unit. When a next character is to be fetched from the font storage memory, its width in pixels is added to the aforementioned absolute pixel address of the first pixel of the first word of the current character. The same division operation described above is performed to determine the address of the first word of the first line and the remainder determines the number of pixel positions to be rotated by the arithmetic logic unit for all of the words of the next character. The absolute address of the first word of each character is saved as a pointer by the processing unit. The pointer value is transmitted to the raster storage unit. An address generator at the raster storage unit generates all word addresses for writing the words within the page memory with the address of the first word of each character being specified by the pointer value transmitted from the processing unit and all subsequent addresses for writing words into the page memory for each character being generated by an addressing unit independently of the operation of the processing unit. A raster form storage unit stores one or more forms which may be combined by an OR gate with variable text read out from the page memory. The output of the OR gate is applied to a bit reverser which functions as described below.

The above-described addressing operations, conducted independently of the processing unit, free the processing unit to perform other functions such as executing instructions received from a host computer or the keyboard while permitting a high print throughput of up to 350 pages or more per minute.

A first bit reversing unit is connected to the output of the font storage memory of the page memory and font storage unit and a second bit reversing unit is connected to the output of the OR gate. The first bit reverser and a reversible counter in the addressing unit for the page memory and font storage unit permits the selection of the outputting of individual stored characters from the font storage memory of the page memory and font storage unit in first and second orientations which are rotated 180° from each other and further with the significance of the pixel positions of each word being reversed in the second orientation from the pixel positions of the first orientation prior to storage in the page memory. The second bit reverser and a reversible counter in the addressing unit for the raster storage unit permits the selection of the outputting of partial or whole pages in first and second orientations which are rotated 180° from each other and further with the significance of the pixel positions of each word being reversed in the second orientation from the pixel positions in the first orientation. The capability of selecting the aforementioned orientations permits duplex printing to be performed without requiring the storage in the font storage of the four orientations for each character as illustrated in FIGS. 1A–1D and further permits the printing of pages with holes punched in their sides for inclusion in ring binders by providing for the selective outputting of data in any one of four orientations without the storage of the four character orientations of FIGS. 1A–1D.

A printing system in accordance with the invention includes a raster storage unit including a page memory for storing at least one page of information to be printed, each page being comprised of a plurality of lines of information including a beginning line, a plurality of intermediate lines and an ending line, each line having one or more successively addressed words, each having a plurality of pixels, with a beginning word having the lowest address, with each successive word having a higher address, and with the last word having the highest address; a reading system, coupled to the page memory, for causing the readout of words stored in the page memory in either a first direction or a second direction, the first direction being from the first line successively through the intermediate lines through the last line with each line being read out in a direction from the lowest addressed word to the highest addressed word, the second direction being from the last line successively through the intermediate lines through the first line with each line being read out in a direction from the highest addressed word to the lowest addressed word and the significance of pixel positions of the pixels from words read out in the second direction being reversed from the significance of the positions of pixels from words read out in the first direction; a printer for printing on first and second sides of a printing medium, coupled to the reading system causing the read out of words, for printing pages of information stored in the page memory on a printing medium having a top and a bottom with the printing of the first side of the printing medium being performed by printing the page of information read out from the page memory in one of the first and second directions while moving the printing medium from the top to the bottom through a printing station and the printing of the second side of the printing medium being performed by printing the page of the information read out from the page memory in the other of the first and second directions while moving the printing medium from the bottom to the top.

A printing system in accordance with the invention includes a font storage unit including a font storage memory for storing a plurality of characters to be printed, each stored character being comprised of a matrix of pixels contained in a plurality of lines having a first line, a plurality of intermediate lines, and a last line, each line having one or more successively addressed words, with the beginning word having a lowest address, with each successive word having a higher address, and with the last word having the highest address, each word having a plurality of pixels; a reading system, coupled to the font storage unit, for reading out words stored in the font storage memory in either a first direction or a second direction, the first direction being from the first line through the last line with each line being read out in a direction from the lowest addressed word to the highest addressed word and the second direction being from the last line through the first line with each line being read out in a direction from the highest address word to the lowest address word and the storage of the words of the character, which have been read out from the font storage memory, in a page memory contained within a raster storage unit which stores one or more pages of information to be printed; and a printer, coupled to the raster storage unit, for printing on a printing medium pages of information stored in the page memory.

A printing system in accordance with the invention includes a processing unit having an input for receiving data and commands specifying operations to be performed, the processing unit sequentially issuing commands specifying that an individual character from a specified font is to be retrieved from storage where the character is stored as a matrix of pixels in a series of addressed words with each word having a plurality of pixels, processing each retrieved word of each character to position each word with respect to a word storage location where each individual character is to be stored within a memory for storing a page of information to be printed and specifying an address where a first word of each character will be stored in the memory for storing a page of information; a font storage unit, coupled to the processing unit, including a font storage memory for storing one or more fonts of characters each comprised of a plurality of characters to be retrieved and for processing a command issued from the processing unit that a specified character from a specified font is to be retrieved to cause the words of the specified character to be sequentially fetched from storage in the font storage memory by addresses generated by the font storage unit and transmitted to the processing unit; a raster storage unit, coupled to the processing unit including a page memory for storing the processed words defining each character sent from the processing unit to create pages of information to be printed, the raster storage unit having an address generator for generating the addresses of word locations within the page memory where each of the words of a character are to be stored and causing the storage of the words of each character in a page at the generated addresses, the address generator for generating the addresses specifying that the first word of each character is stored at the address specified by the processing unit and that all subsequent words of each character are stored within the page memory of addresses generated by the address generator independently of the operation of the processing unit; and a printer coupled to the raster storage unit for sequentially printing pages of information stored in the page memory on a printing medium.

In a printing system having a processing unit which controls the retrieval of individual stored characters from a font storage memory of a font storage unit as a plurality of words each having a plurality of pixels with each character having a plurality of lines and the storage of the retrieved characters in a page memory of a raster storage unit for storing a page of characters to be printed by a printer, an addressing system for generating the addresses of the locations in the page memory at which the plurality of words of each retrieved character are to be stored in accordance with the invention includes an address calculator, disposed at the processing unit, for calculating the absolute address for storing the first word of each character retrieved from the font storage memory and transmitting the calculated absolute address to the raster storage unit; and a memory management unit for controlling the storage of each retrieved word of each character in the page memory at a specified absolute address, the absolute address for storing the first word of each retrieved character being the absolute address transmitted from the processing unit and all remaining absolute addresses of each retrieved word of each character being calculated by an absolute address calculator which operates independently of the operation of the processing unit.

A printing system in accordance with the invention includes a page memory for storing at least one page of information to be printed, each stored page being comprised of a plurality of lines of information including a beginning line, a plurality of intermediate lines, and an ending line, each line having a plurality of successively addressed words each having a plurality of pixels, with a beginning word having the lowest address, with each successive word having a higher address, and with the last word having the highest address, a reading system, coupled to the page memory, for causing the read out of words stored in the page memory in either a first direction or a second direction, the first direction being from the first line successfully through the intermediate lines through the last line with each line being read out in a direction from the lowest addressed word to the highest addressed word, the second direction being from the last line through the first line with each line being read out in a direction from the highest addressed word to the lowest addressed word and the significance of the pixel positions of individual pixels from words read out in the second direction being reversed from the significance of the position of pixels from words read out in the first direction, each page having an address field extending between a minimum and a maximum address and any one or more addresses within the address field between the minimum and maximum address being readable in either the first or the second direction; and a printer, coupled to the reading system, for printing the plurality of lines of a page which have been read out in either the first or the second direction on a printing medium.

A printing system in accordance with the invention includes a font storage for storing a plurality of characters, each stored character being comprised of a plurality of lines of information having a first line, a plurality of intermediate lines, and a last line, each line having a plurality of successively addressed words each having a plurality of pixels, with the beginning word having the lowest address, with each successive word having a higher address, and with the last word having the highest address; a reading system, coupled to the font storage memory, for causing the read out of words stored in the font storage memory in either a first direction or a second direction, the first direction being from the first line through the last line with each line being read out in a direction from the lowest address word to the highest addressed word and the second direction being from the last word through the first word with each line being read out in a direction from the highest addressed word to the lowest addressed word and the significance of the position of individual pixels from words read out in the second direction being reversed from the significance of the positions of individual pixels read out in the first direction, the font storage memory having a plurality of individual addressable word storage locations defined by an address field extending between a minimum address and a maximum address, and a subfield of contiguous addresses of words defining a single character being readable in either the first or second directions; and a printer coupled to the reading system, for printing on a printing medium a plurality of words stored in the font storage memory.

BRIEF DESCRIPTION OF THE DRAWINGS

FIG. 9 is a memory map of the font storage unit of the page memory and font storage unit.

FIG. 10 is a memory map of an individual character in the font storage memory of the page memory and the font storage unit.

FIG. 11 is a flow sequence illustrating the processing of a word of pixels from its retrieval from the font storage memory to its storage in the page memory of the raster storage unit.

FIG. 13 is a block diagram of the bit reverser used in conjunction with the outputting of characters from the font storage memory and the bit reverser used in conjunction with the outputting of a form from the raster form storage unit and/or a page from the raster storage unit.

FIGS. 44A-C are a detailed schematic of the write FIFO and control, block move counter and data path programmable logic arrays for page 0 of the page memory.

Figure 49A:
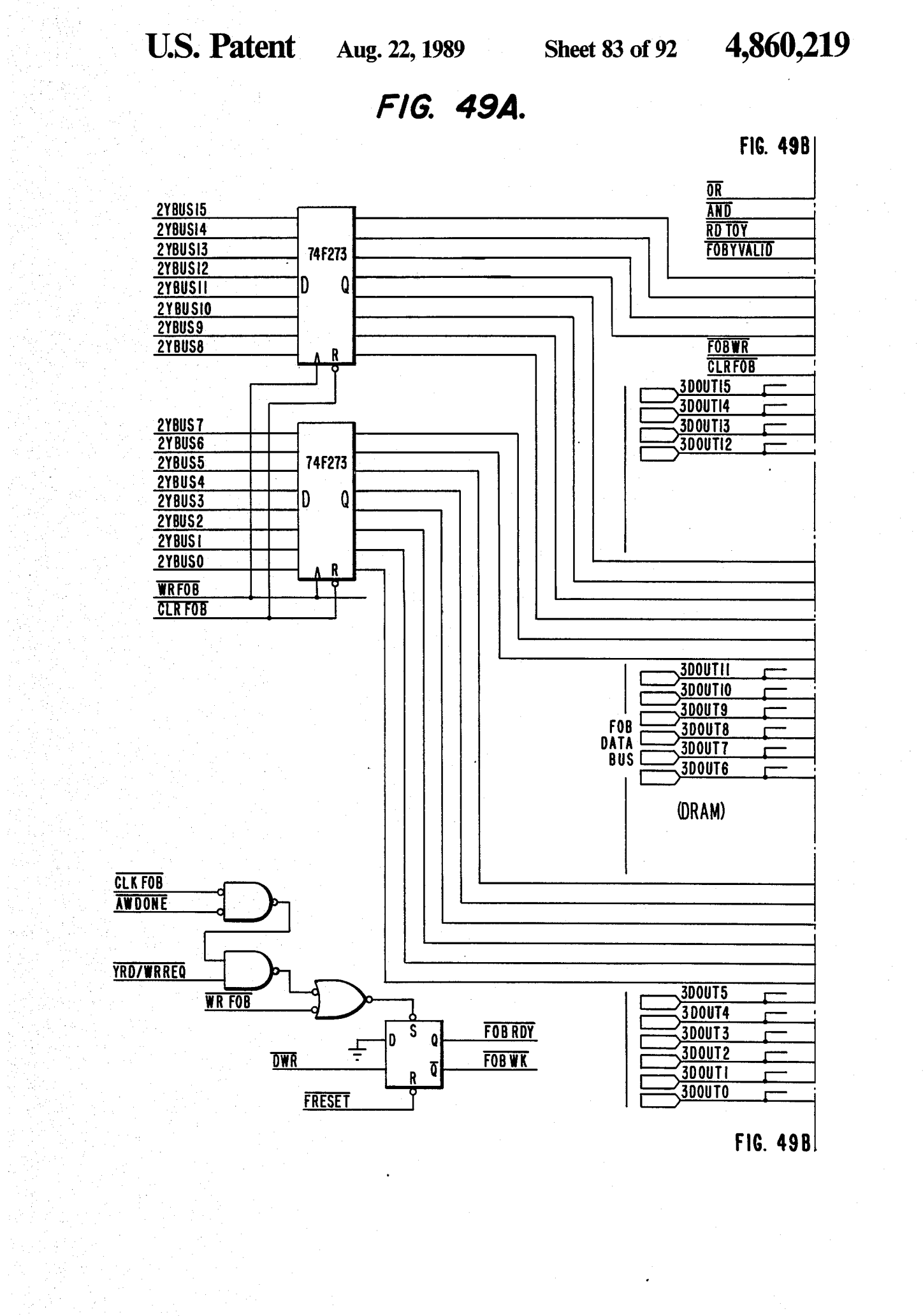

FIGS. 49A and B are a detailed schematic of the raster form storage unit data input/output.

DESCRIPTION OF THE PREFERRED EMBODIMENT

The present invention is a high speed printer controller for print engines which print digitally stored images of pixels. The present invention is also a high speed printing system for printing digitally stored images. The system has throughput capability of up to or more than 350 pages per minute with proportional spacing of characters. The invention provides the user with a wide choice of proportionally spaced character fonts (256 possible with the preferred embodiment) which may be of any known or newly developed font which is capable of being stored in a matrix of pixels in a font memory. Landscape and portrait printing may be selected, as well as printing of pages to be stored in ring binders with only the storage of characters in two orientations rotated 90° with respect to each other. A raster form storage unit permits the simultaneous printing of stored forms with variable data stored in a page memory of a raster storage unit. The processing unit is compatible with known page description and graphics languages.

Figure 2:
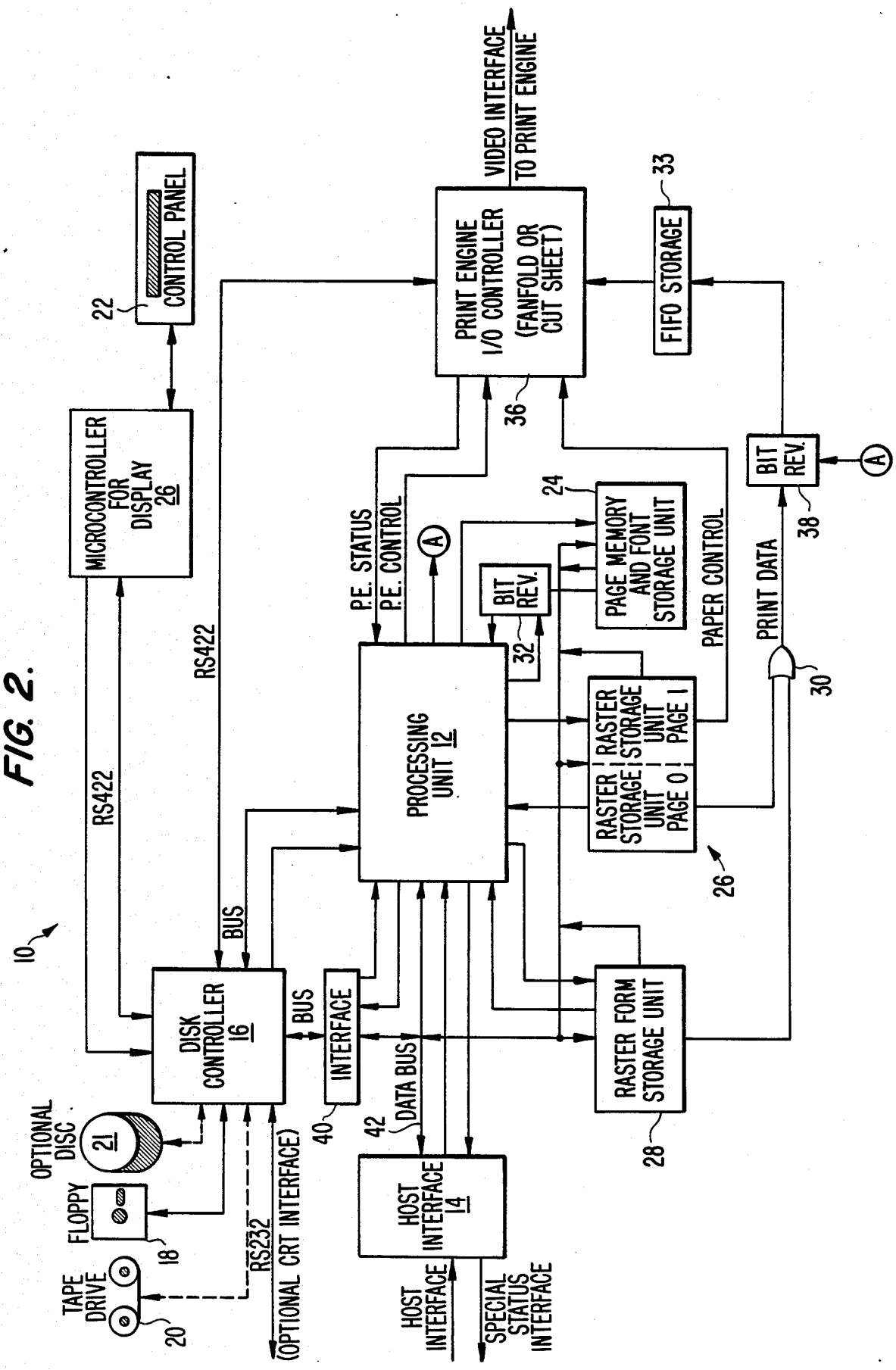
FIG. 2 illustrates a block diagram of the major components of the present invention.

With reference to FIG. 2, the system 10 is centrally controlled by a processing unit 12. The processing unit 12 is controlled by 80-bit wide instructions which permits each word to have a high control capability. The instructions are stored in RAM which increases speed. A partial summary of the commands which are executable by the processing unit 12 is set forth below in the table headed "Command Summary".

| COMMAND SUMMARY: | |
|---|---|
| 1. Select raster form storage unit for printing (full raster bit map of a page up to 11" × 17" at 240 or 300 pixels per inch resolution) | 15. Select write mode (absolute, "or", "and") |
| | 16. Define OFFSET |
| | 17. Reset raster form storage unit |
| 2. Shade defined area-relative mode (32 levels) | 18. Select size unit (Pixels, Decipoints) |
| 3. Raster form storage unit load control | 19. Download special shading patterns |
| 4. Define window for raster data load | 20. Select font (up to 999) |
| 5. Set window mode | 21. Select top margin |
| 6. Begin loading raster data | 22. Select left margin |
| 7. Horizontal position | 23. Select right margin |
| 8. Horizontal position | 24. Select bottom margin |

COMMAND SUMMARY: -continued

| | |
|---|---|
| relative | 25. Select number of copies |
| 9. Vertical position | 26. Automatic sheet feeder control (multiple feeders) |
| 10. Vertical position relative | 27. Document Finishing (separator page or offset) |
| 11. Horizontal, vertical position absolute | 28. Inline/Baseline Direction |
| 12. Draw horizontal/ vertical line | 29. Character orientation |
| 13. Draw vector | 30. Duplex/Simplex (with automatic page recreation if errors) |
| 14. Draw vector relative | |

The aforementioned repertoire of commands affords a high degree of programmability.

With reference to FIG. 2, the processing unit 12 directs the loading of the sections of system memory which are described below. The processing unit 12 performs multiple functions under the control of a microcoded program which centrally controls the overall operation of the system except for those operations which require extensive address computation which are performed independently of the operation of the processing unit at the sections of memory including address calculation for the fetching of individual words of multiple pixels of characters each defined by a matrix of pixels in the page memory and font storage unit 24 and address calculation for the writing of words from each character into the page memory of the raster storage unit 26 with only the absolute address of the first word of each character being provided by the processing unit. The processing unit 12 further processes each word of a proportionately spaced character fetched from the page memory and font storage unit 24 to position it with respect to a word storage location of the page memory in the raster storage unit 26 in accordance with a specified paper margin or position where a next character is to be stored as described below in detail. The processing unit 12 is preferably a microprocessor unit which permits the rotation of a currently fetched word to a correct position for storage of the word in the page memory and the merger of pixels from a remainder of a word not stored in the page memory during the immediately previous retrieval cycle from the font storage unit with the currently fetched word during a single clock cycle which facilitates the high speed positioning of characters for writing into the page memory with respect to any set margin and proportional character position as is described below. The processing unit 12 also operates at high speed in processing graphics commands.

The host interface 14 can be a standard seven or eight bit ASCII parallel interface (Data Products or Centronix) with an additional status link for any special applications to permit the handling of communications with a host printer. The host interface permits compatibility with a wide variety of host computers. Furthermore, it is compatible with forms creation and graphics software previously developed for the assignee's Mercurion I system. All ANSII II X 3.64 graphics commands used by the Mercurion I and an expanded instruction set for page description languages are honored. The special status interface can be used to provide the functionality required to emulate other systems such as the IBM 3820 or 3800-3.

The disk controller 16 is implemented using a standard microprocessor (Z-80). The functions of the disk controller are to (1) control the operation of the floppy disk 18, or optional tape drive 20 and optional hard disk 21, (2) control loading of microcode to control the disk controller 16, (3) control the loading of the microcode for the processing unit 12, (4) provide the link to the control panel 22 and (5) control the loading of fonts from the disk into the RAM of the page memory and font storage unit 24 and raster storage unit 26. The floppy disk 18 and tape drive 20 provide a mass storage media used for storing the microcode for the central processor 12 and the disk controller 16, fonts, diagnostic routines, user defined forms and graphics, for providing a source of transportable fonts, forms, logos, signatures, etc., for storing history status to facilitate failure analysis and for loading of specialized diagnostic routines for test purposes.

The control panel 22 contains an alpha numeric display which allows status to be displayed and allows data to be entered on a menu driven basis which is easy to use. The microcontroller for the display 26 associated with the control panel is programmed to be compatible with the print engine which has been selected.

The page memory and font storage unit 24 has storage for text to be printed (preferably 1–8 pages) and a full pixel memory map of all of the proportionately spaced characters in a plurality of selectable fonts. The page memory and font storage unit 24 is primarily used for performing three different functions: storage of multiple pages of encoded data (pages 1–8), storage of font information in a full pixel map pattern and the storage of small tag graphics such as signatures and logos. Each of these functions is discussed below.

The storing of multiple pages of encoded characters in the page memory of the page memory and font storage unit 24 is used for both error recovery and duplex printing. In the event of a paper jam or other error, the system must be able to reprint any pages not completely through the printing system. The number of pages stored is a matter of firmware and can be varied to conserve memory depending on paper path length, simplex or duplex, etc. In a duplex system, it is necessary to recover data in the event of an error condition and to retain enough pages in memory so that the backside of a previously printed front page can be printed prior to the discharge of the page from the printing system. For example, eight pages of duplex printing with the system can be printed in the order of page "2, 4, 6, 8, 1, 3, 5, 7" which permits four front side printed sheets to be stored in the paper path for later printing of the back sides Stored font information is used as follows. Font information is required to convert a selected character, which has been requested to be fetched by a command received from the processing unit 12, into a pixel pattern which is read out from the page memory and font storage unit 24 storing the requested character within a selected font. Each character is stored in the character memory as a pixel matrix which is comprised of a plurality of addressable words. When the characters of a font are proportionately spaced (each character has a set width in pixels with not all characters being of the same width), each character has a header stating the actual width in pixels (e.g. 24 pixels). The header is used by the processing unit 12 in positioning the words of the character with respect to the word boundaries of the page memories of the raster storage unit 26 as described below in detail. Each character may be fully defined by an integer multiple of sixteen pixel words per line with a plurality of lines per character. Associated with the page memory and font storage unit 24 is an address generating unit which is discussed in detail below with regard to FIG. 3. The address generating unit generates the addresses of each word to be retrieved and transmitted to the processing unit 12 independently of the operation of the processing unit which frees the processing unit from the overhead of generating addresses for fetching words from the font storage memory. The font storage memory of the page memory and font storage unit 24 is implemented in RAM and is expandable for storage of additional fonts and small graphics The font storage unit may also be used effectively for storing small graphics such as signatures and logos for later use in both the raster form storage unit 28 and pages "0" and "1" of the page memory of the raster storage unit 26 discussed below. Small graphics may be transferred quickly from the font storage memory 24 to one of the raster pages 0 and 1 of the raster storage unit 26. Bit reverser 32 may be enabled to reverse the order of the significance of the pixels of each word of a character being read out from the font storage memory for permitting the readout of stored data in either first or second directions respectively from the top of a character to the bottom of a character or from the bottom of a character to the top of a character to permit a character to be generated in an inverted format from the orientations illustrated in FIGS. 1A and 1B without the necessity of storing the orientations of FIGS. 1C and 1D. A reversible counter is provided with the page memory and font storage 24 to permit the words of a character to be read out in the first and second directions Any block of addresses within the full address space of the page memory and font storage unit 24 may be read out in either the first direction or the second direction.

The raster storage unit 26 functions to store a full pixel map of two pages to be printed by a print engine of any conventional design. Each word is comprised of a plurality of pixels which in a preferred embodiment is sixteen. The individual stored pixel matrices of characters stored in page 0 and page 1 are alternatively read out to the print engine typically, but not limited to, on a page basis. When one of the pages is being loaded, the other of the pages is being read out which speeds up the operation of the raster storage unit 26. The raster storage unit 26 includes two address generating units, which are discussed below, the first of which generates the absolute word address of where each word of each character is to be stored in either page 0 or page 1 of the page memory. The absolute address of the first word of each character is specified by the processing unit 12, but all other absolute addresses of each word is generated by the address generating unit independently of the operation of the processing unit 12. The second address generating unit generates the read addresses to the print engine which may be read in forward or reverse from any word address in the page memory. The timing of the second address generating unit is controlled by the print engine and is asynchronous to the processing unit. The generation of addresses by the address generating unit frees the processing unit 12 from the overhead of calculation of the vast majority of storage addresses of words in the page memories. The actual number of pixels which are allotted per page is a function of paper size and the pixel density used by the print engine While the invention is not limited thereto, in a preferred embodiment pixel densities of 240 or 300 pixels per linear inch may be chosen.

The raster form storage unit 28 functions to store at least one form in a full pixel map for selective output with pages of variable data from the page memory of the raster storage unit 26 to create a composite of variable textual material and a selected form. The raster form storage unit 28 contains a forms memory which in a preferred embodiment has storage for up to two megabytes which is usable in a number of ways. The basic function of the forms memory is to store a pixel map of a form (or any graphic) which is logically processed by OR gate 30 with the output from one of the page memories of the raster storage unit 26. Each of the one or more forms is retained in the random access memory of the form memory which permits its selective printing with variable data (textual) on successive pages read out from the raster storage unit 26 with no loss in speed without requiring a write cycle into the forms memory for each page of data being printed The image of a form can be enabled or disabled from printing without writing into the form memory in the raster form storage unit 28. Alternatively, the form memory may be used for storing small graphics as described above with regard to the page memory and font storage unit 24.

Typically, when data is to be printed, the full pixel map of the forms memory of the raster form storage unit 28 and one of the page memories of the raster storage unit 26 is applied to OR gate 30 to perform a logical processing of each of the pixels of each word being read out. The generation of readout addresses for the forms memory of the raster form storage unit 28 and one of the pages of the raster storage unit 26 is synchronized by the print engine so that words with the same desired position respectively in the forms memory of the raster form storage unit 28 and one of the pages of the raster storage unit 26 are read out simultaneously. The output from the OR gate 30 is applied to a bit reverser 38 which may be enabled to reverse the significance of the order of the pixels of each output word from the OR gate 30 as part of the system for permitting the reading of stored data from one of the page memories and/or forms memory with either first or second directions respectively from the top of a page to the bottom of a page or from the bottom of the page to the top of the page to selectively implement simplex or duplex printing as described below. A reversible counter is provided with the addressing unit for addressing words stored in the raster storage unit 26 and words stored in the raster form storage unit 28 to permit any part of the page memory and forms memory to be read out in two directions. A FIFO buffer storage 33 is provided for storing words of data outputted from the bit reverser 32 until the print engine I/0 controller 36 is ready to receive data for driving a conventional print engine not illustrated.

An interface 40 is provided between the disk controller 16 and the bus 42 which is 16 bits wide.

The addressing units associated with the page memory and font storage 24, raster storage unit 26, and raster form storage unit 28, which are discussed below in detail, facilitate the moving of data between the parts of the system memory without requiring the processing unit 12 to generate the great majority of addressing information necessary for both the reading and writing of data. The processing unit 12 is freed to perform operations that utilize its extremely fast processing speed including the rotation of words of data for proper positioning with respect to word boundaries in the pages of the page memory without slowing down the overall processing operation in view of the great majority of the addressing overhead for retrieving and storing words of characters being performed by independently operating addressing units. The addressing units operate at a speed matched with the operational speed of the random access memory of the page memory and font storage unit 24, raster storage unit 26 and raster form storage unit 28 which frees the processing unit 12 to move ahead with other tasks while characters are being prepared for transfer to the processing unit from the page memory and font storage unit 24, and for transfer from the processing unit to the raster storage unit 26 for storage.

Figure 1A:
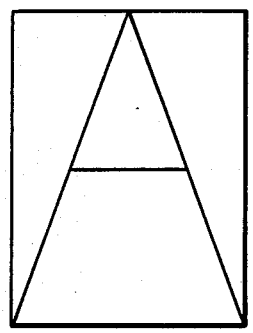
FIGS. 1A–1D illustrate a prior art memory map of individual characters stored for duplex printing.
Figure 1B:
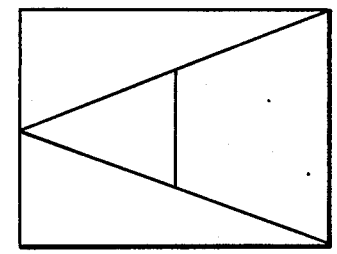
Figure 1C:
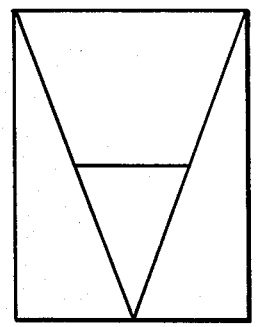
Figure 1D:
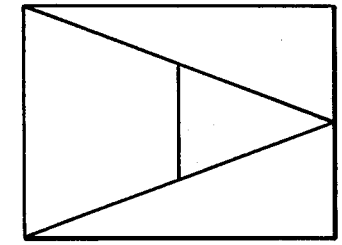
Figure 3:
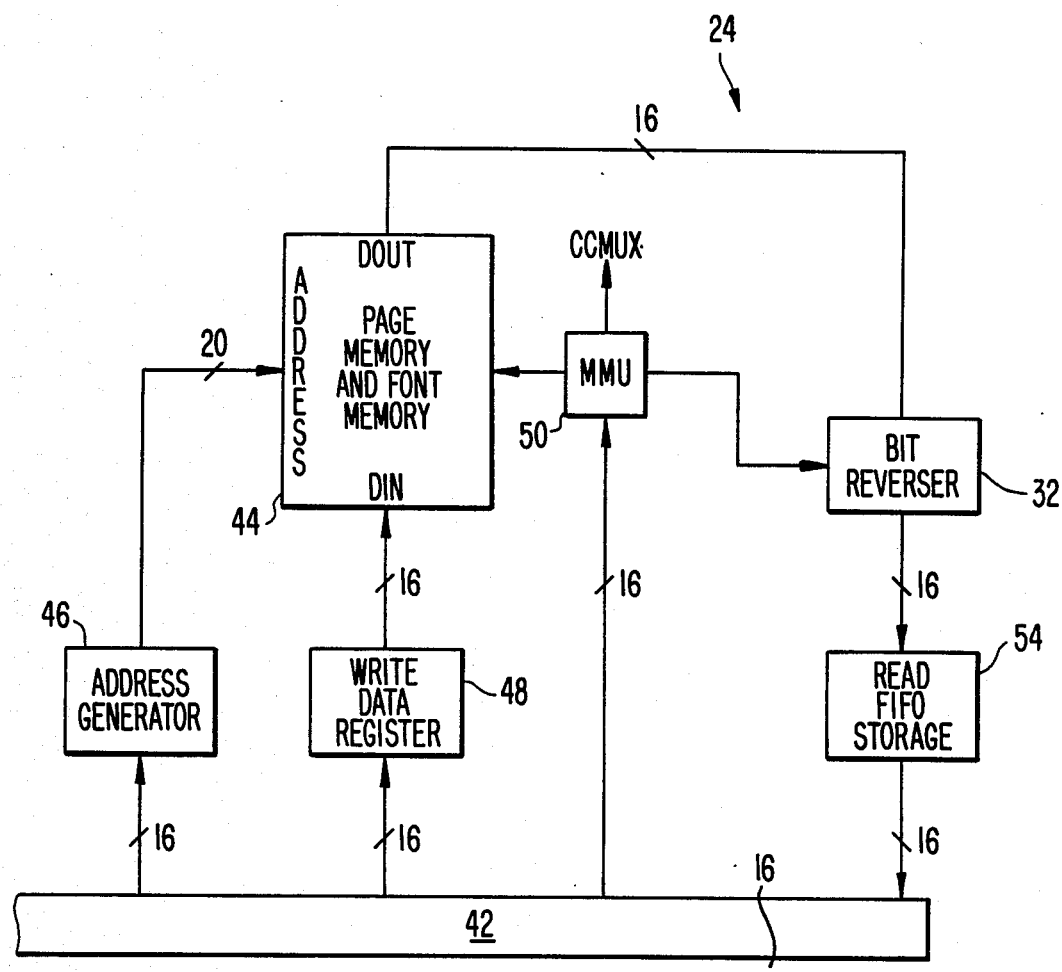
FIG. 3 is a block diagram of a preferred implementation of the page memory and font storage unit of FIG. 2.

FIG. 3 illustrates a block diagram of a detailed implementation of the page memory of the page memory and font storage unit 24 of FIG. 2. The page memory and font storage unit 24 has a two-part memory 44 having a page memory for storing page textual material to be printed in encoded format, such as ASCII, and a font storage memory for storing a full pixel matrix of each character of each font which is selectable by the print engine. As stated above, the characters may be proportionately spaced with different characters having different pixel widths. It should be noted that in all of the Figures of the drawings bus width in terms of the number of lines in the bus is indicated by a number adjacent to the bus, such as the number "20" associated with the "ADDRESS" input to the page memory and character memory 44. Only the bus 42 is illustrated as a bus in order to simplify the Figures of the drawings. Address generator 46 creates the addresses for accessing data anywhere within the combined two-part address space of the page memory and font storage memory 44 by processing two sixteen bit words received from the bus 42 into a single twenty bit address word. Depending upon the value of the twenty bit word, address space within either the page memory or the font memory of the page memory and font memory 44 is accessed. The page memory section and the font memory section may be assigned anywhere within the address space of the page memory and font memory 44. The address generator 46 has a reversible counter which counts a total equal to the number of words within the combined address space of the page memory and font memory 44 between the minimum address and the maximum address therein The counter is used to generate the readout addresses of the words for each of the characters stored in the font memory of the page memory and font memory 44. The counter counts in an ascending order between a minimum word address and a maximum word address when characters having the orientations of FIGS. 1A and 1B are being read out and in descending order between the maximum word address and the minimum word address when characters having the orientation of FIGS. 1C and 1D are being read out. The bit reverser 32, which is described in detail below in conjunction with FIG. 13, outputs the pixels, with respect to the significance of pixel positions of the sixteen bit output line, either in the order "15, 14 . . . 1, 0" (output from 180 of FIG. 13) or in the order "0, 1 . . . 14, 15" (output from 180 of FIG. 13). A write data register 48 is provided which receives sixteen bit words which may be written anywhere within the twenty bit address field defined by the address generator 46. Text is stored in the page memory section and the individual pixel matrices of each of the characters of the plurality of fonts are stored in the font memory section s described in detail below in conjunction with FIGS. 9 and 10. Memory management unit 50 controls the basic operation of the page memory and character memory 44 including the generation of timing signals, read signals, write signals, refresh signals, etc. The input "CC MUX" is a condition code which is applied to the condition code multiplexer of FIG. 4 which is described below. A read FIFO storage 54 is provided to store individual words from a character being retrieved which are to be read by the processing unit 12. The read FIFO storage 54 has a flag for signalling when it contains at least one word retrieved from a character from the font memory of the page memory and font memory 44. The memory management unit 50 is coupled to the bus 42 for receiving commands which are decoded and executed, including commands for storing individual characters in the page memory of the page memory and font memory, the retrieving of a particular character from a particular font and the control of the bit reverser 32 to choose either the first direction or the second direction of reading out the words of characters stored in the page memory and font memory 44. The counter within the address generator 46 can be set to count an address field anywhere within the minimum and maximum address defined by the twenty bit address field outputted by the address generator 46 when reading the words out in either the first or second direction.

Figure 4:
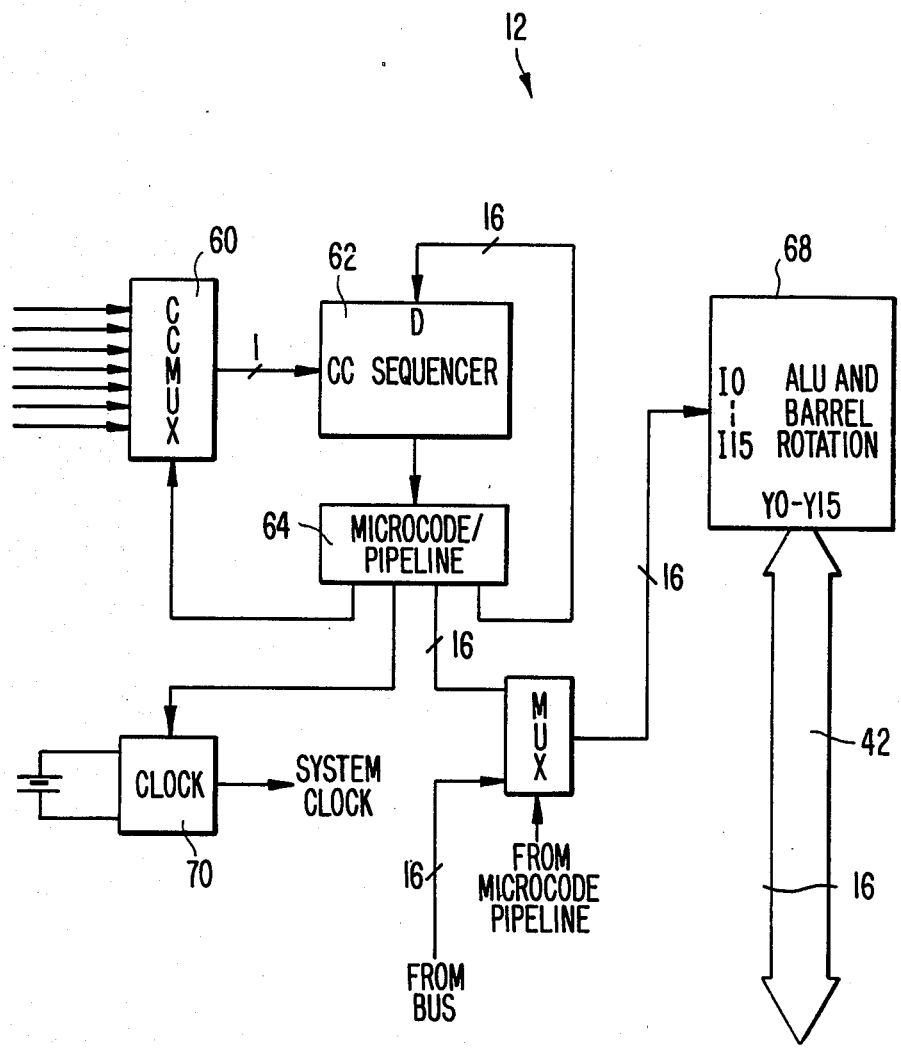
FIG. 4 is a block diagram of an implementation of the processing unit of FIG. 2.
Figure 17A:
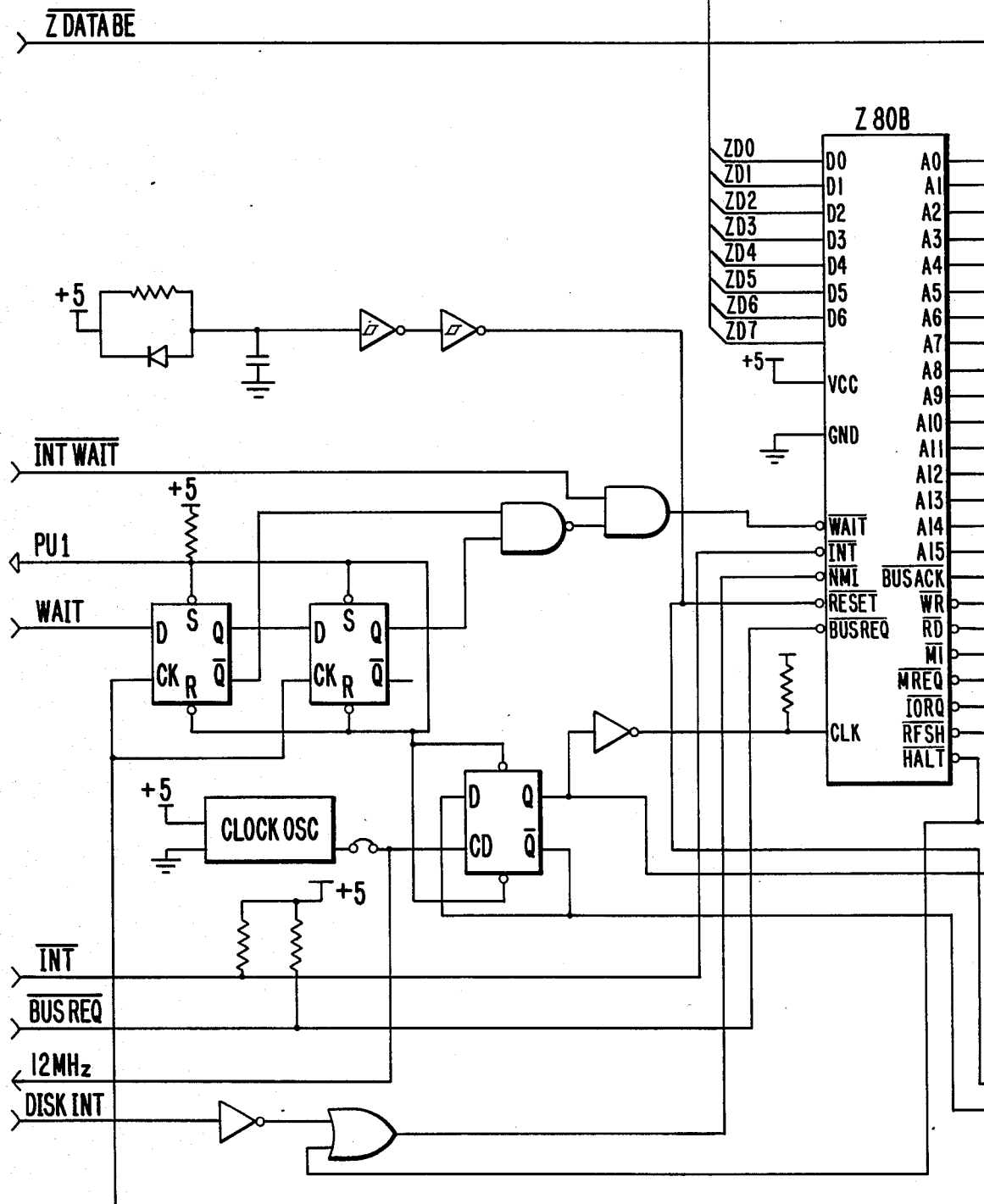
FIGS. 17A and B are a detailed schematic of the processing unit.
Figure 17B:
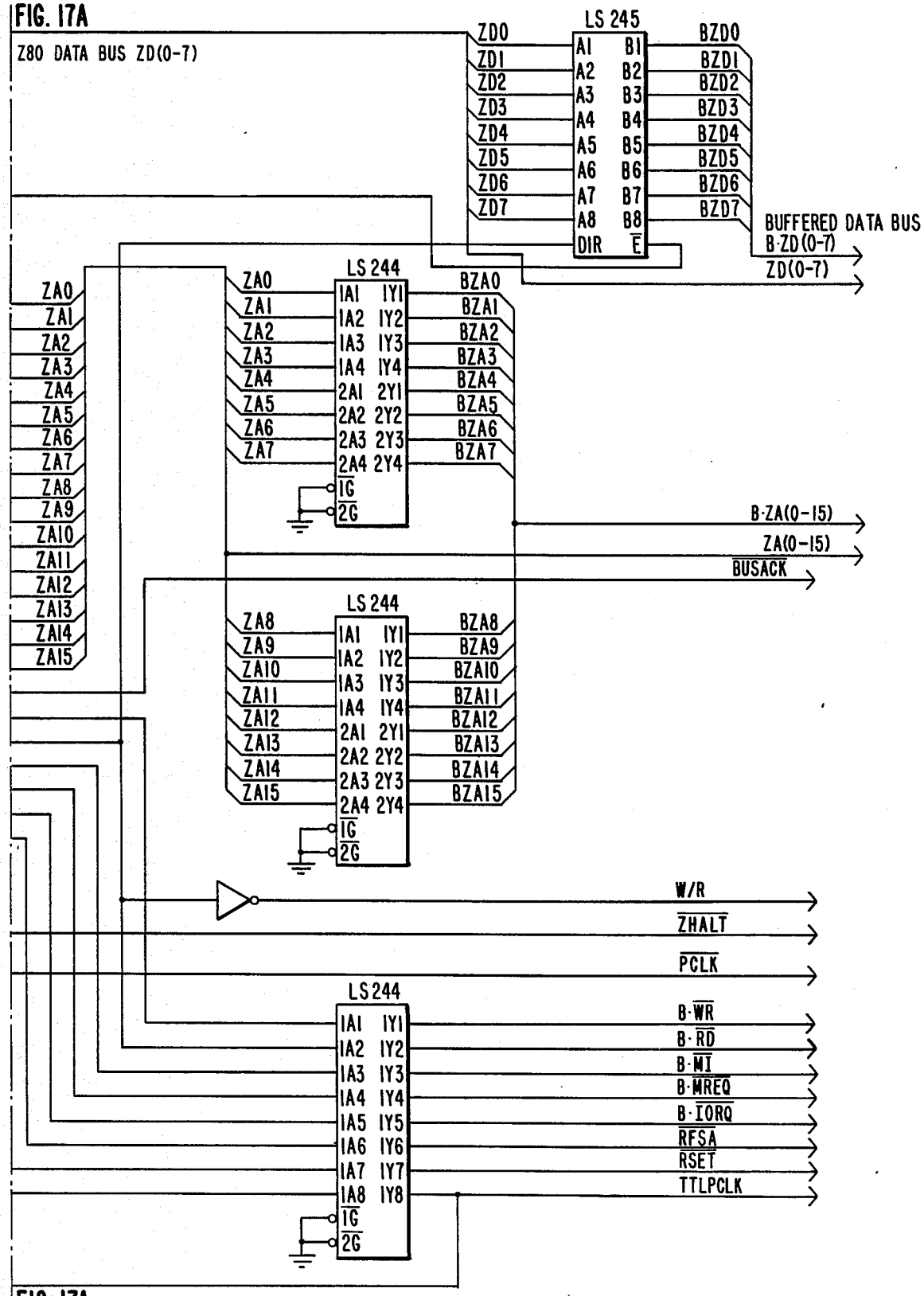
Figure 18A:
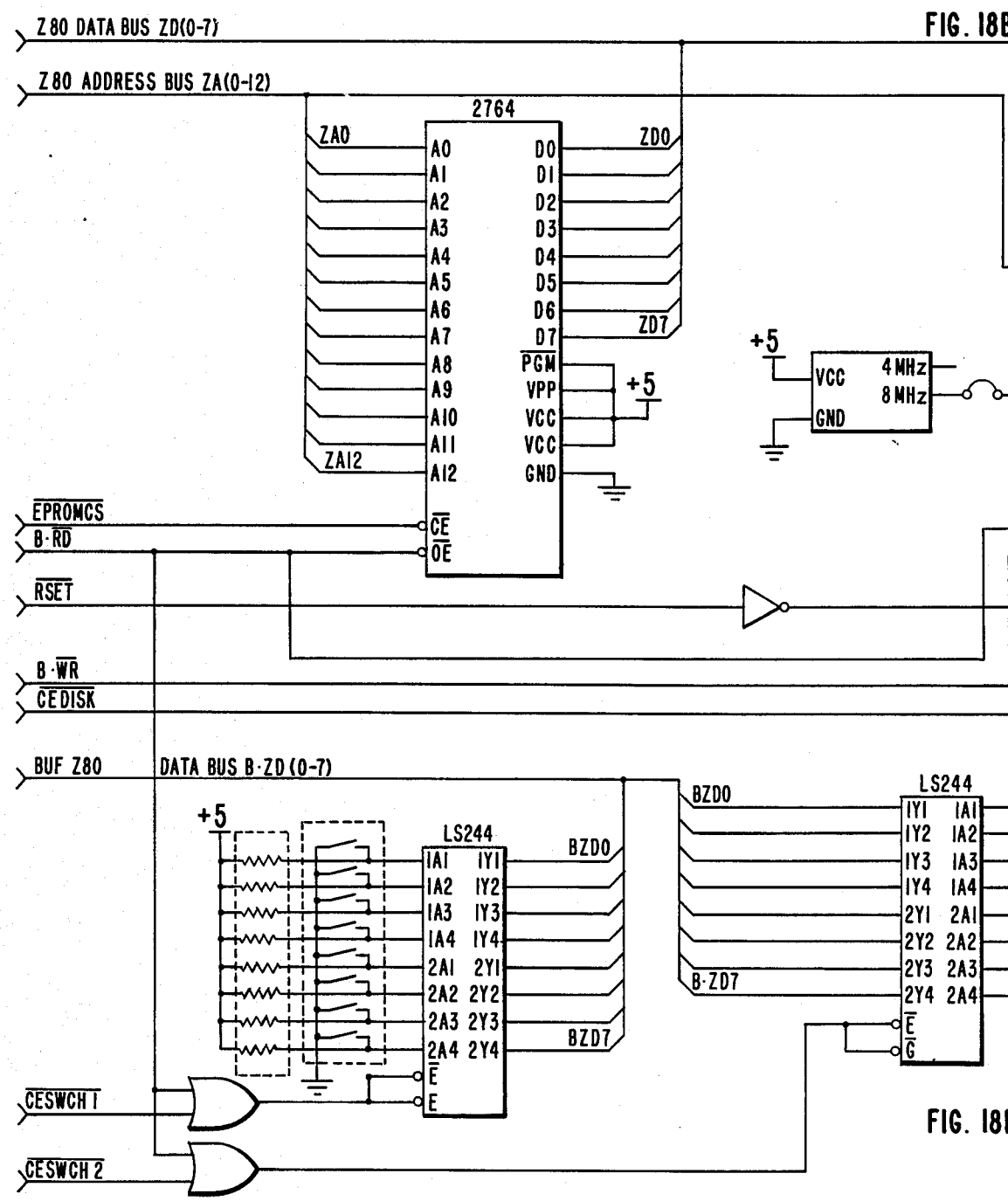
FIGS. 18A and B are a detailed schematic of the EPROM of the processing unit and the disk controller.
Figure 18B:
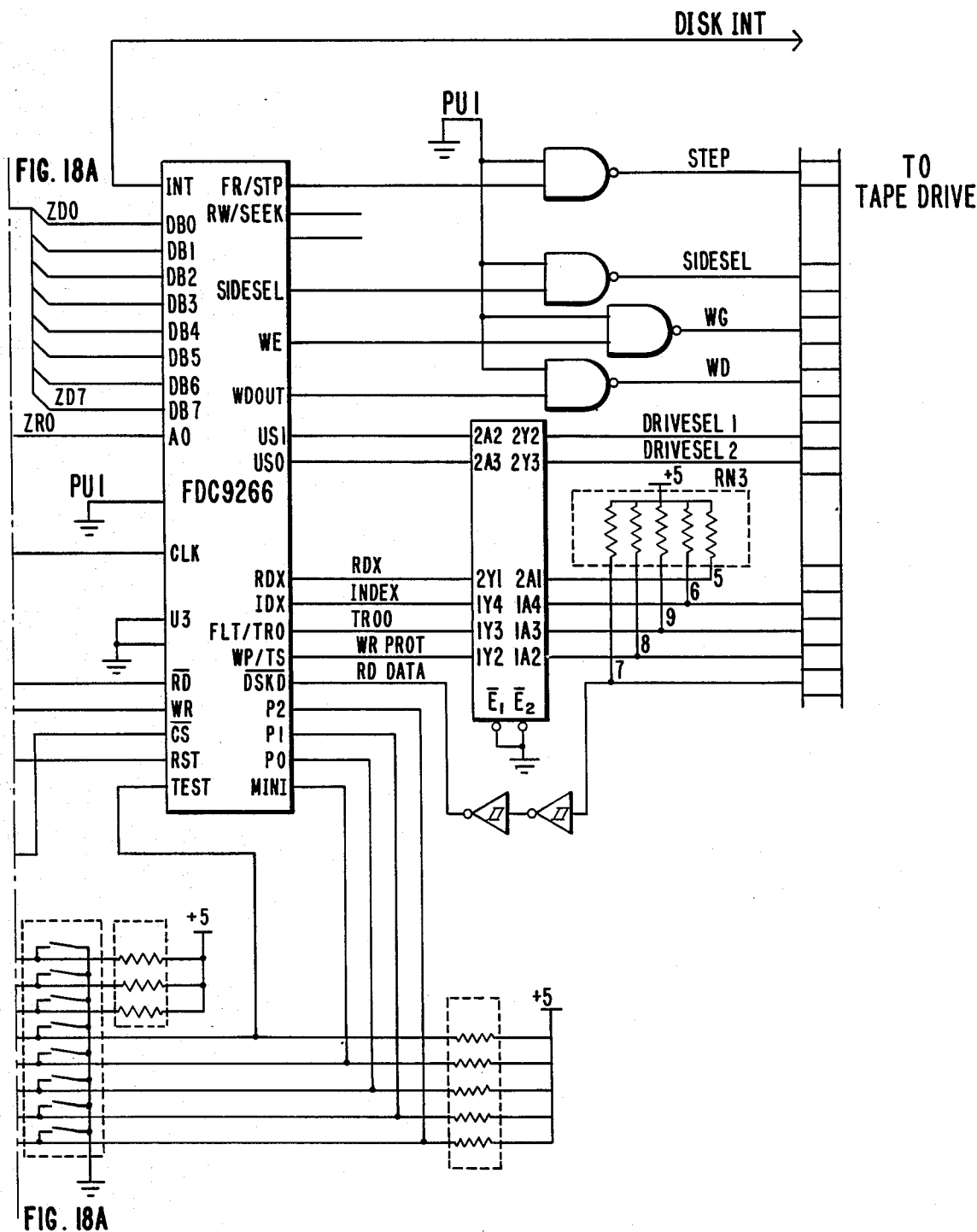
Figure 19:
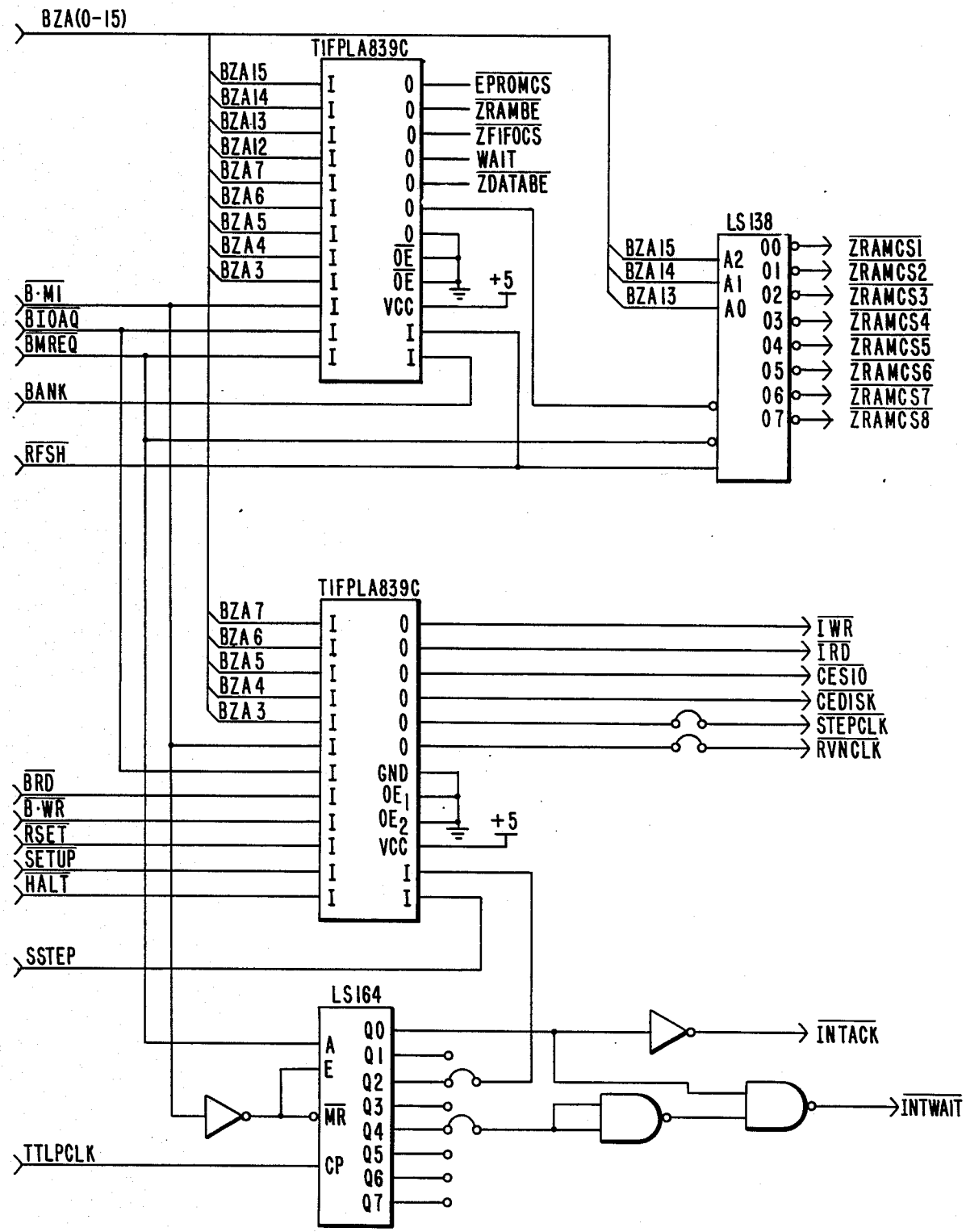
FIGS. 19 is a detailed schematic of the processing unit memory map and interrupt wait logic.
Figure 20A:
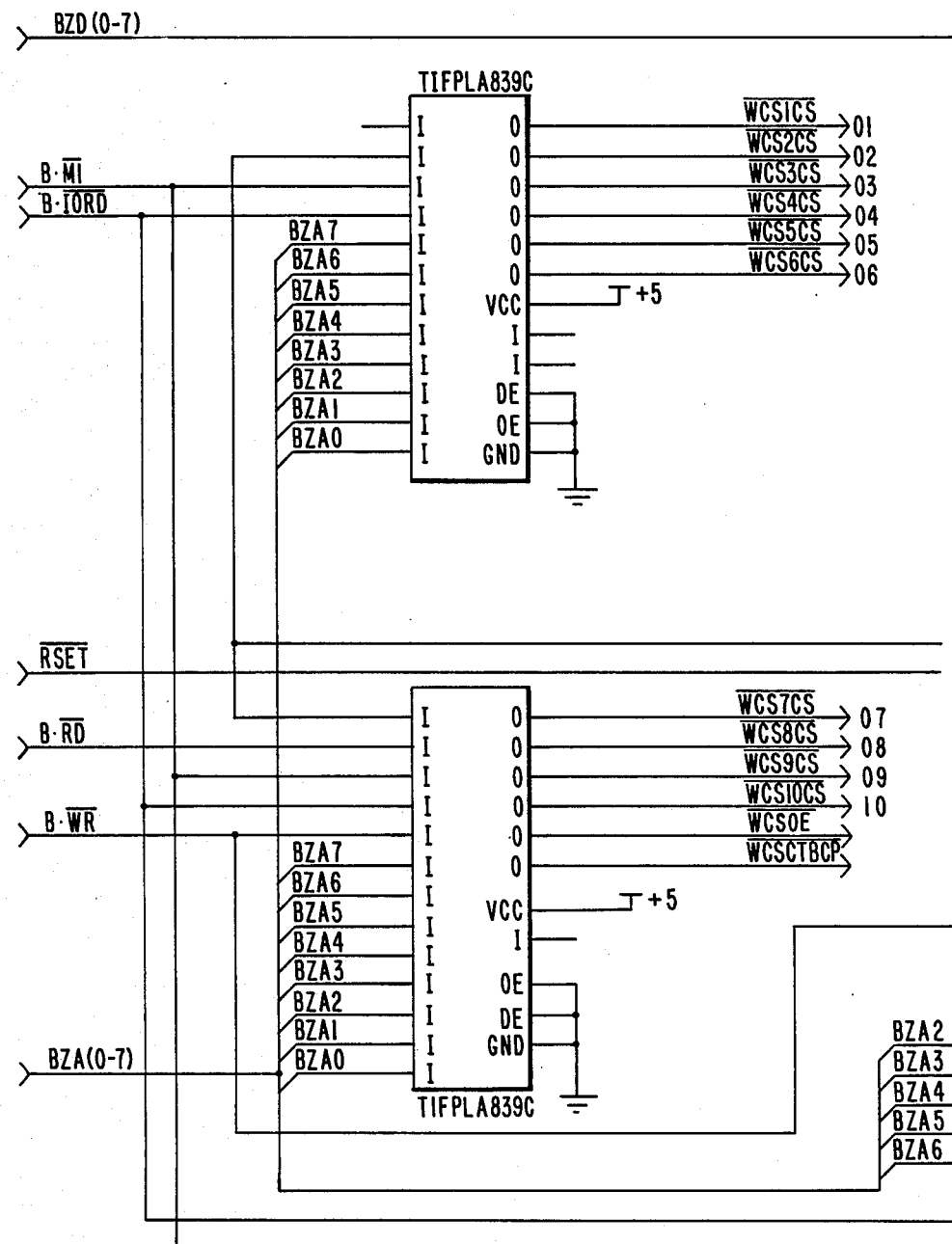
FIGS. 20A and B are a detailed schematic of the input/output map and write control store decoder.
Figure 20B:
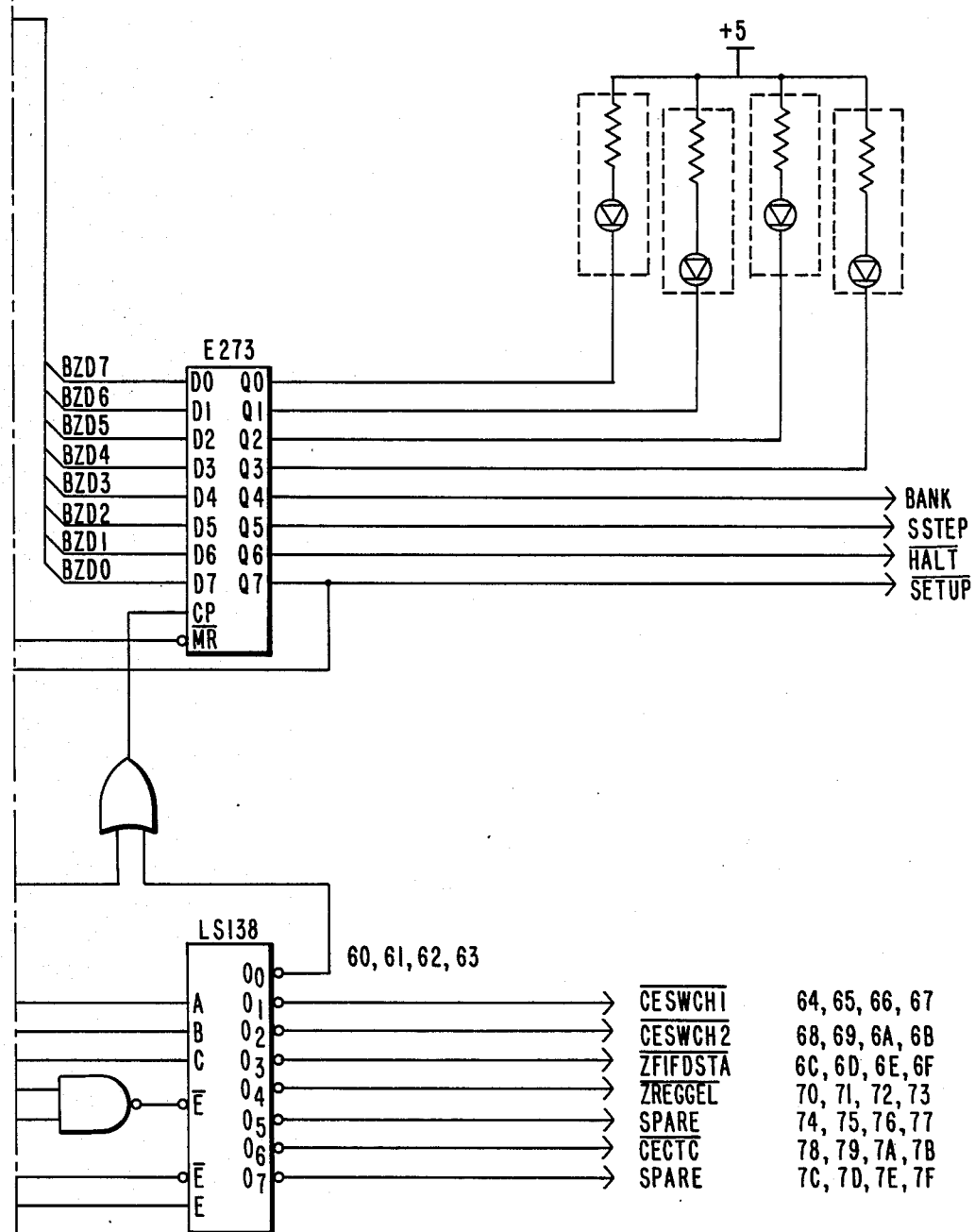
Figure 21A:
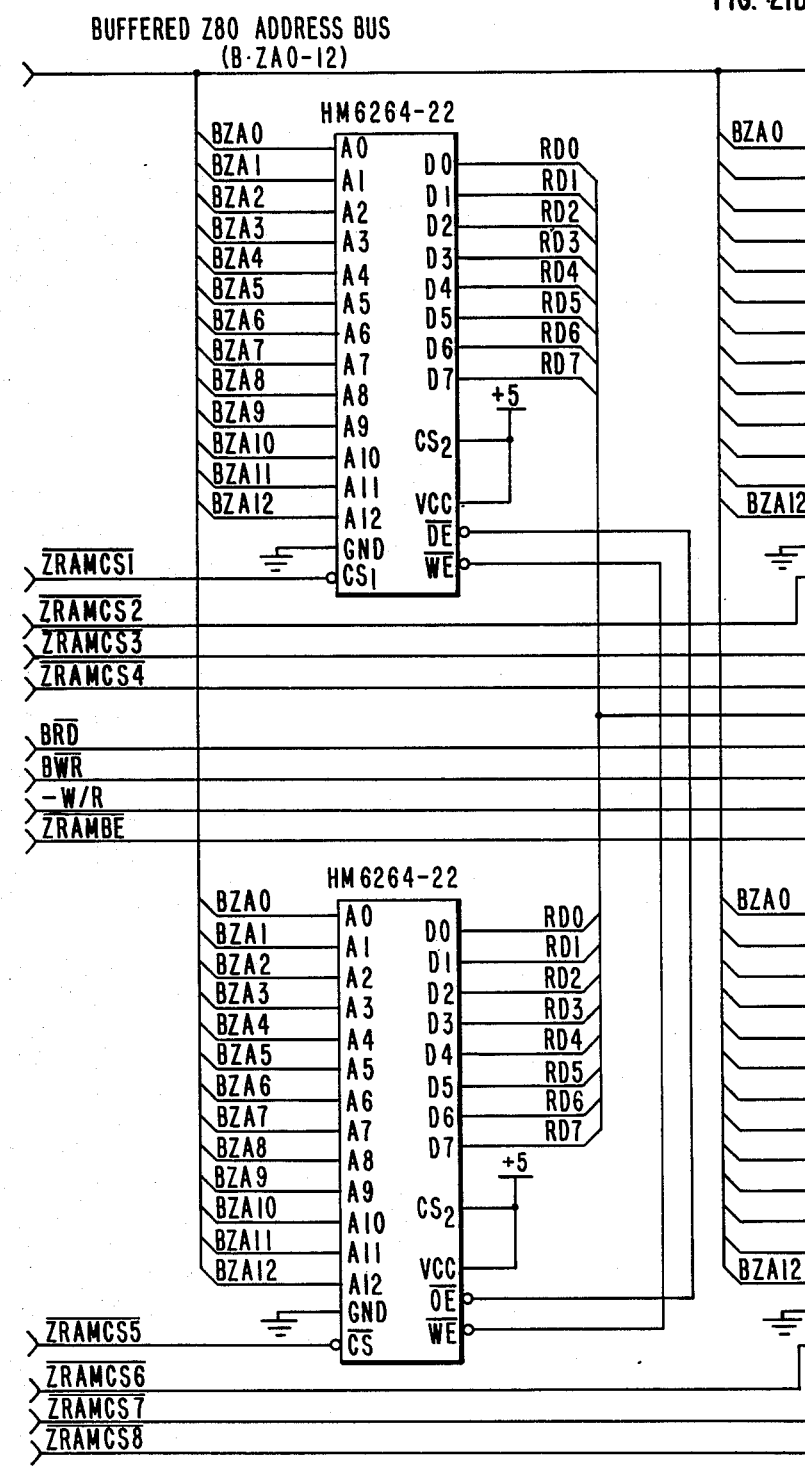
FIGS. 21A-C are a detailed schematic of the random access memory of the processing unit of the disk controller.
Figure 21B:
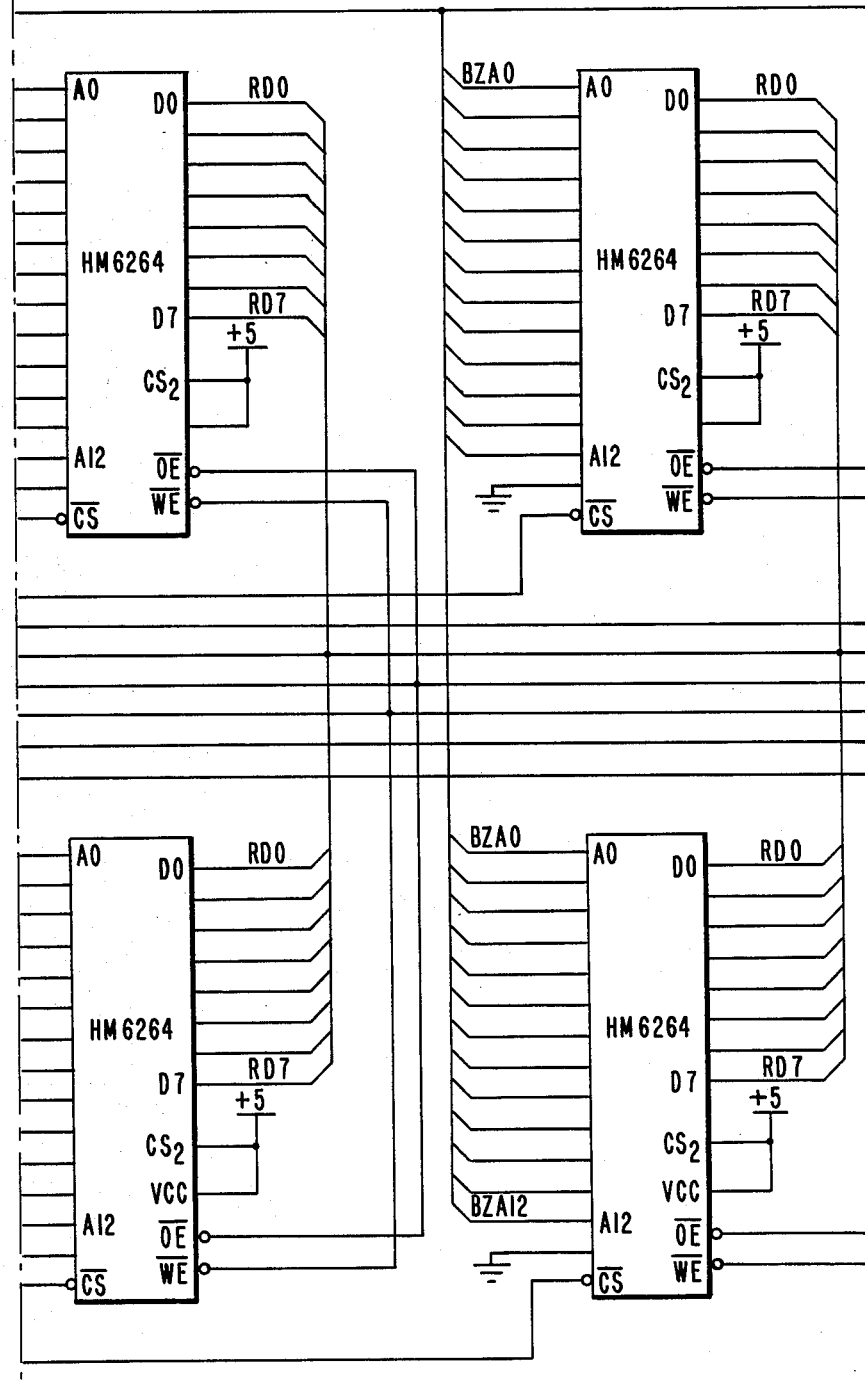
Figure 21C:
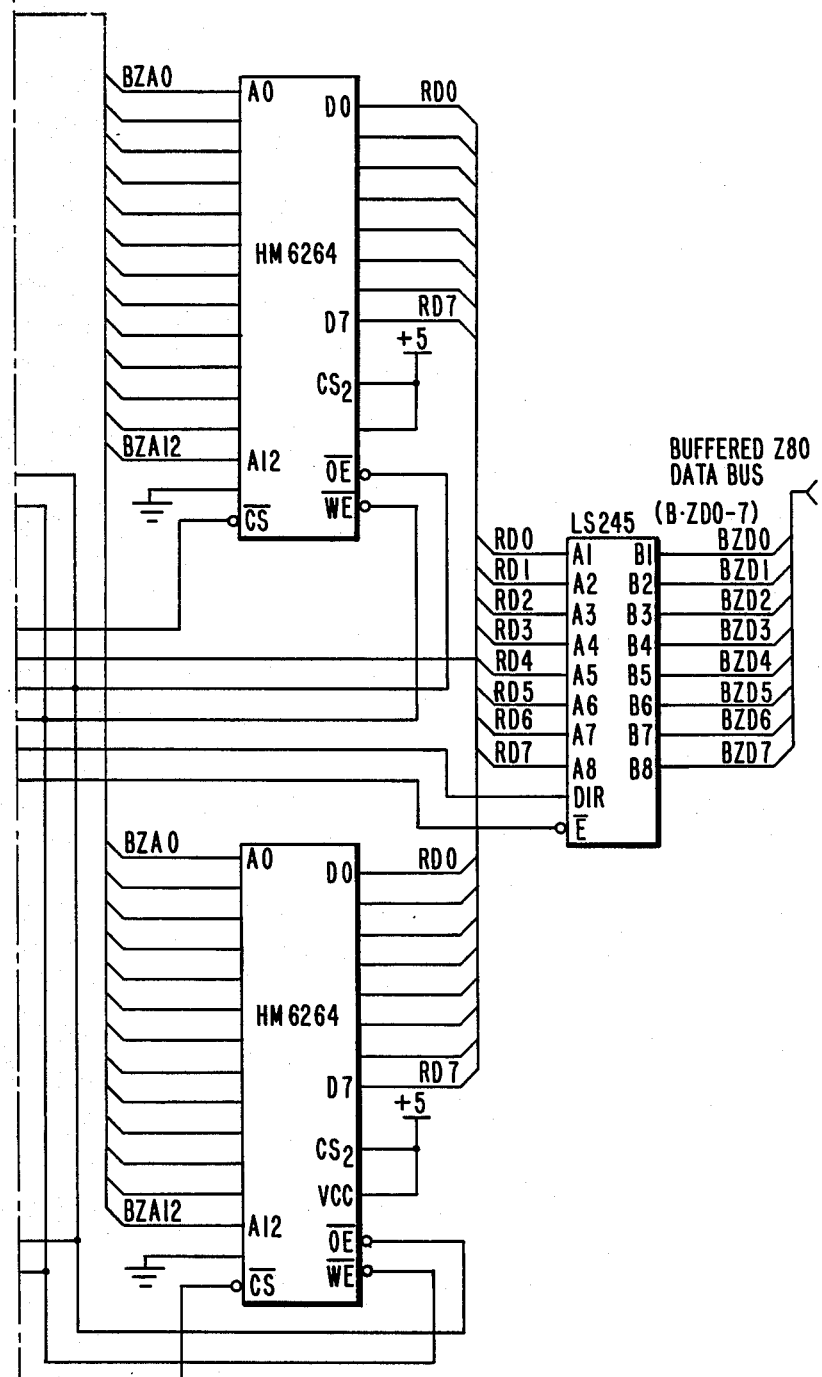
Figure 22A:
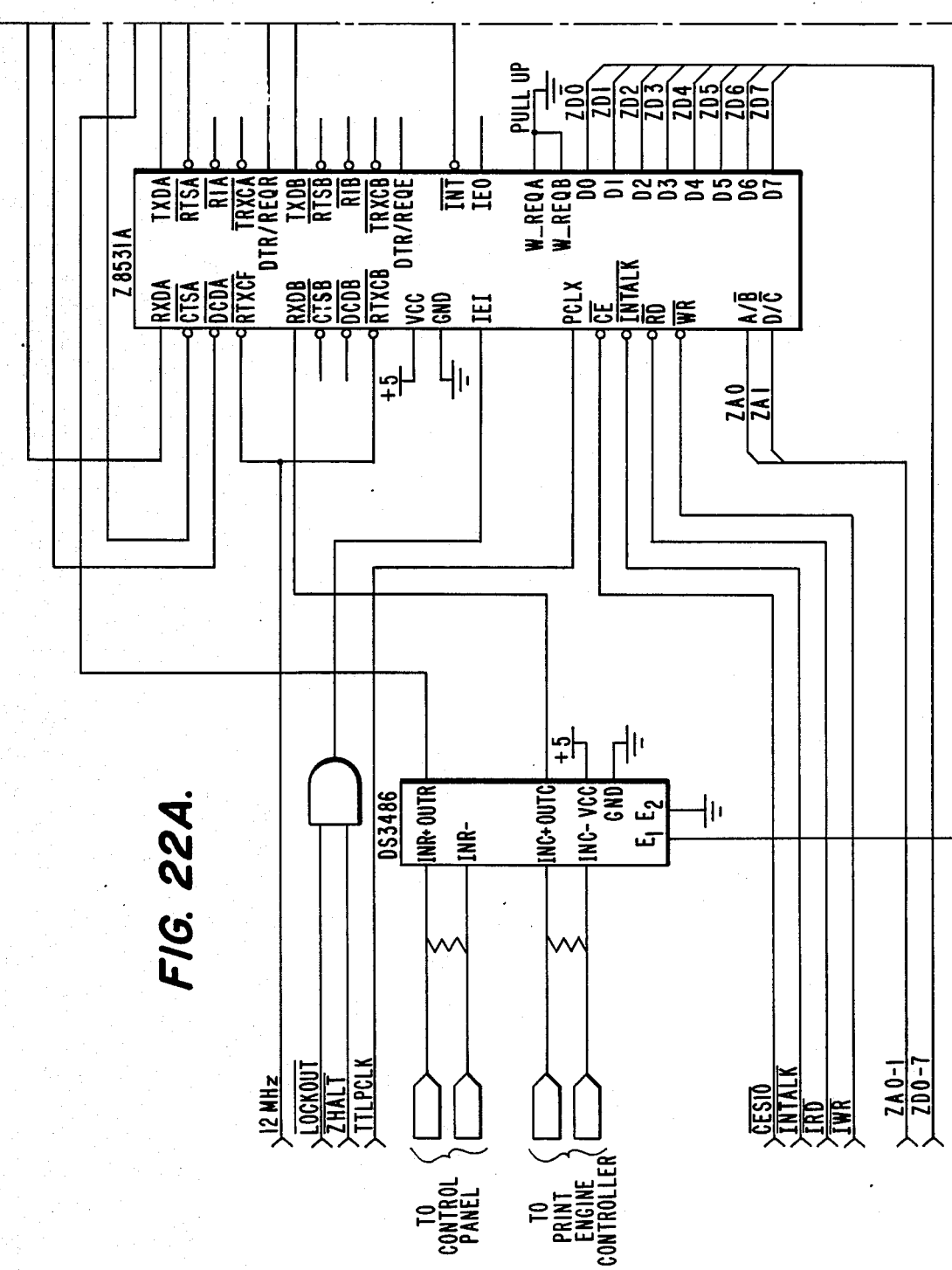
FIGS. 22A and B are a detailed schematic of the serial input/output.
Figure 22B:
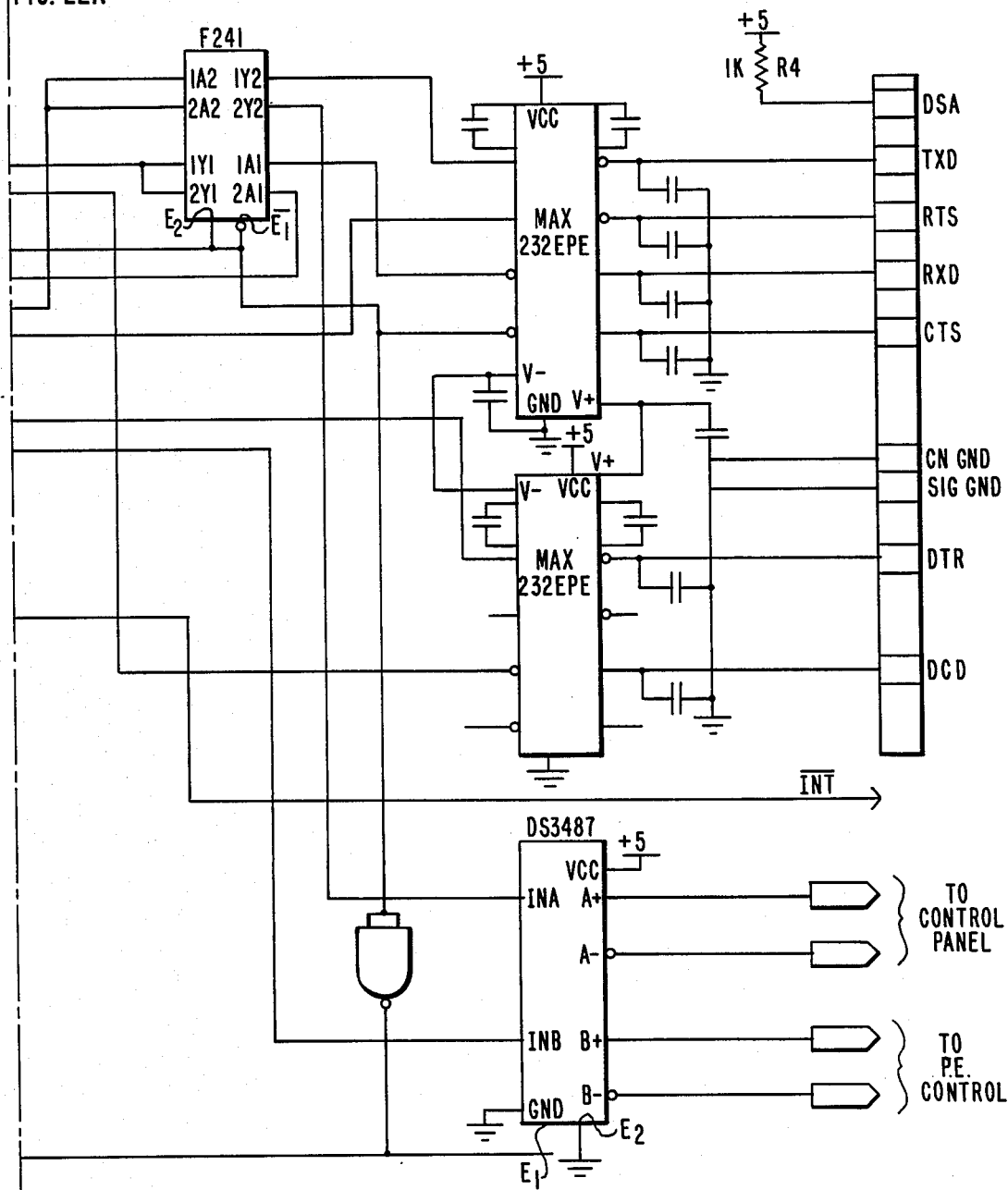
Figure 23A:
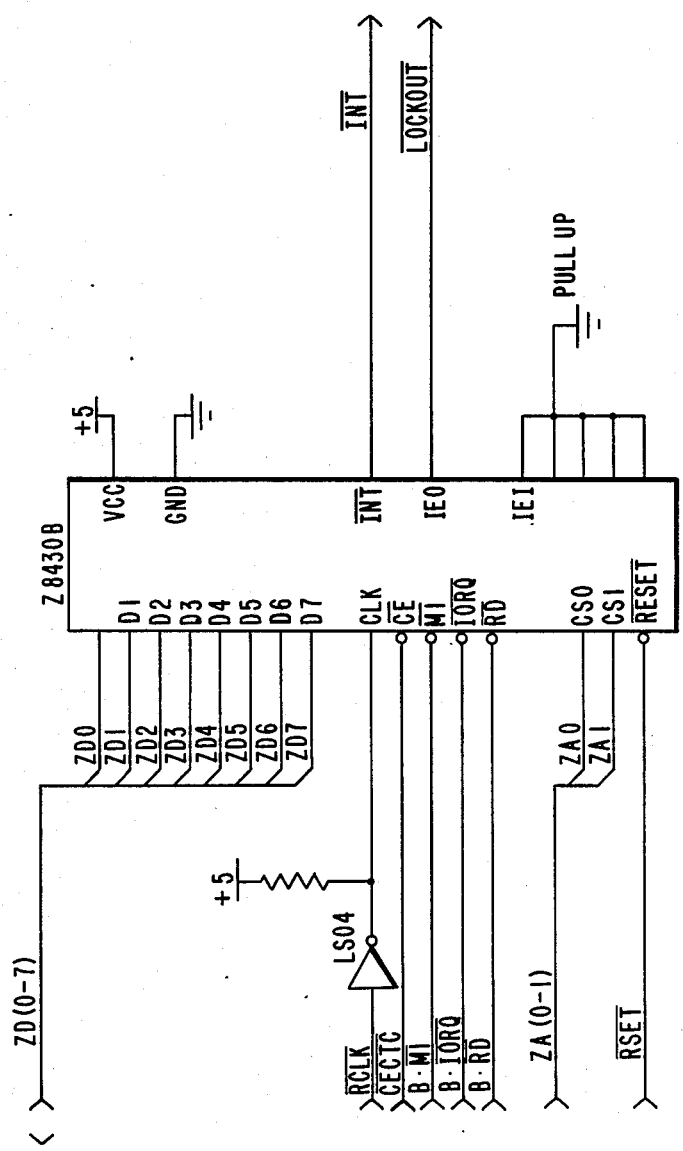
FIGS. 23A and B are a detailed schematic of the counter timer circuit.
Figure 23B:
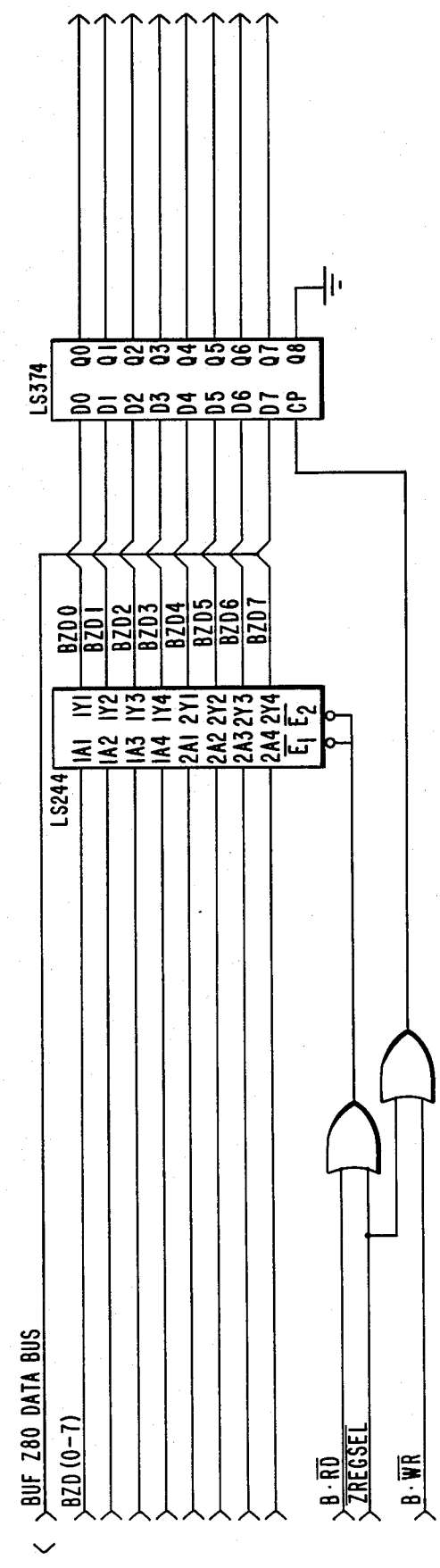
Figure 24A:
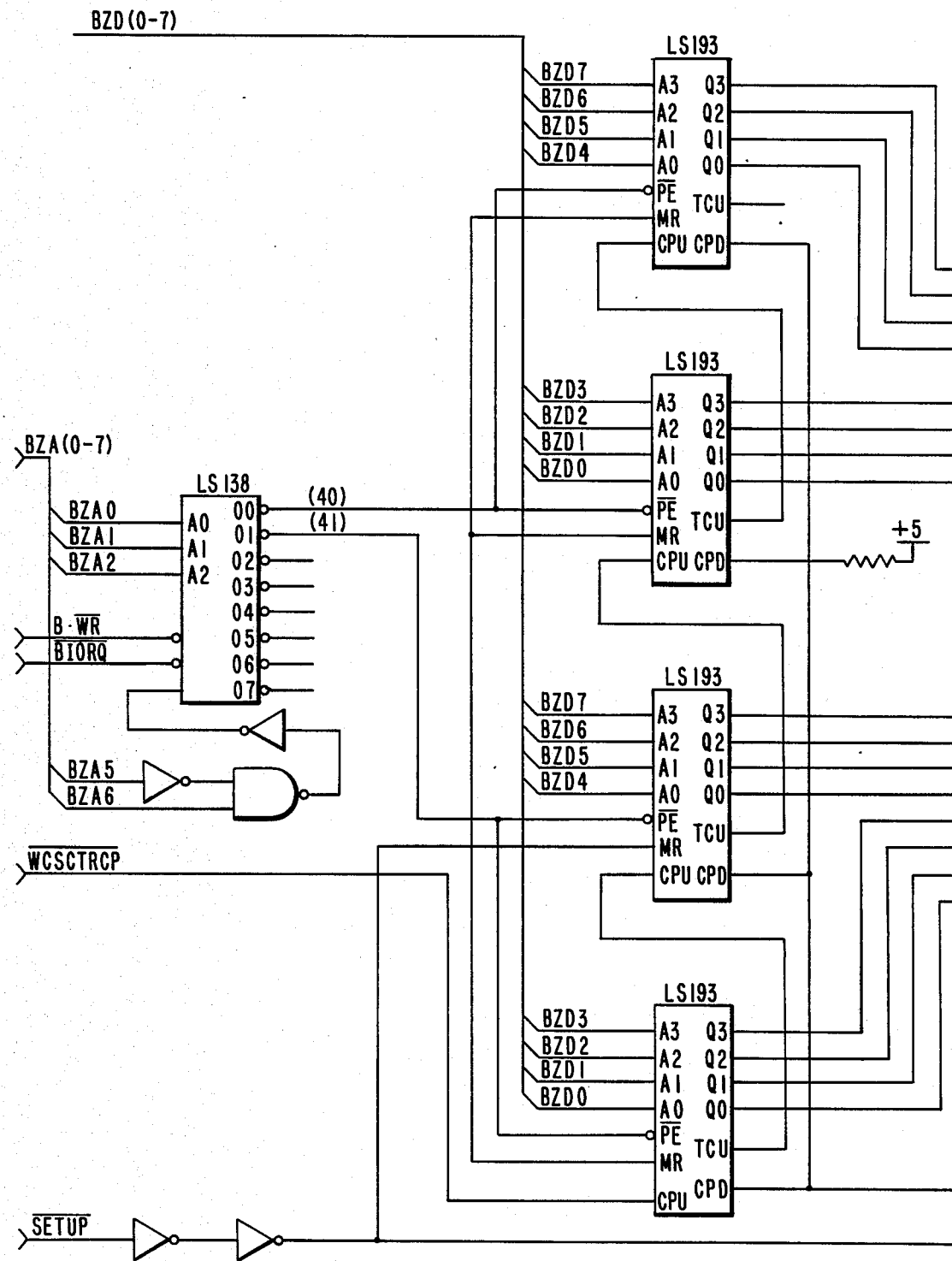
FIGS. 24A and B are a detailed schematic of the write control store address counter.
Figure 24B:
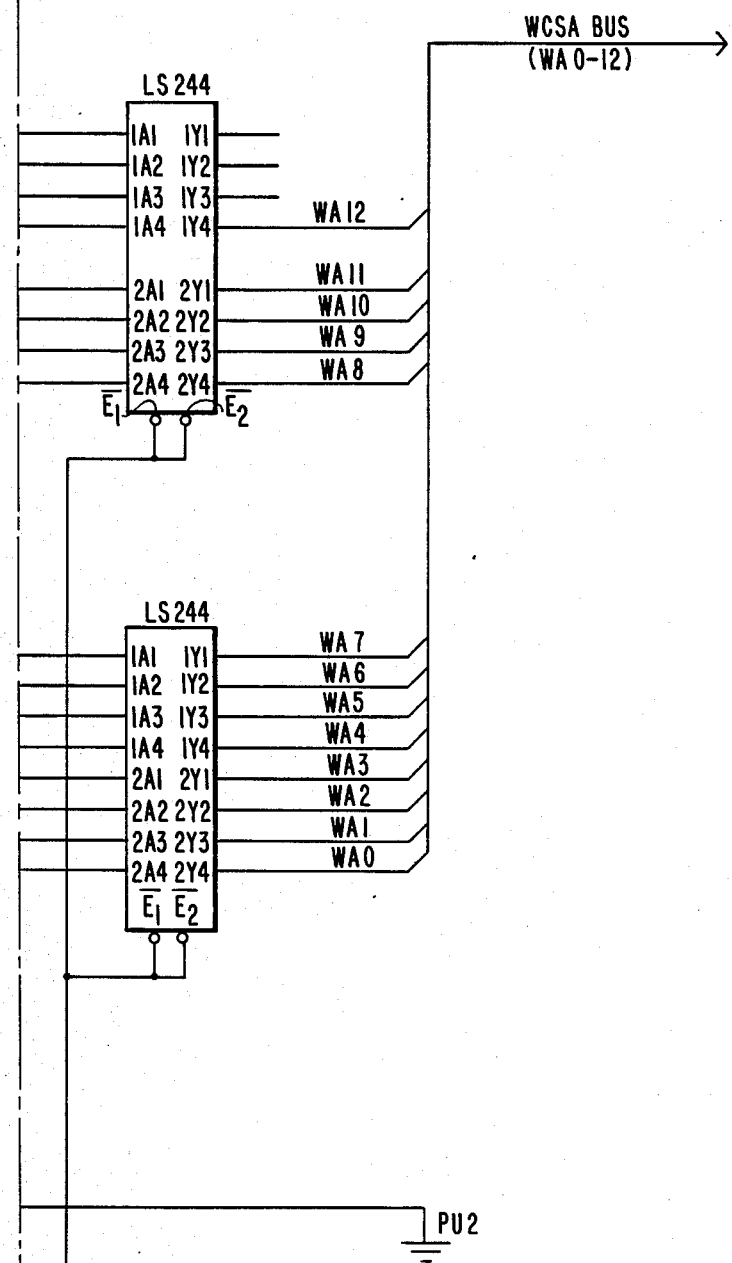
Figure 25B:
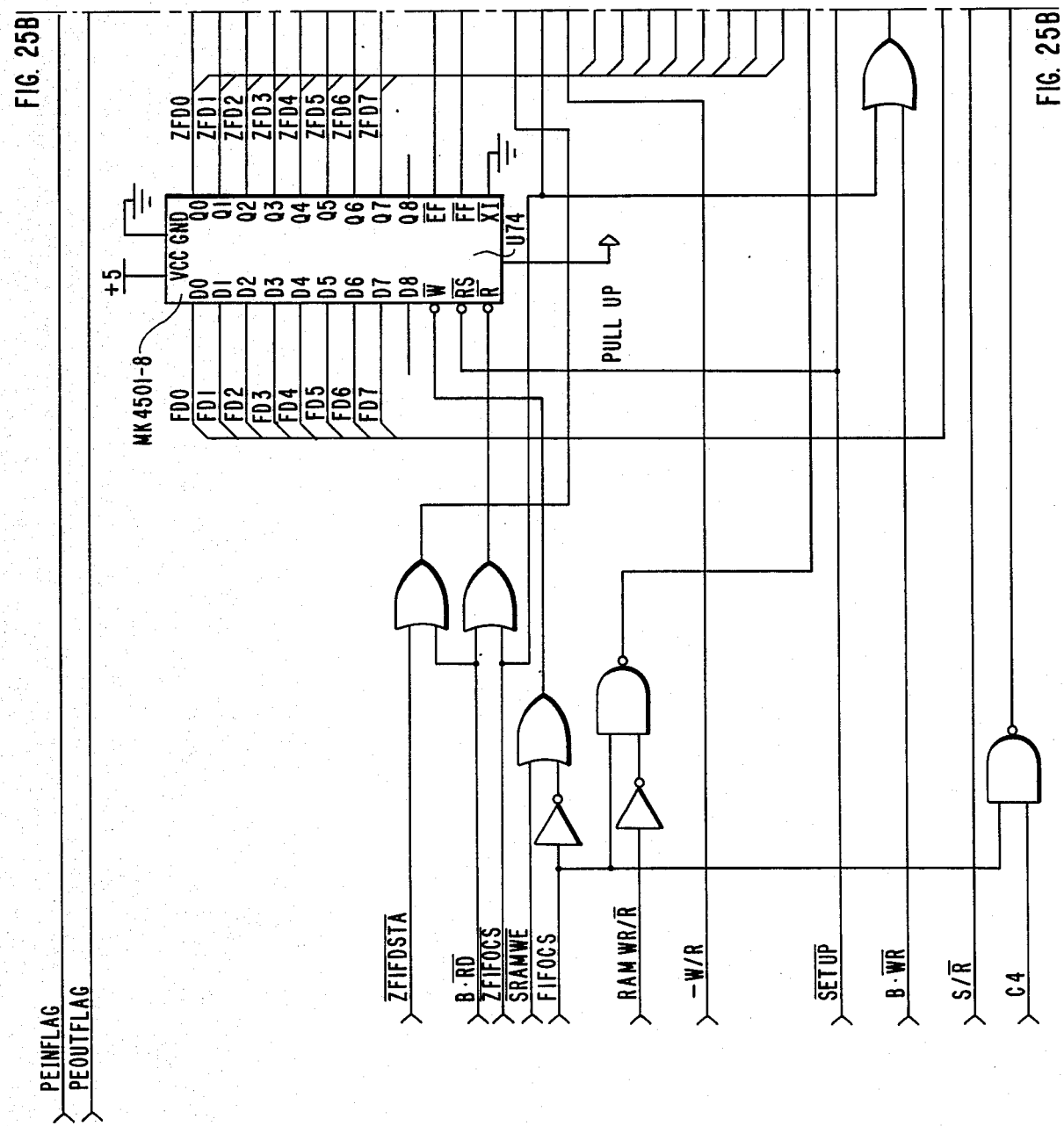
FIGS. 25A and B are a detailed schematic of the interface between the main processing unit and processing unit controlling the disk unit.
Figure 25B:
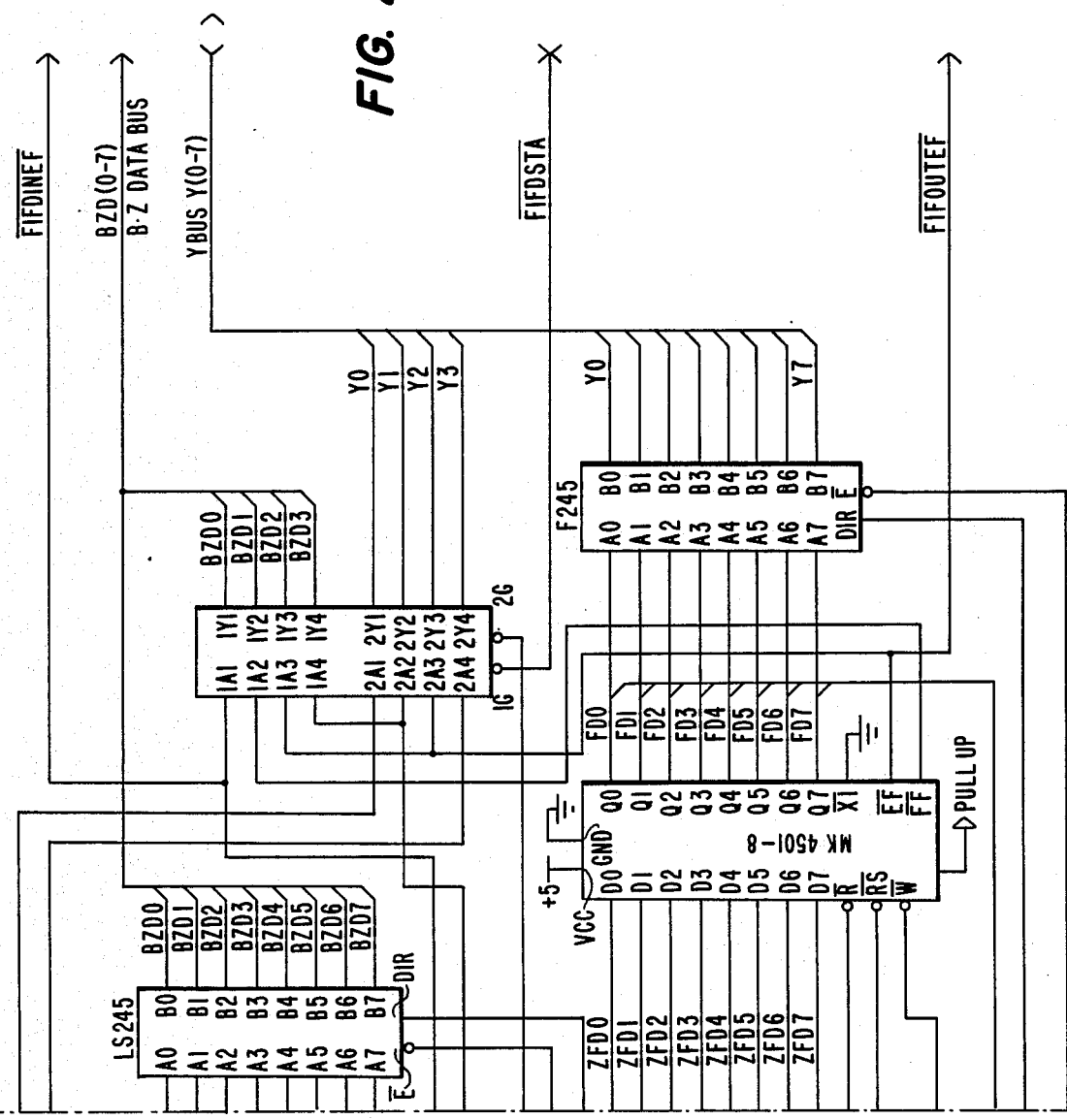
Figure 26A:
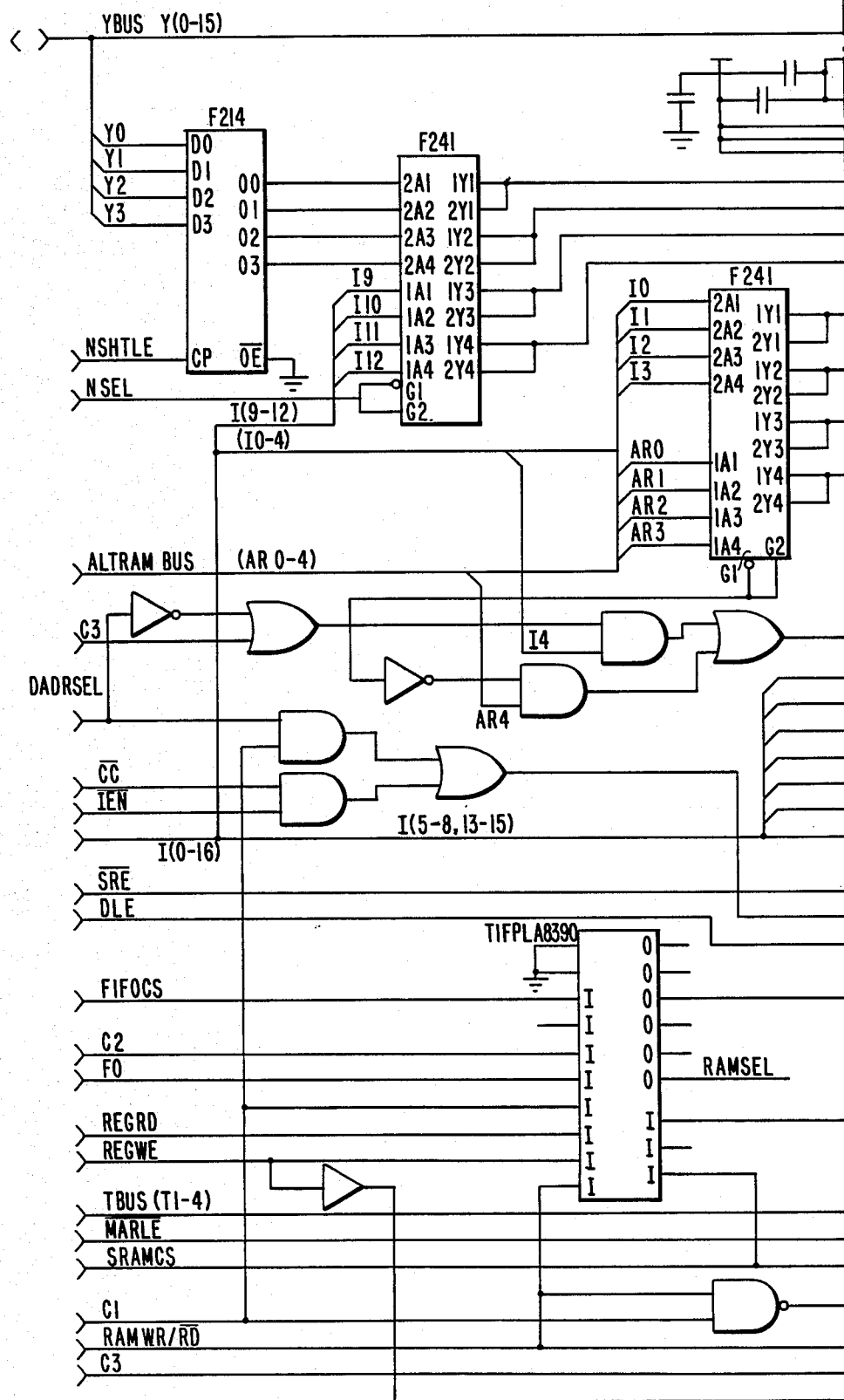
FIGS. 26A-C and 27A and B are a detailed schematic of the controller for the arithmetic logic unit of the main processing unit.
Figure 26B:
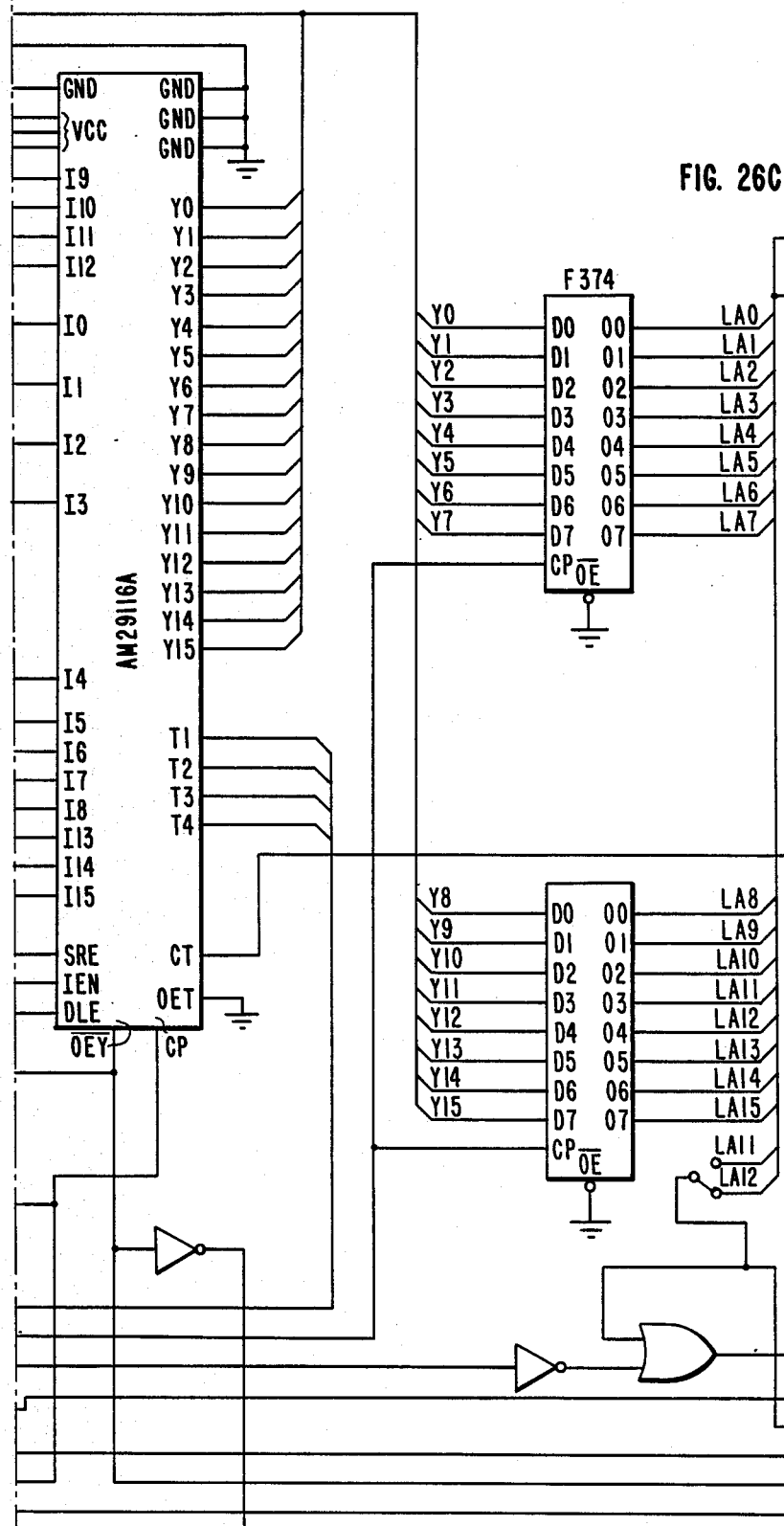
Figure 26C:
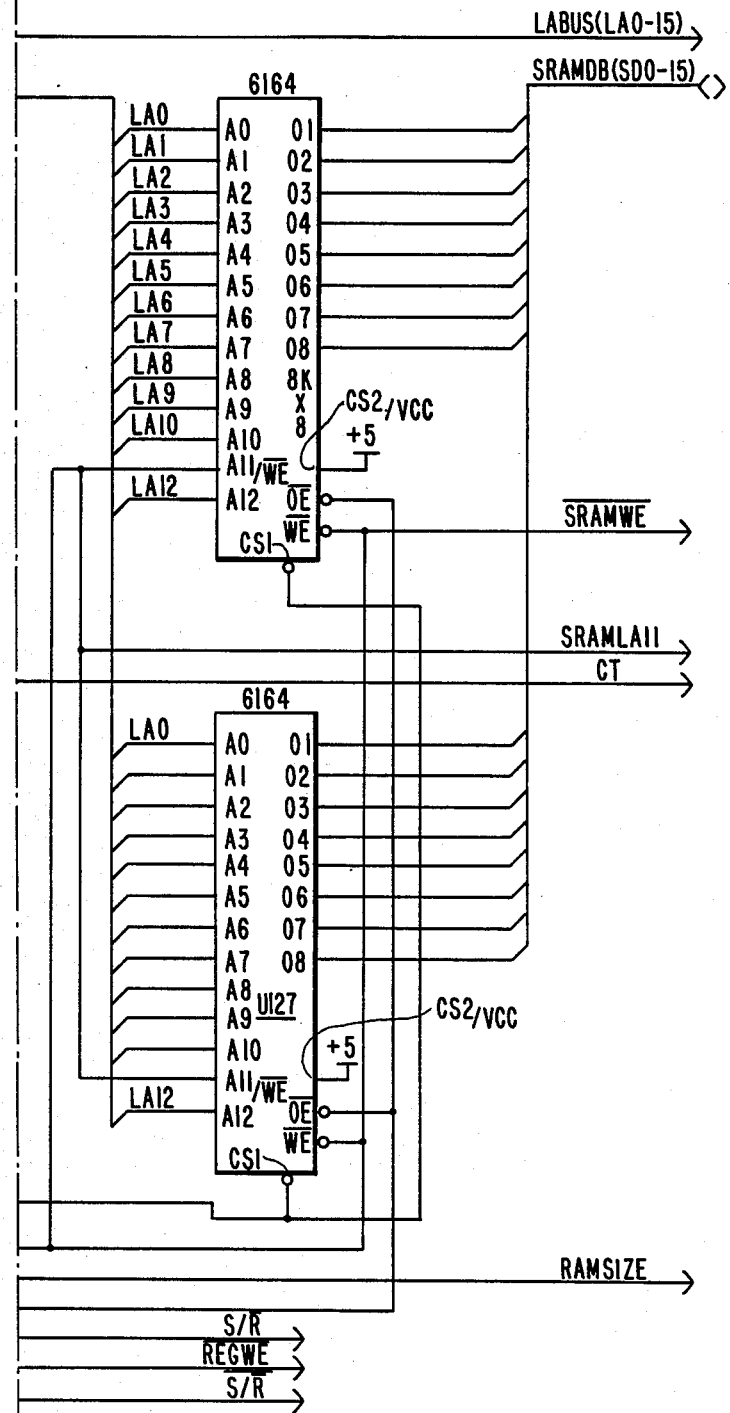
Figure 27A:
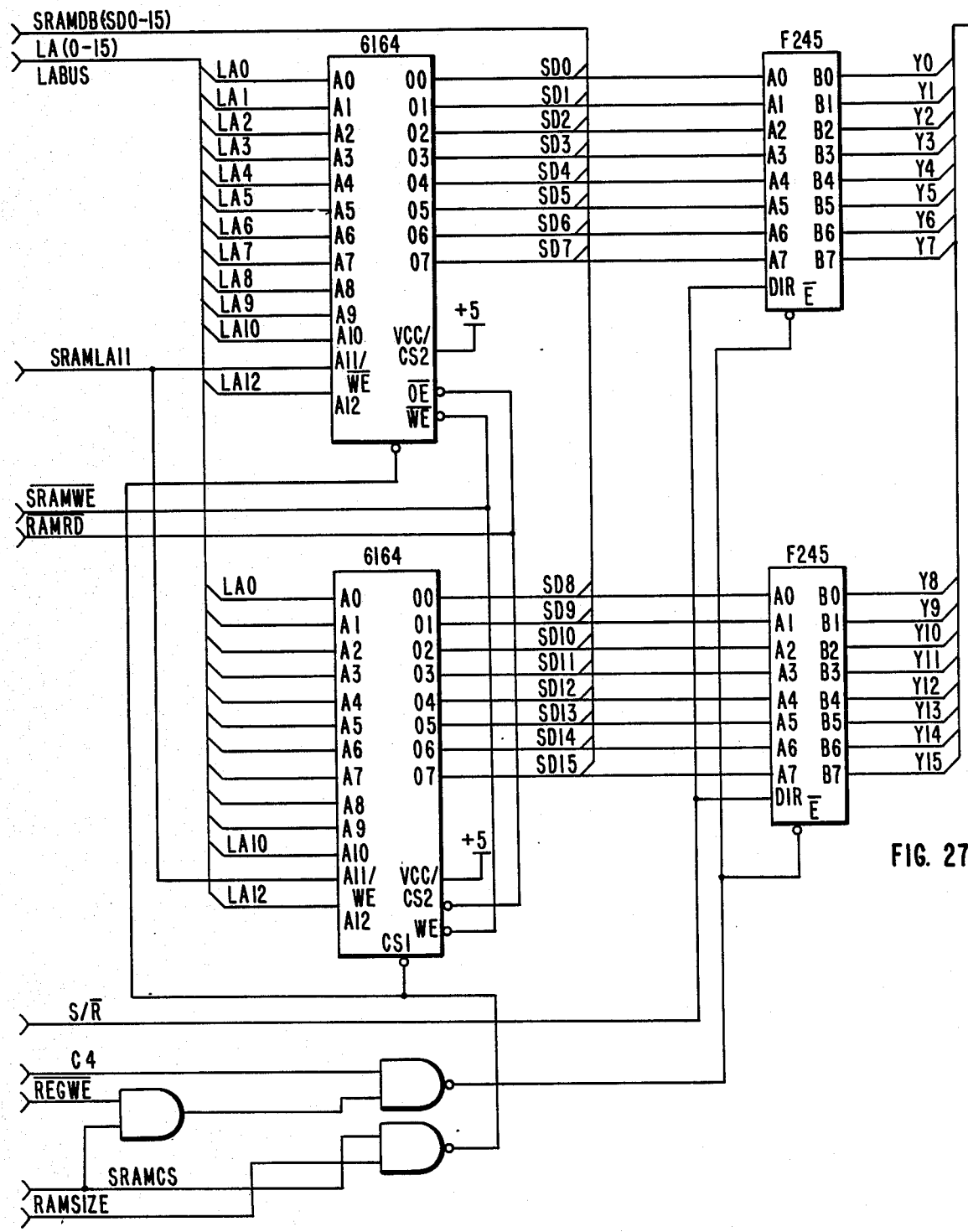
Figure 27B:
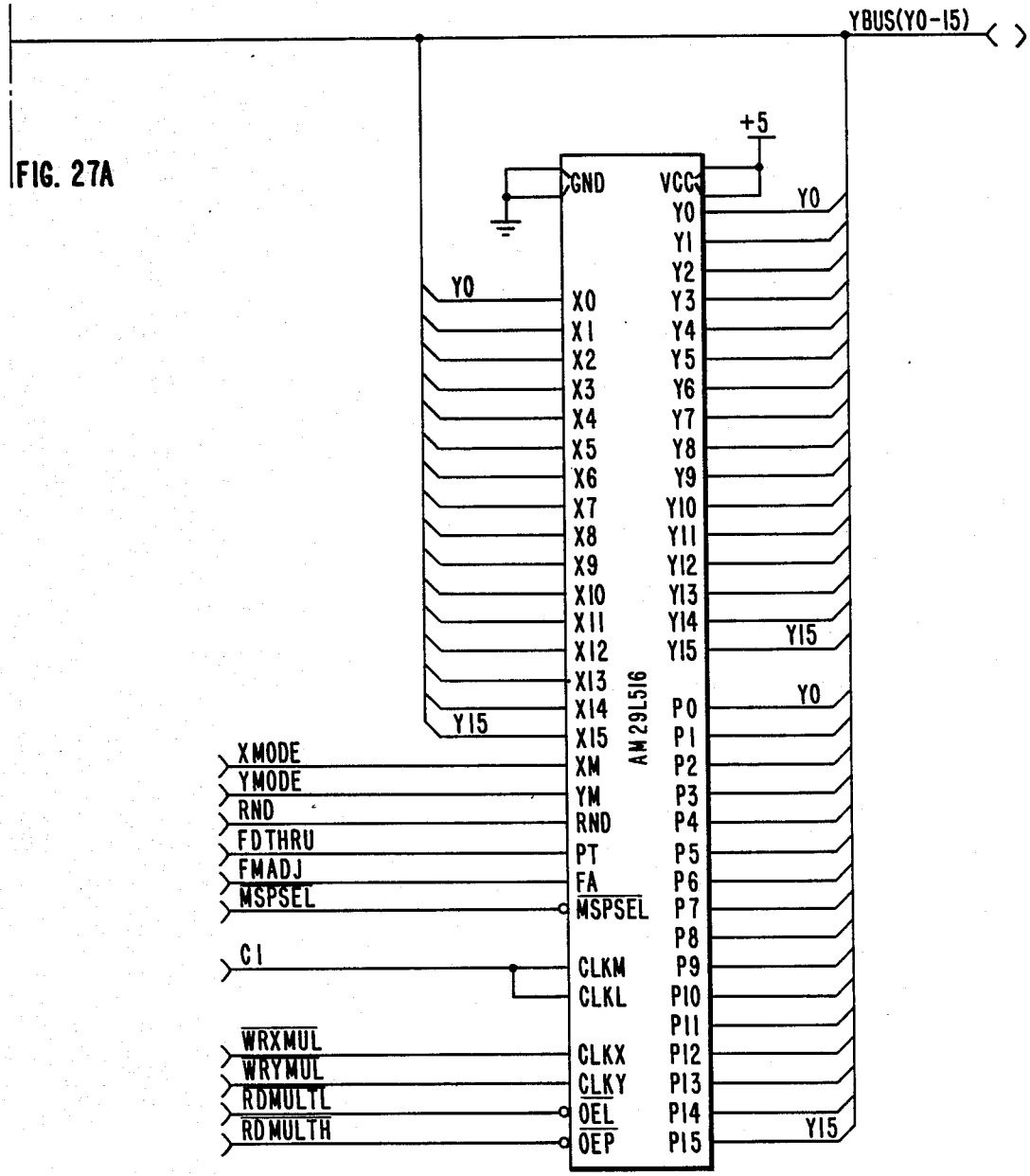
Figures 28A, 28B:
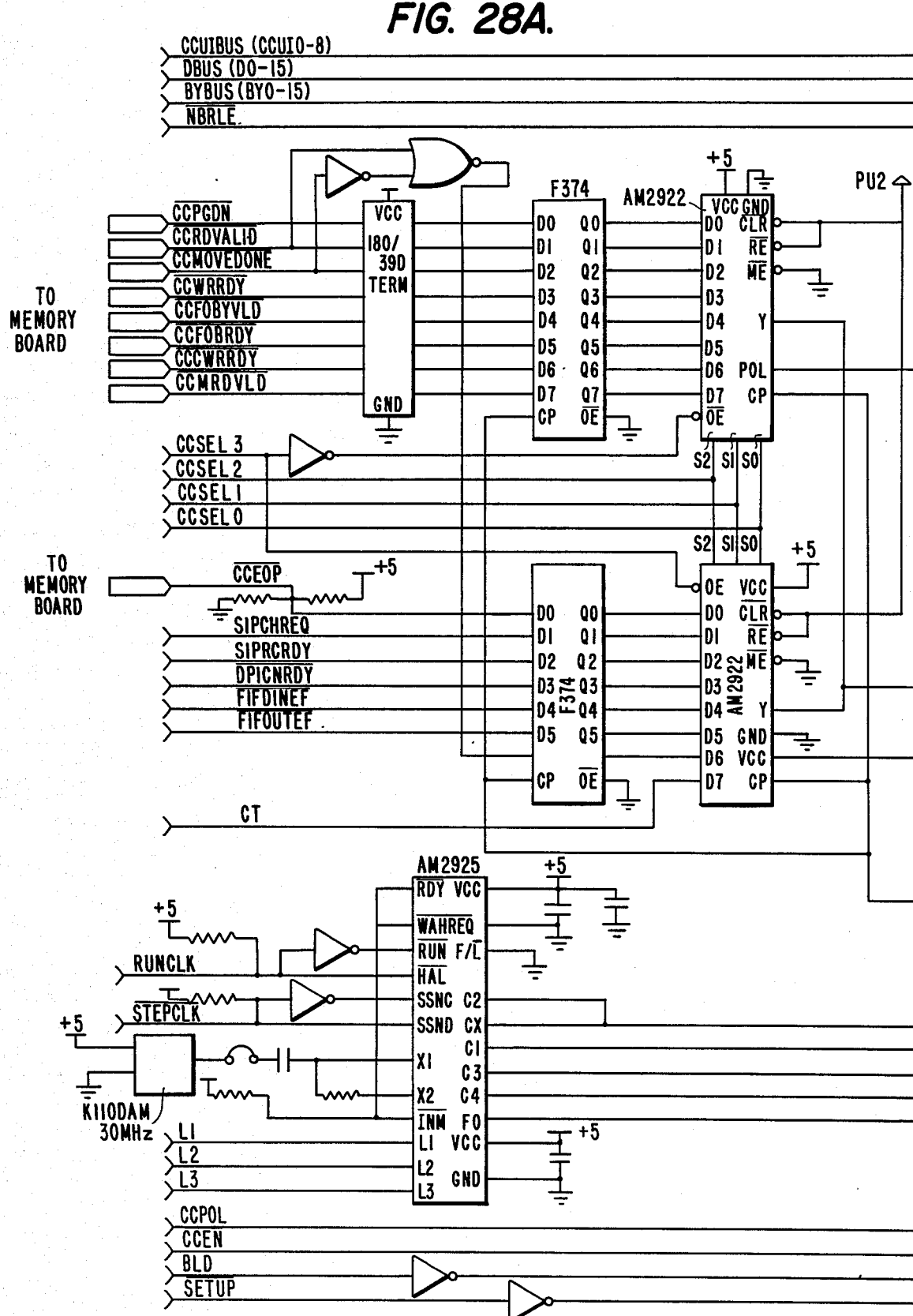
FIGS. 28A and B are a detailed schematic of the sequence clock and condition code multiplexer.
Figure 29A:
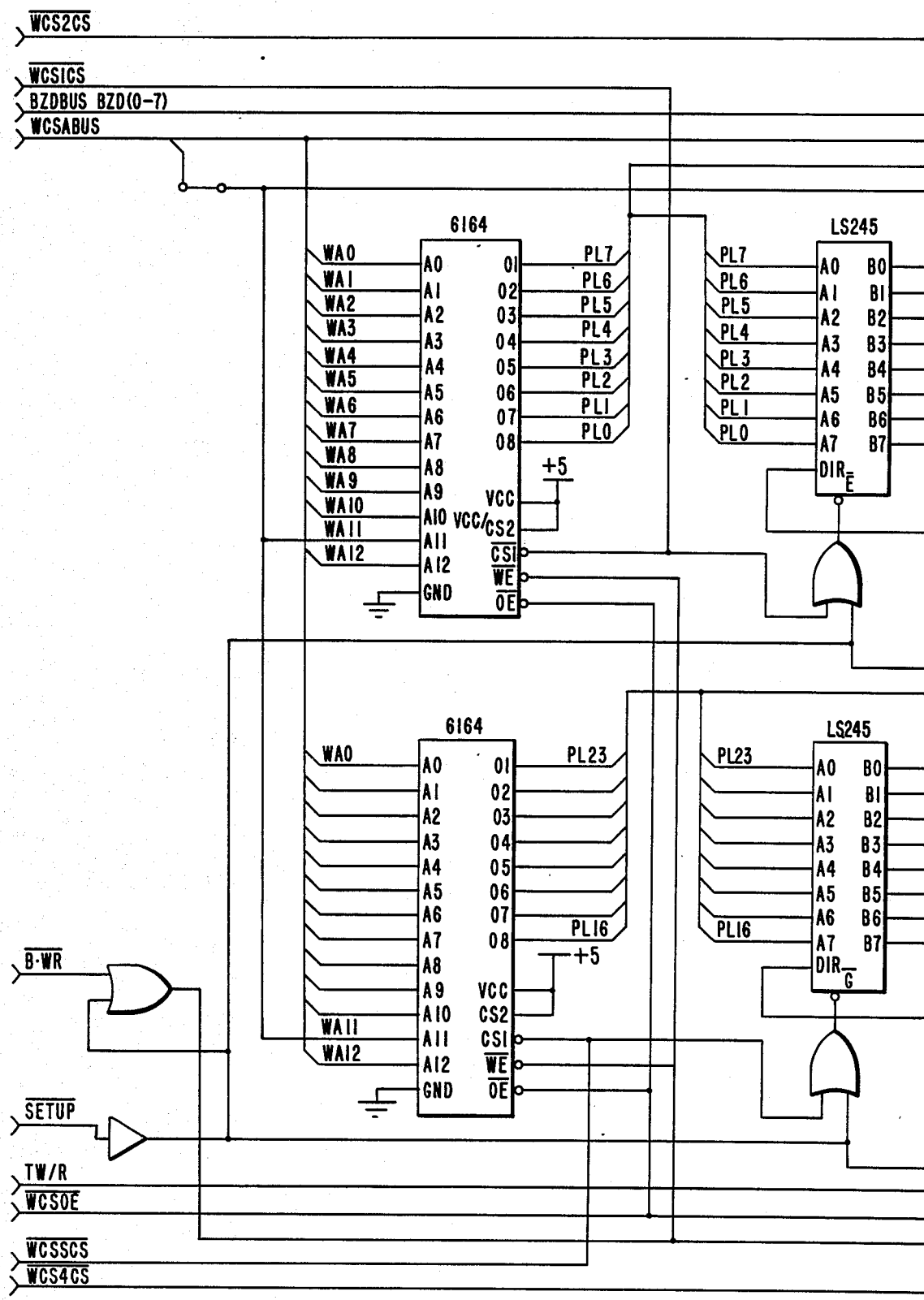
FIGS. 29A and B, 30A and B and 31 are a detailed schematic of the controller for the write control data random access memory.
Figure 29B:
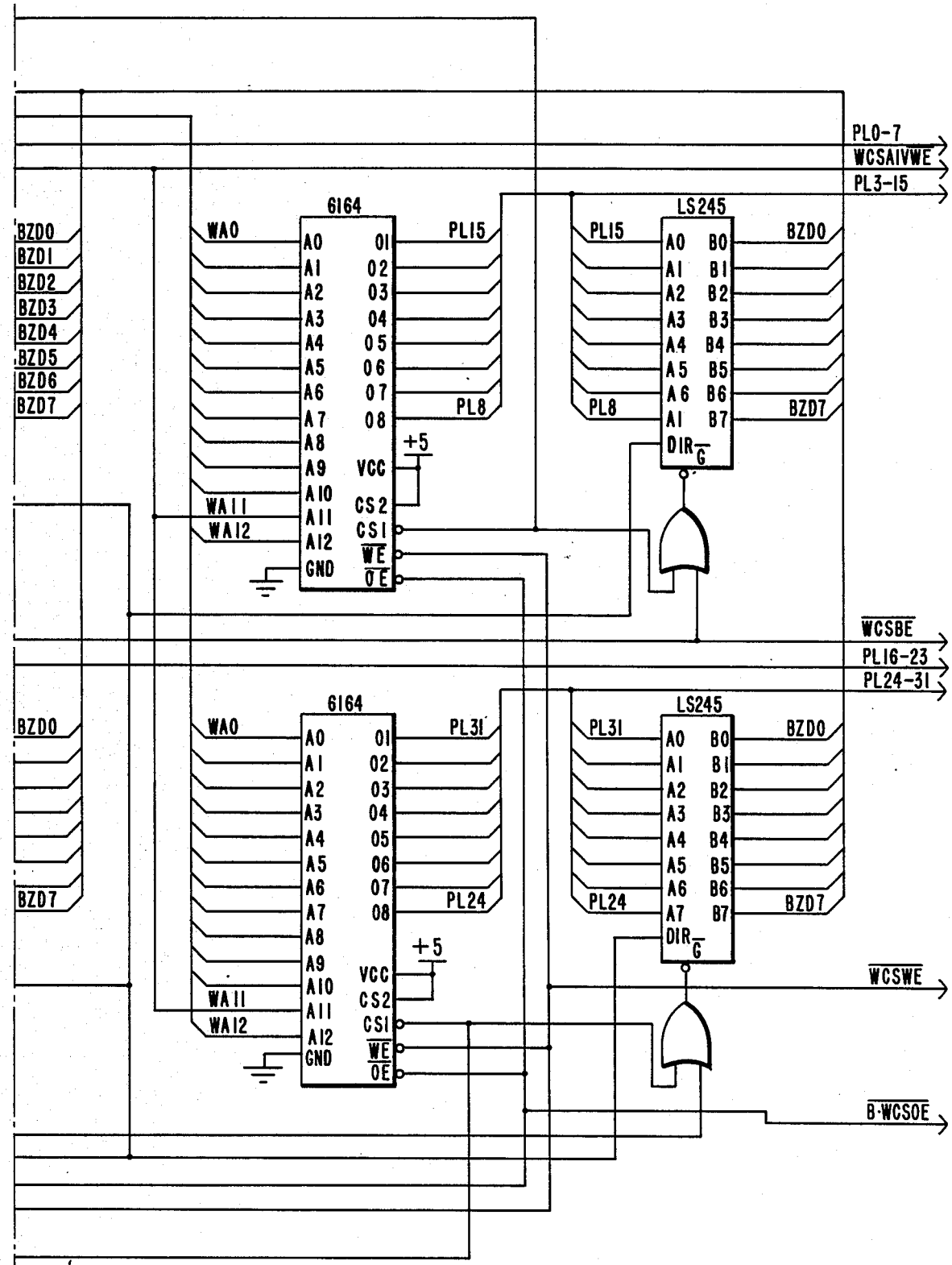
Figure 30A:
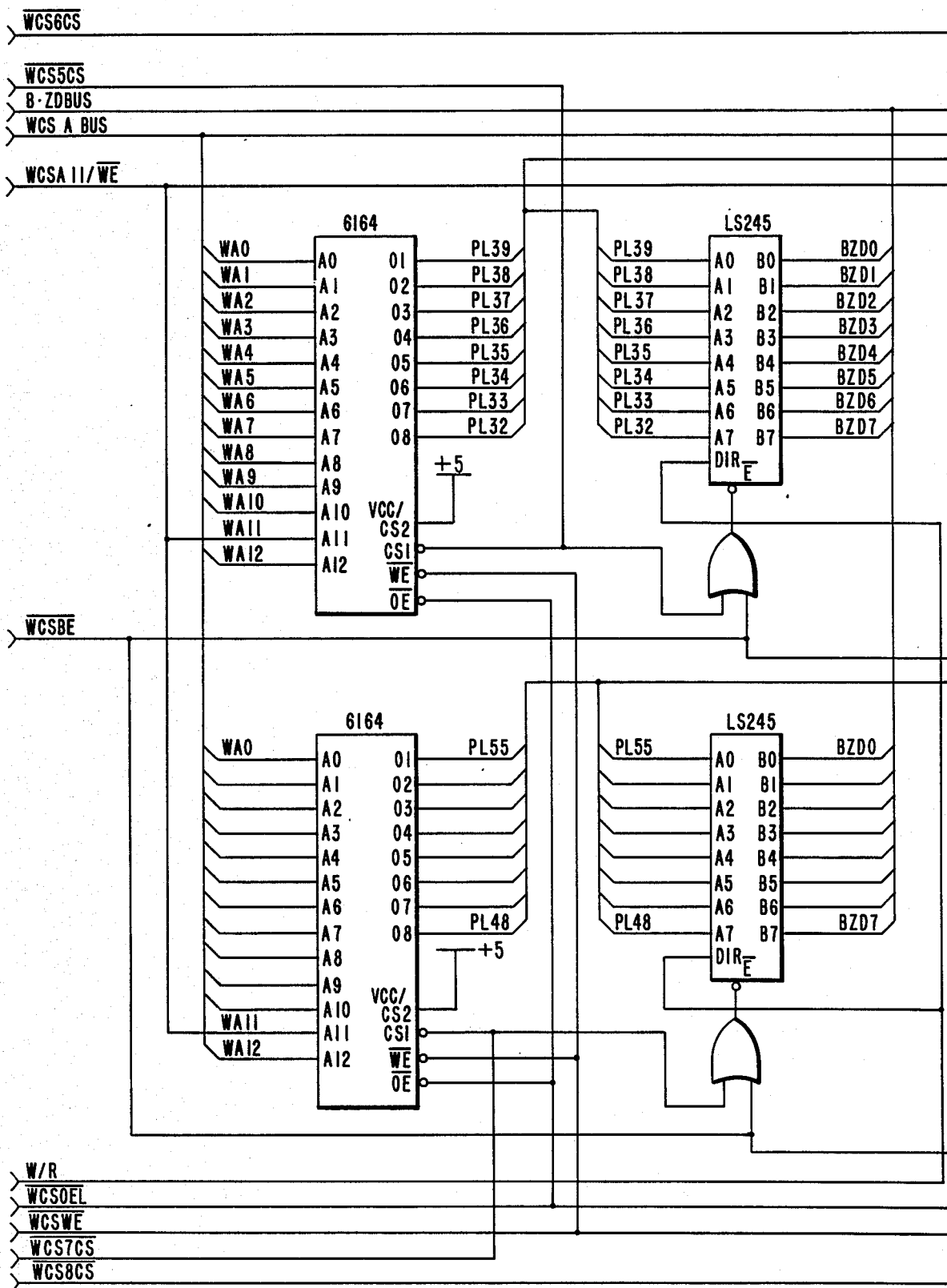
Figure 30B:
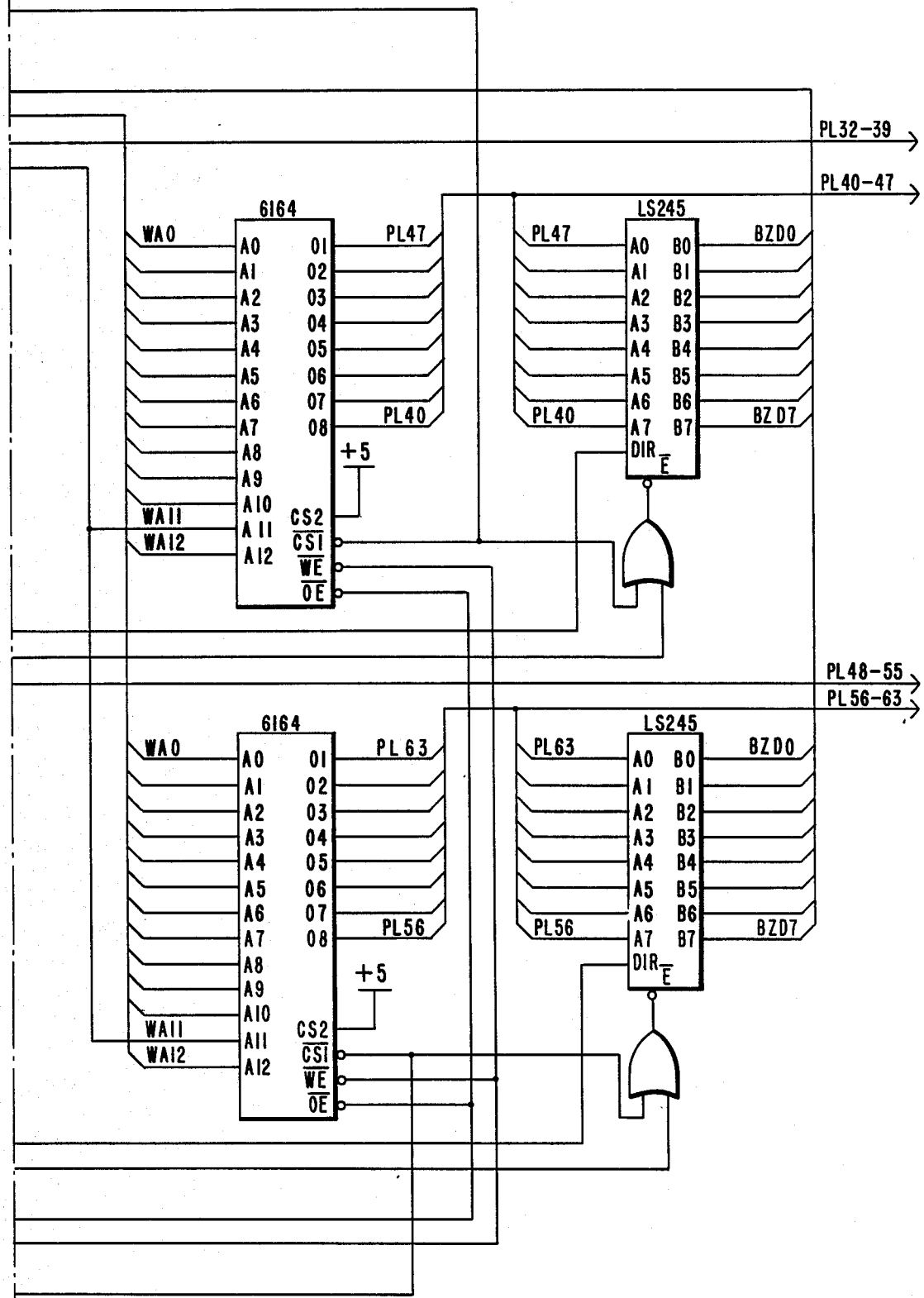
Figure 31:
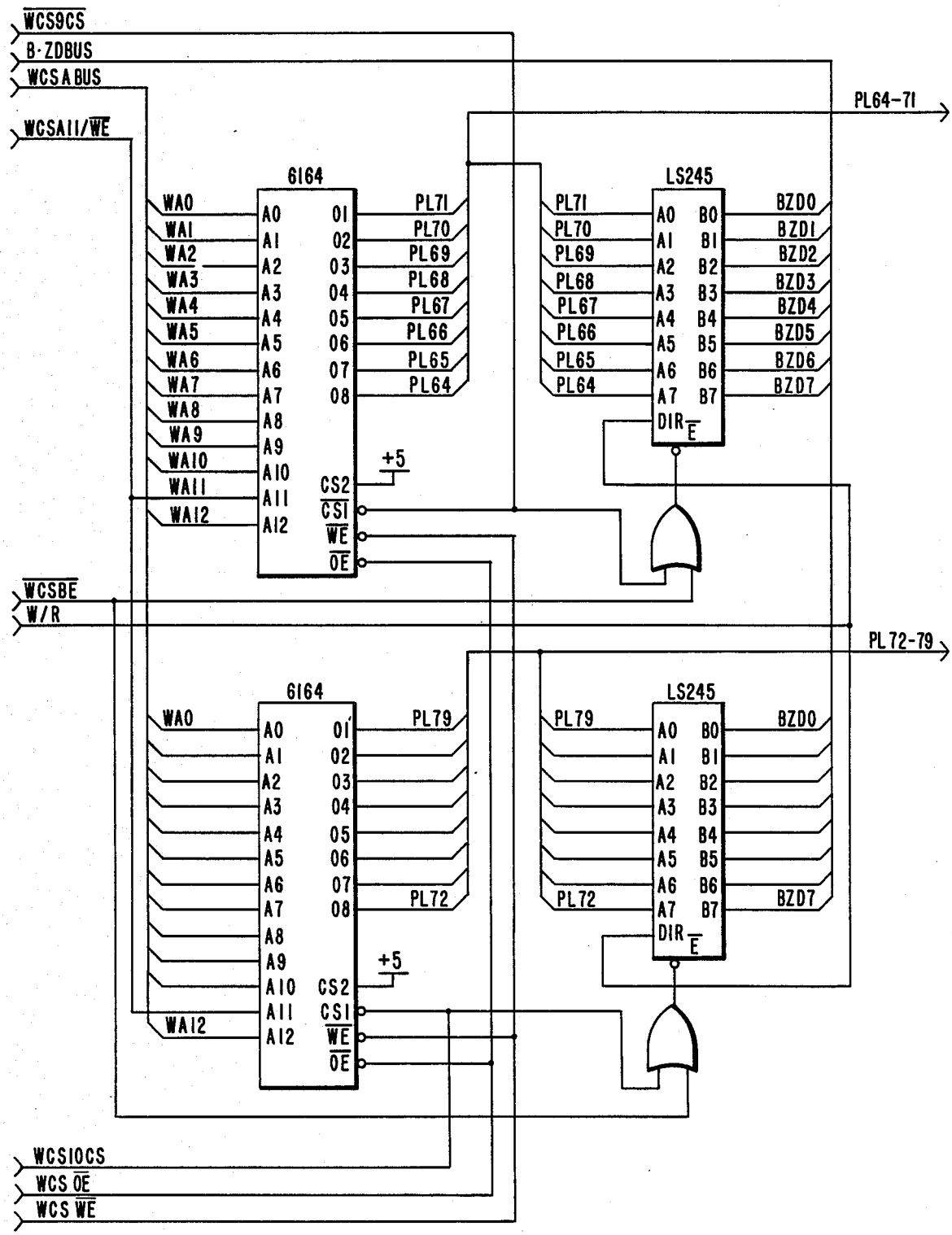
Figure 32B:
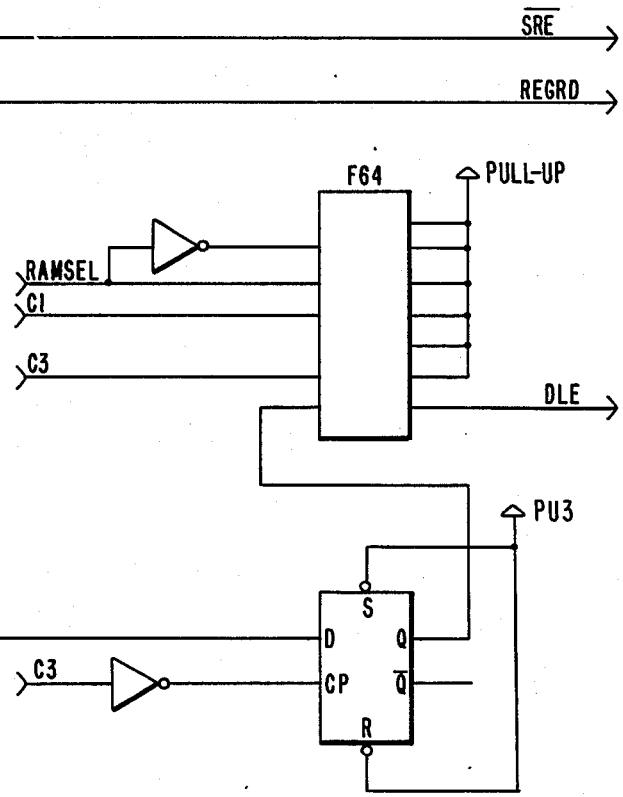
FIGS. 32A and B are a detailed schematic of the controller for the register read enable.
Figure 33A:
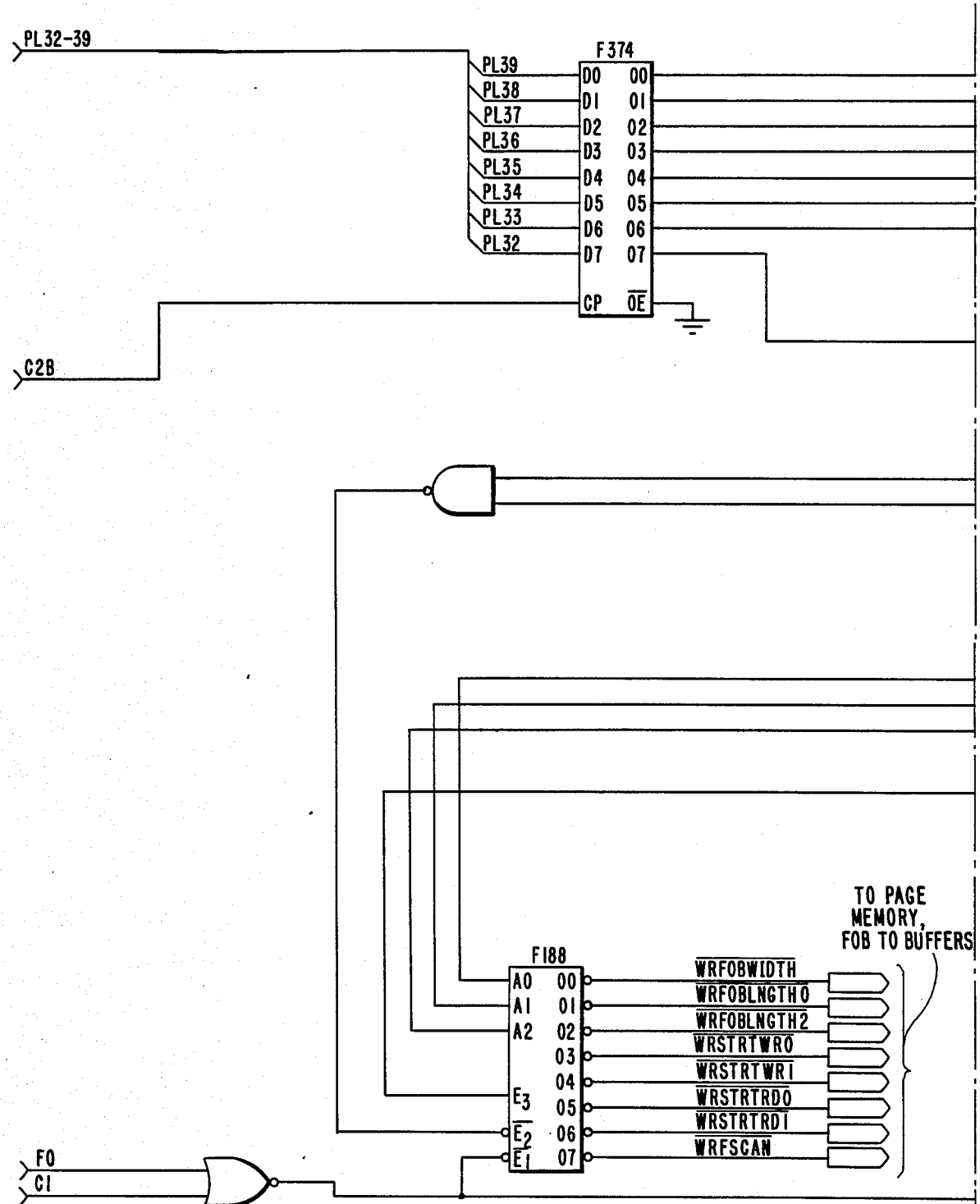
FIGS. 33A and B are a detailed schematic of the controller for the register write enable.
Figure 33B:
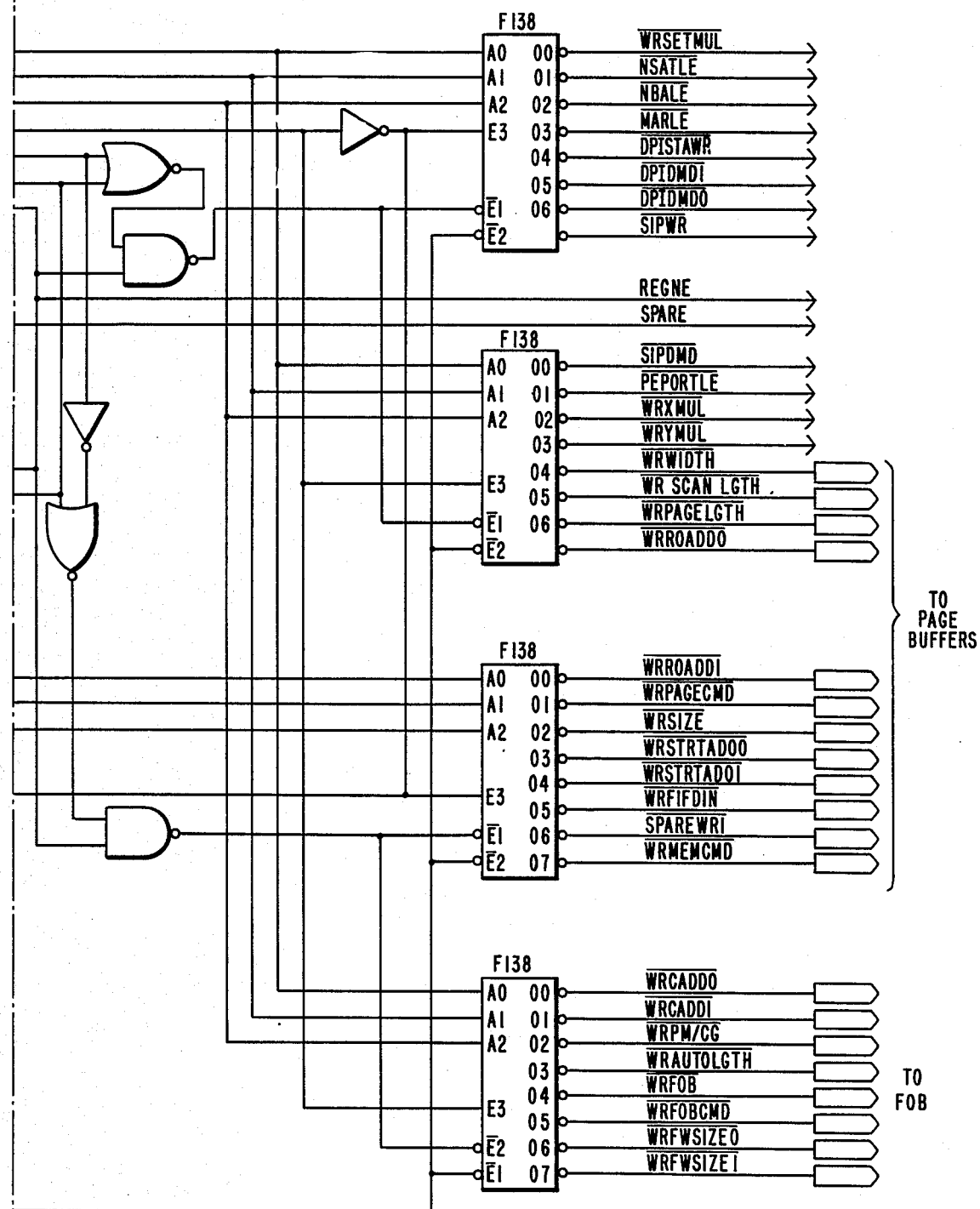
Figure 34A:
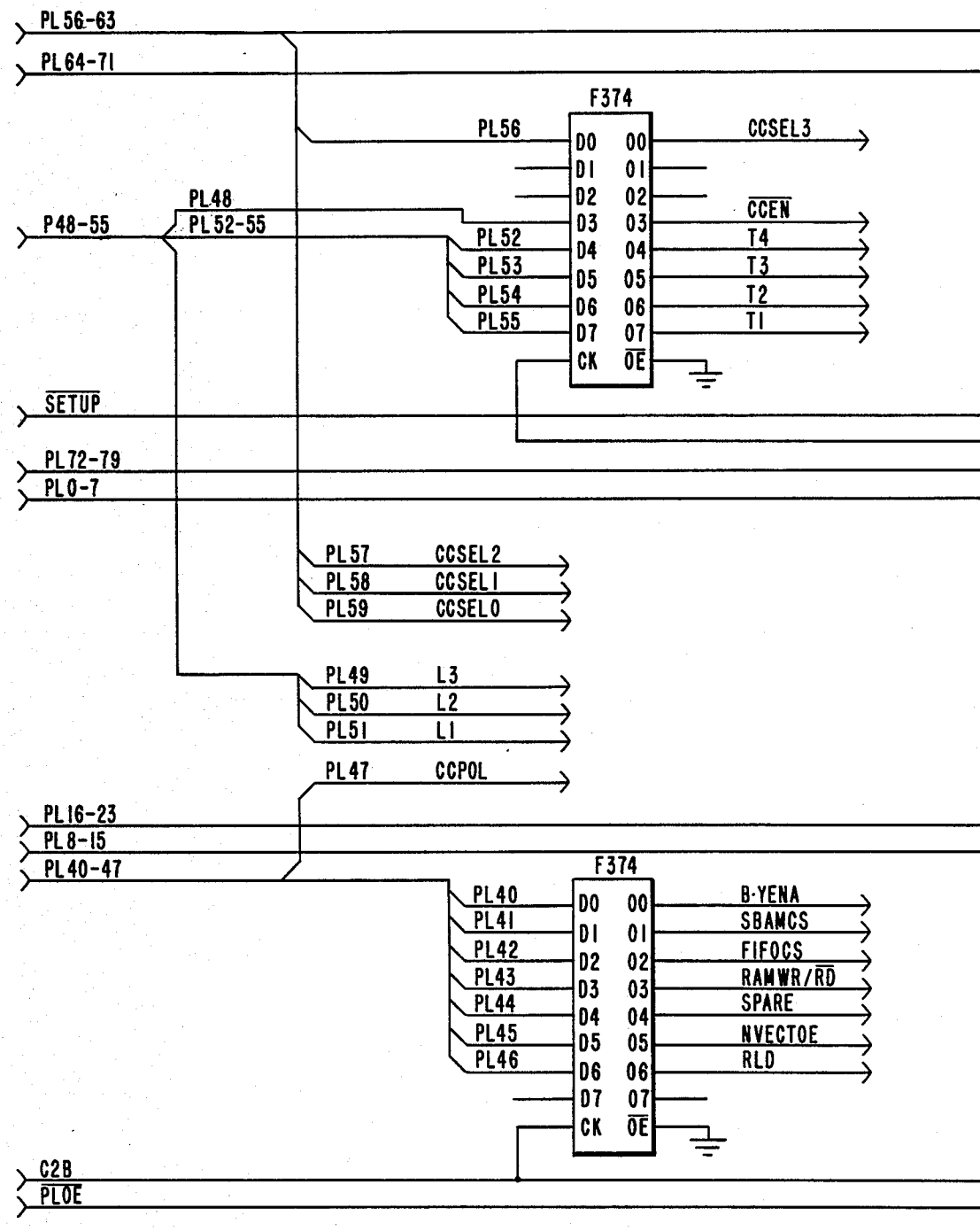
FIGS. 34A and B are a detailed schematic of the pipeline register.
Figure 34B:
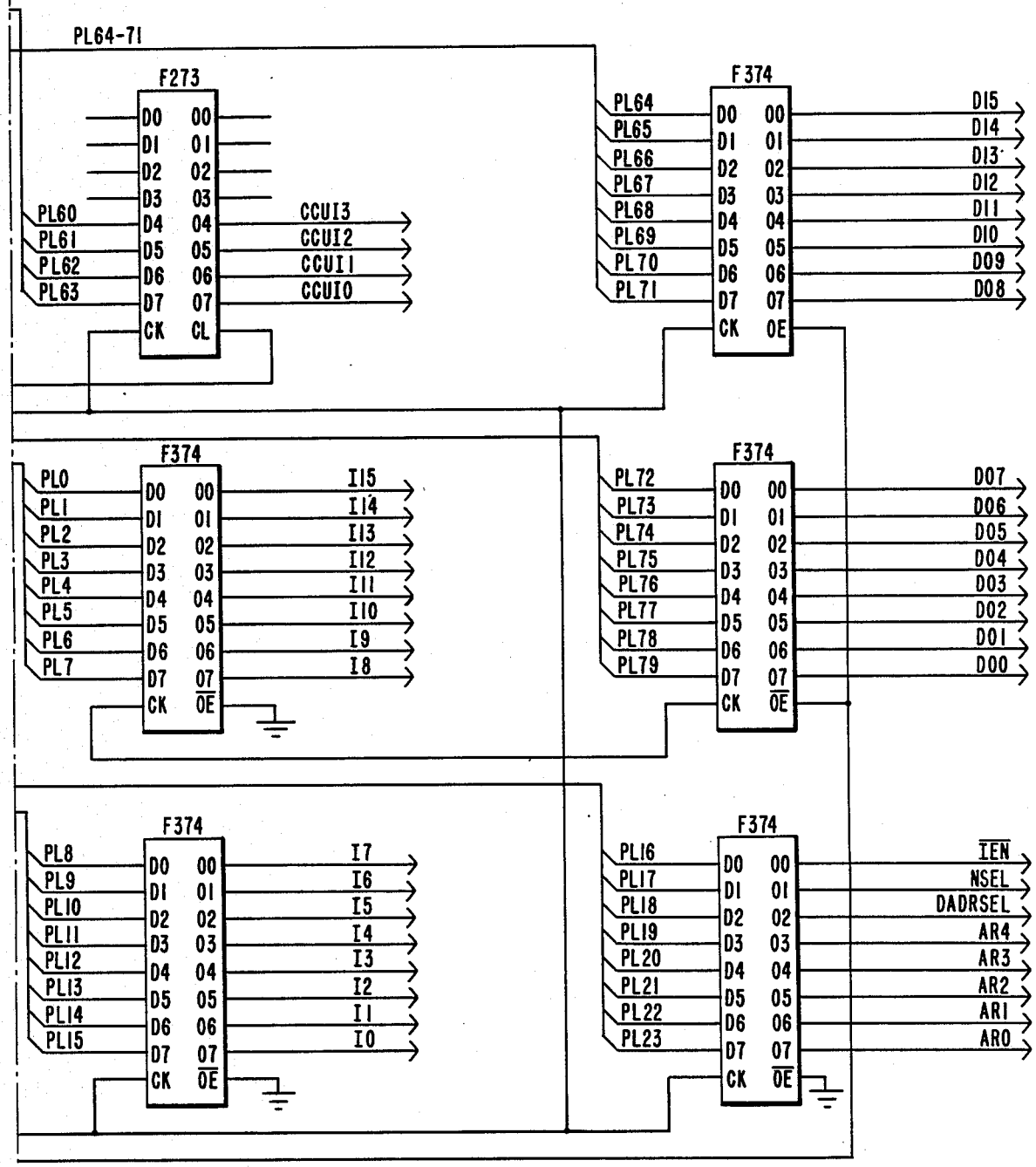
Figure 35A:
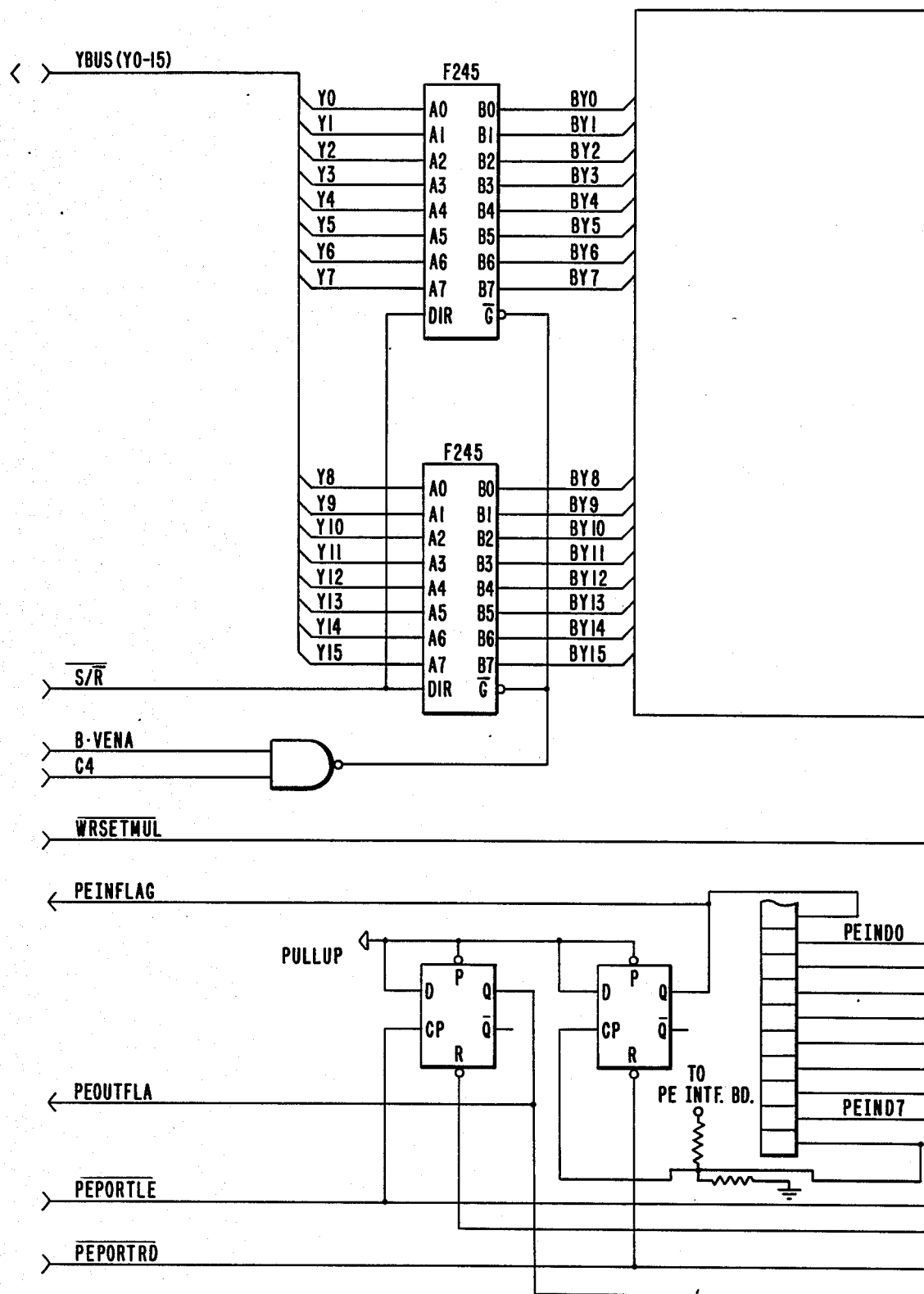
FIGS. 35A and B are a detailed schematic diagram of the data bus buffer.
Figure 35B:
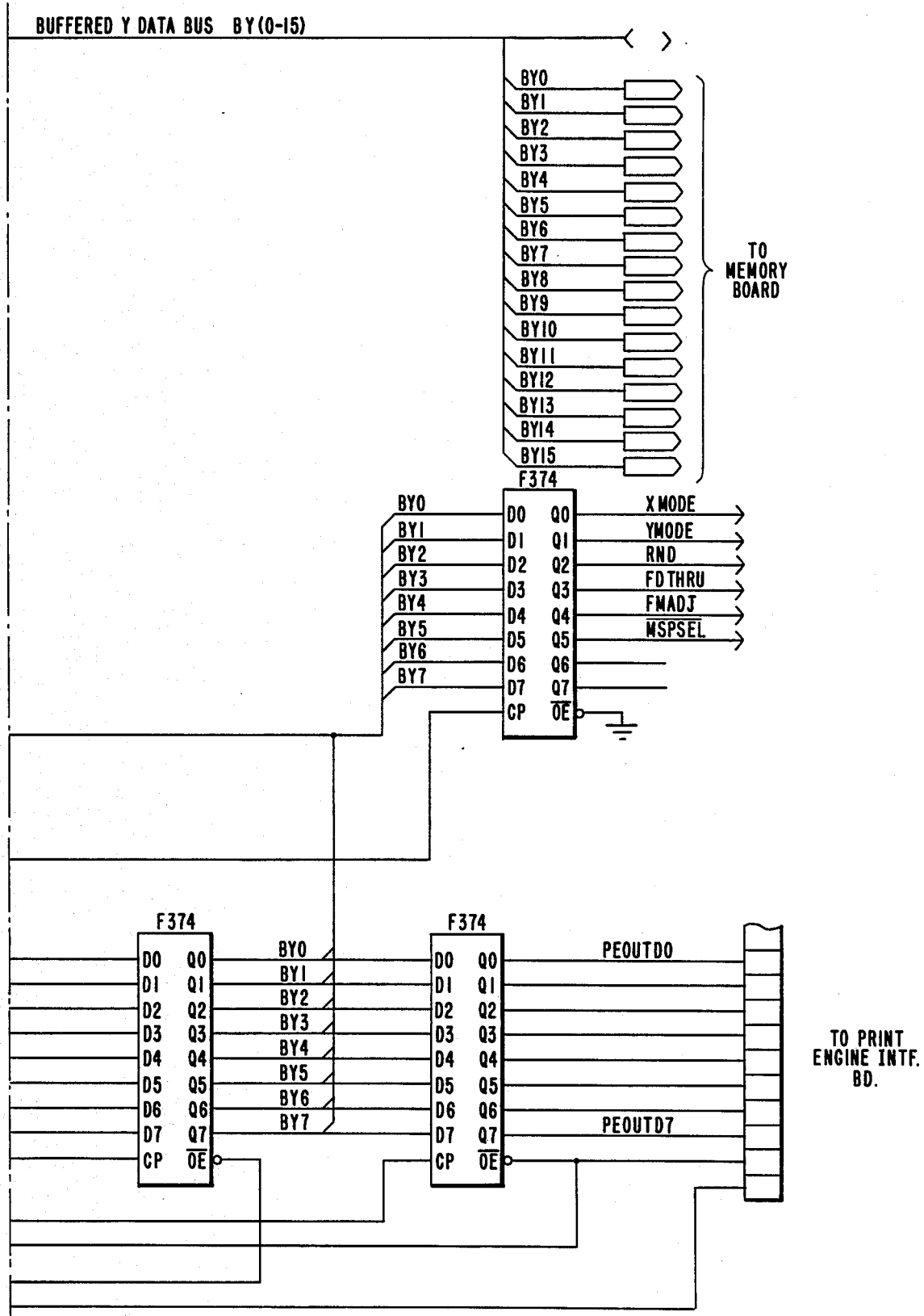
Figure 36A:
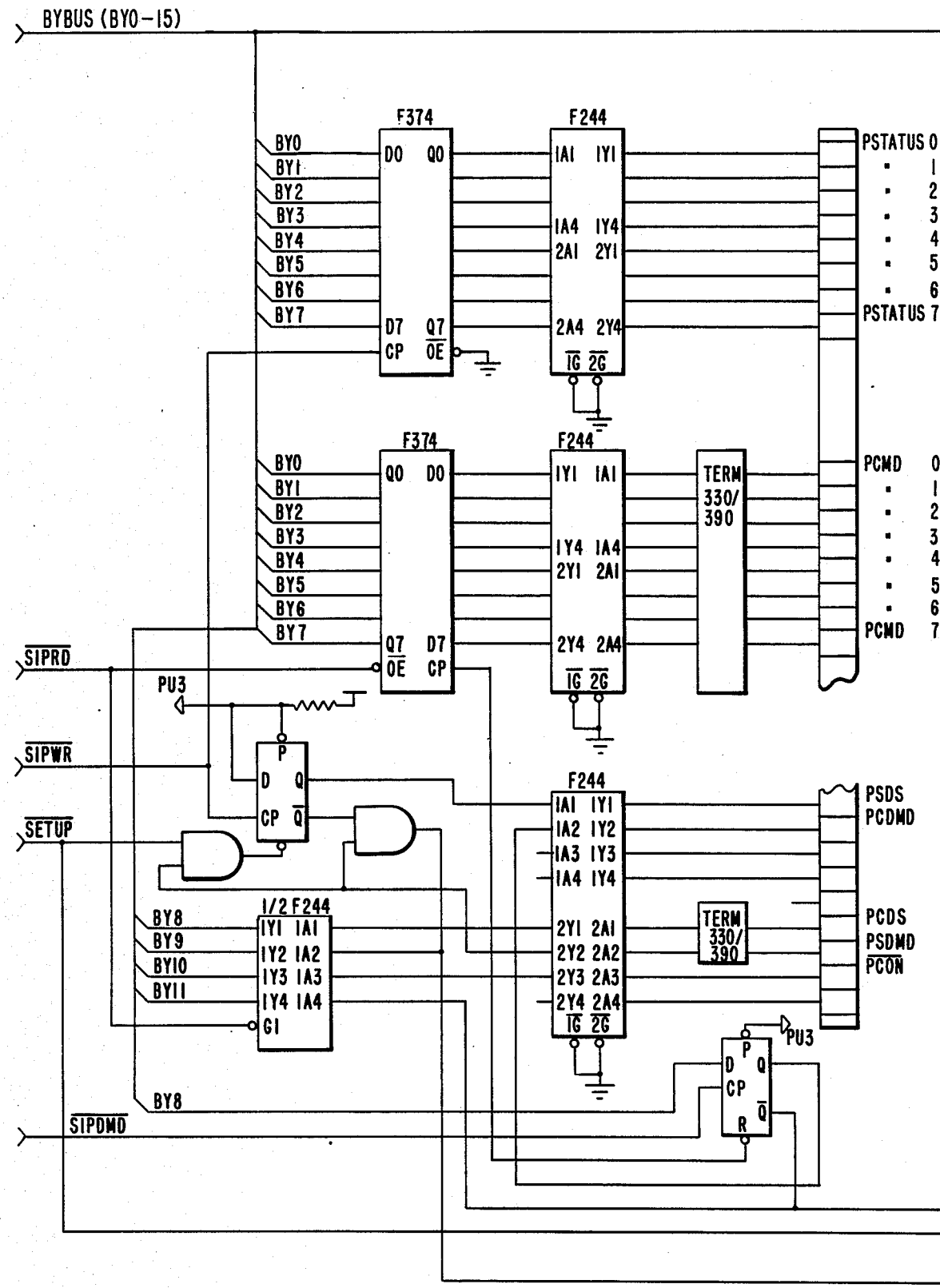
FIGS. 36A and B are a detailed schematic of the host interface.
Figure 36B:
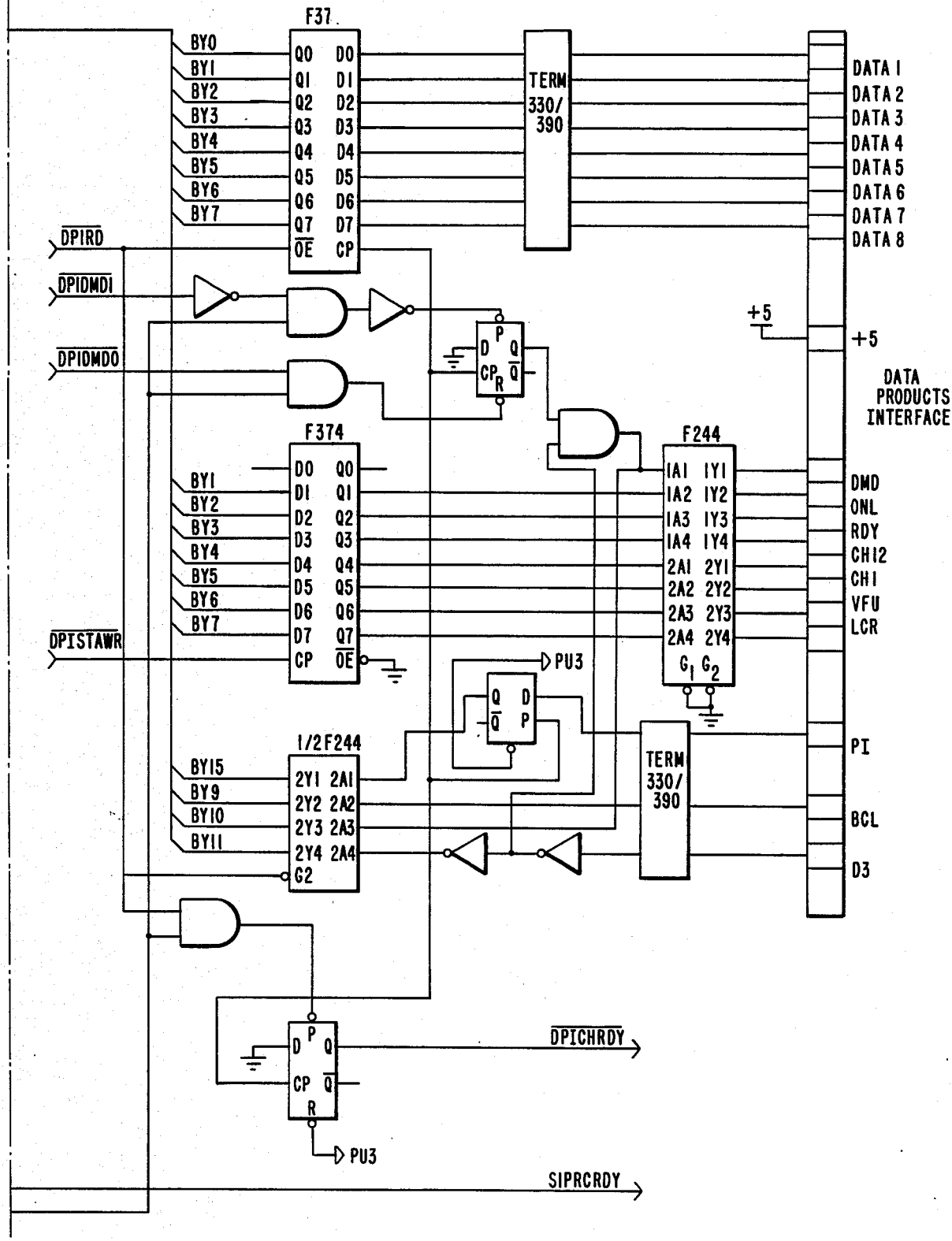
Figure 37A:
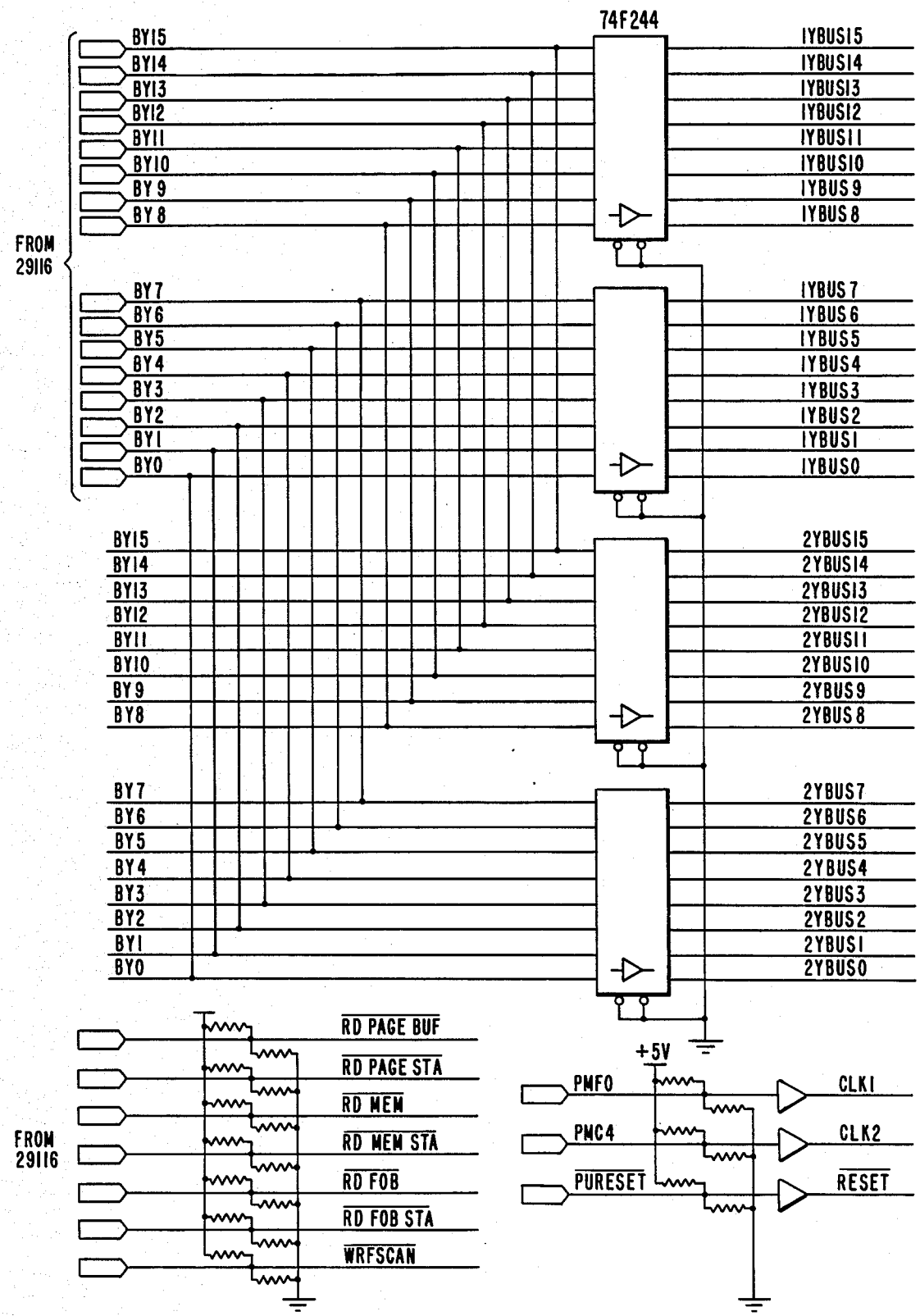
FIGS. 37A and B are a detailed schematic of the interface between the processing unit and the memory management units.
Figure 38A:
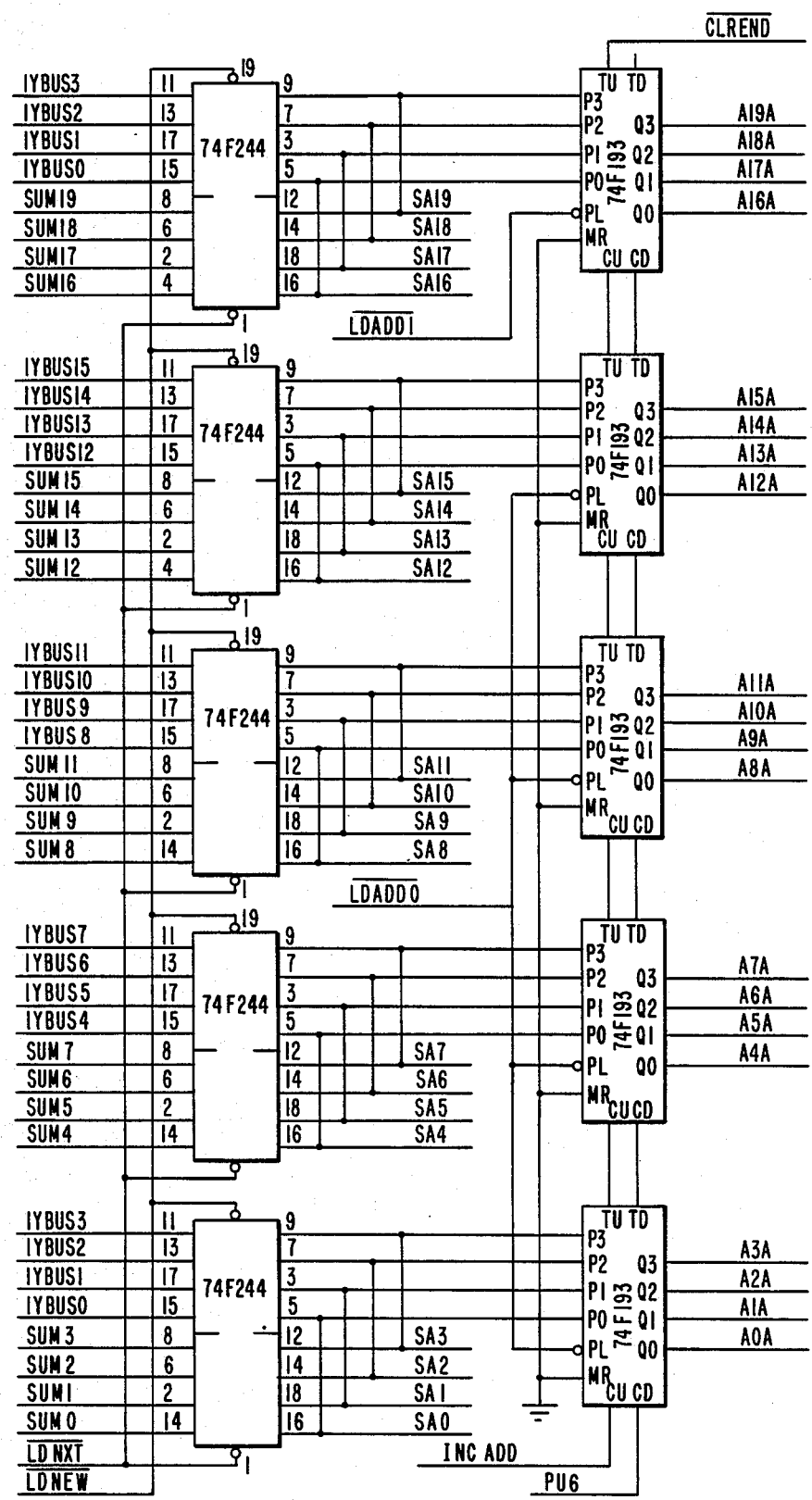
FIGS. 38A and B are a detailed schematic of the write absolute address generator of the page memories.
Figure 38B:
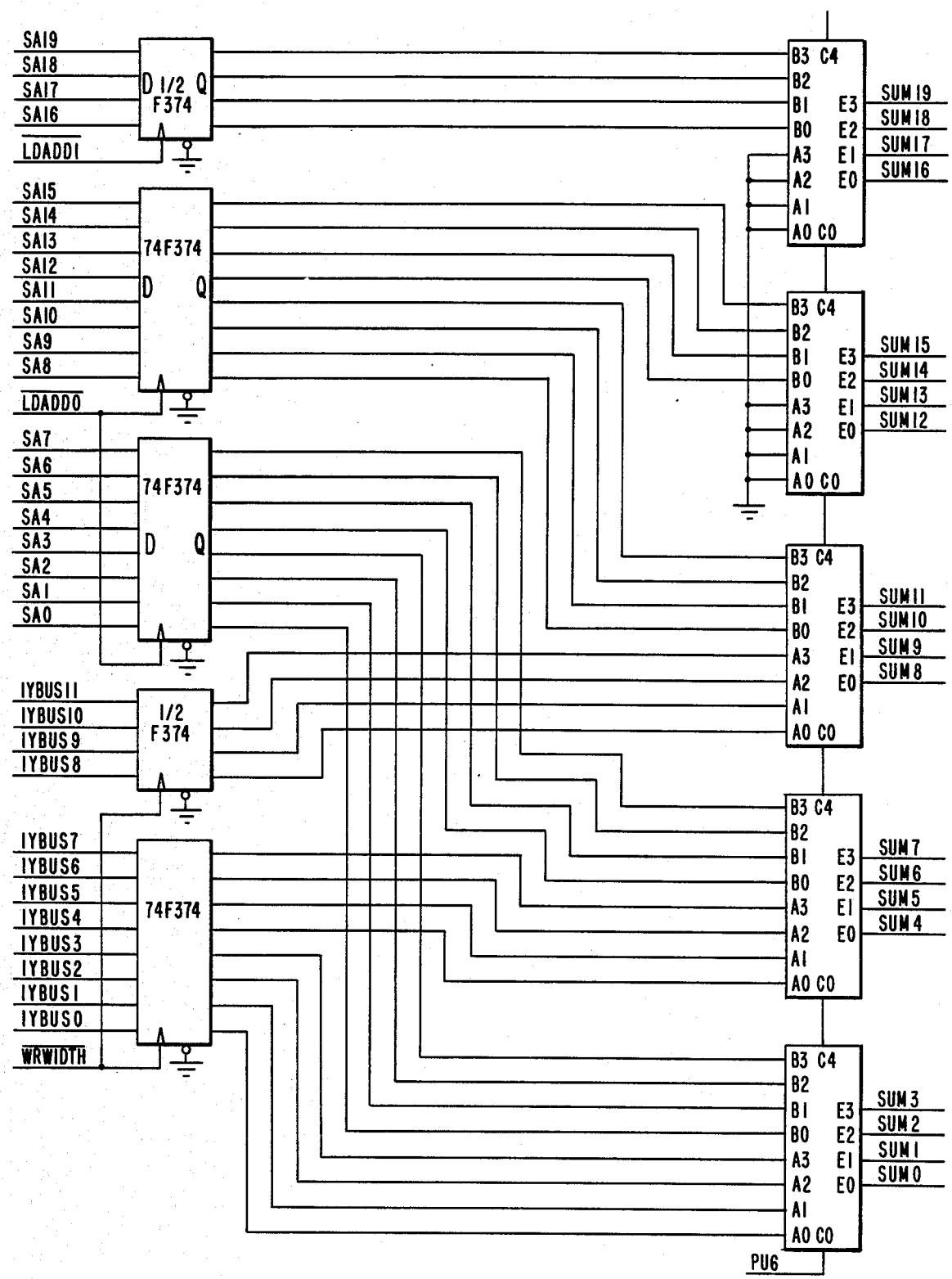
Figure 39A:
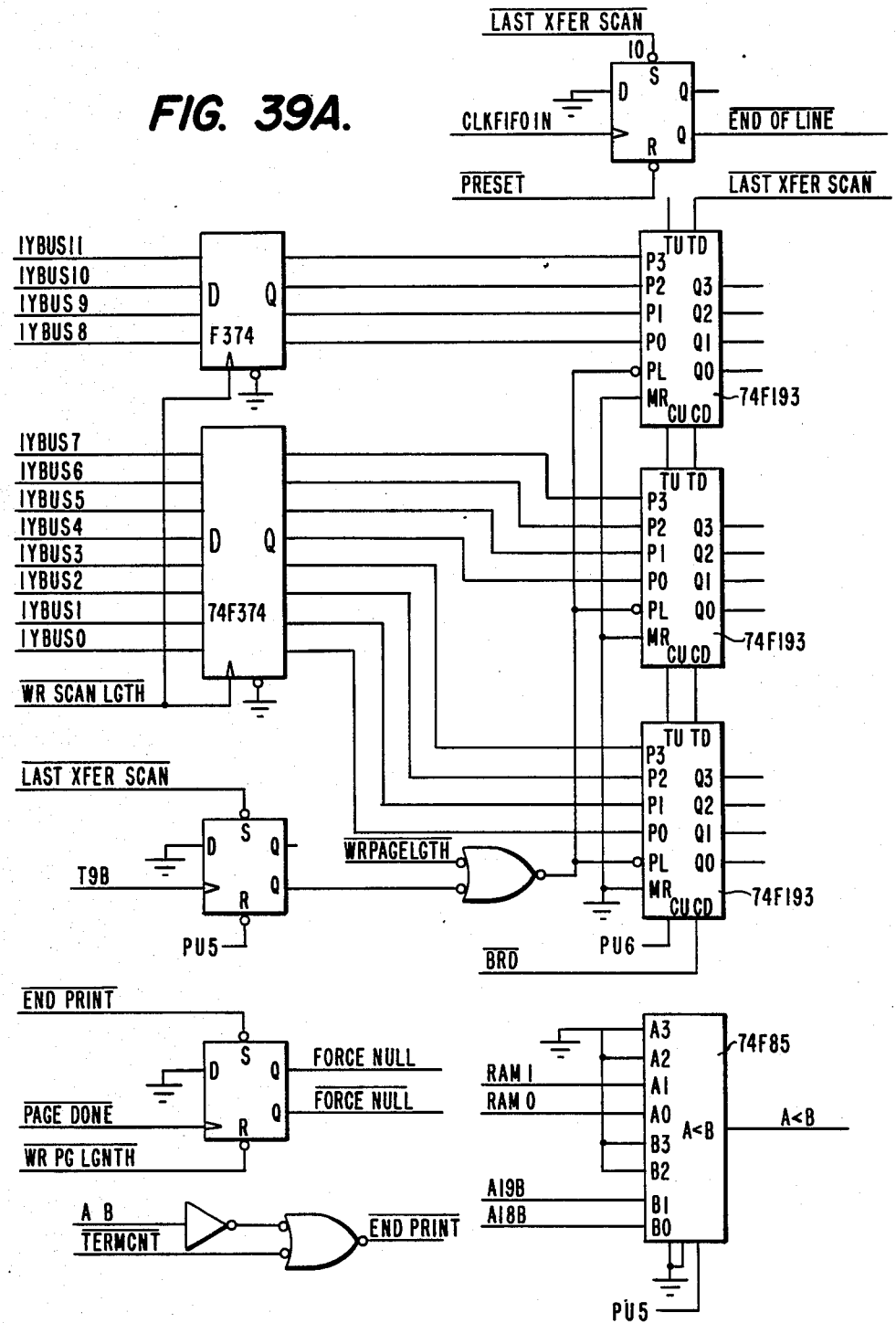
FIGS. 39A and B are a detailed schematic of the read absolute address generator for the page memories.
Figure 39B:
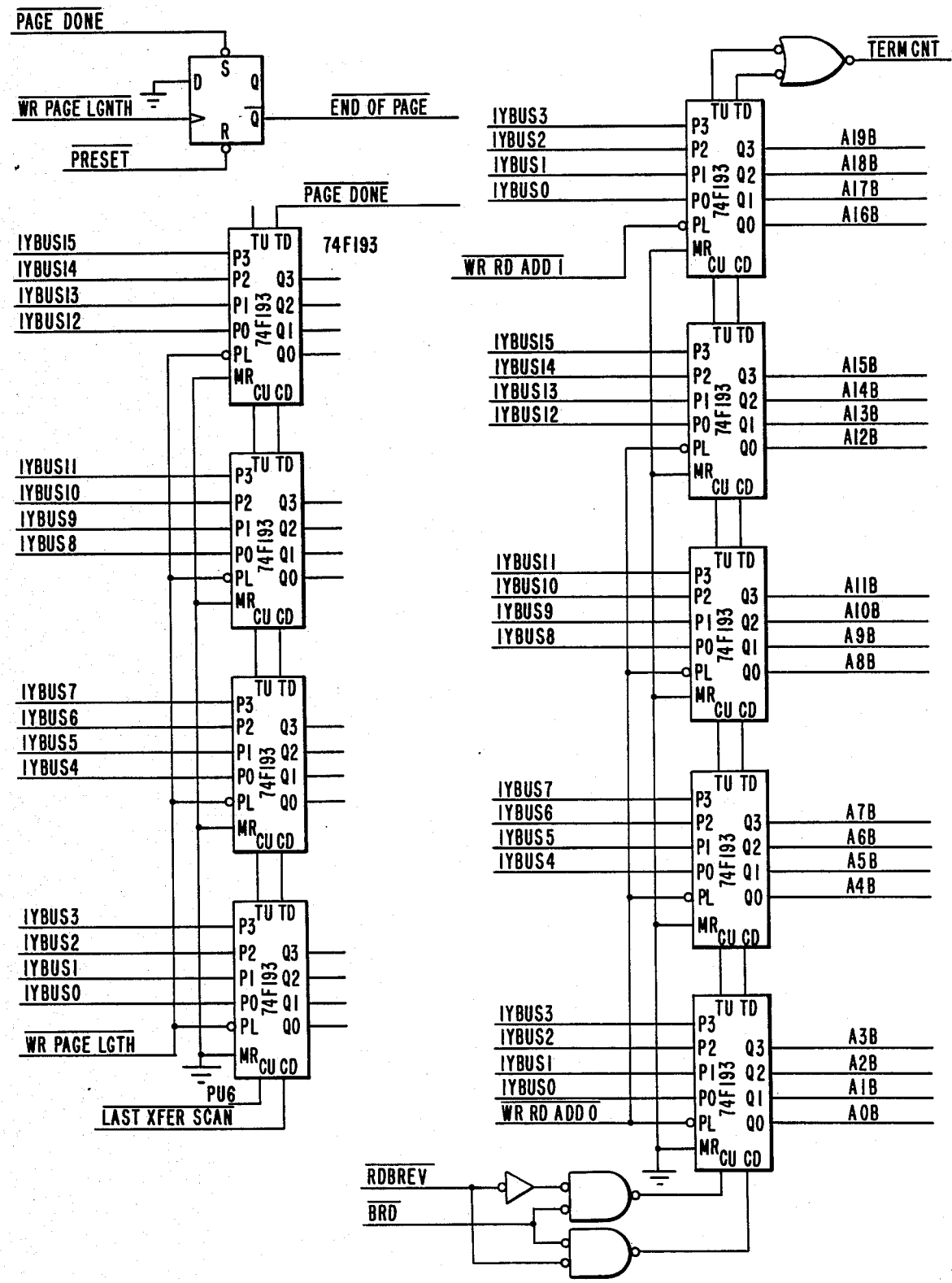
Figure 40B:
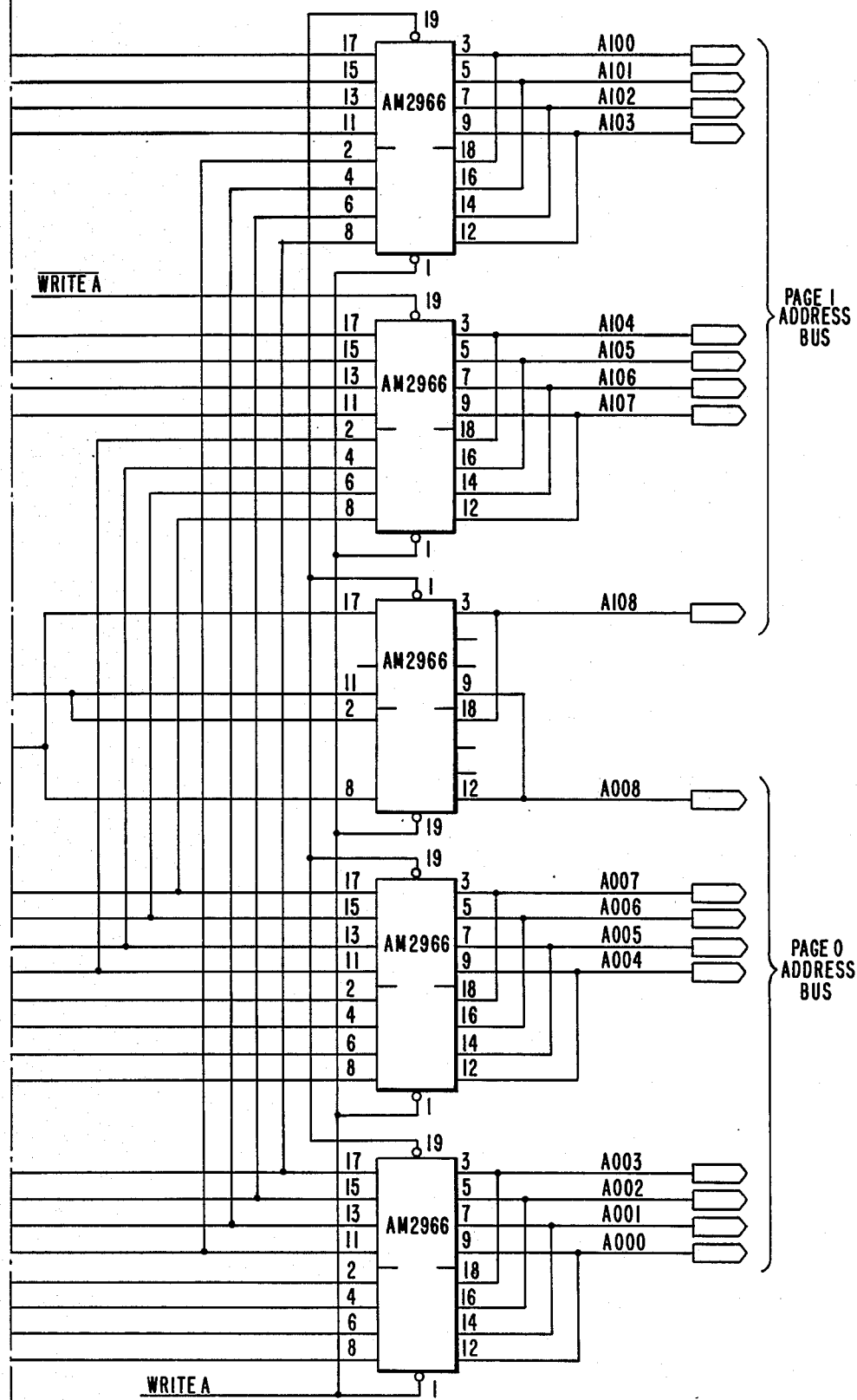
FIGS. 40A and B are a detailed schematic of the page memory and the read/write/row/column multiplexer.
Figures 41A, 41B:
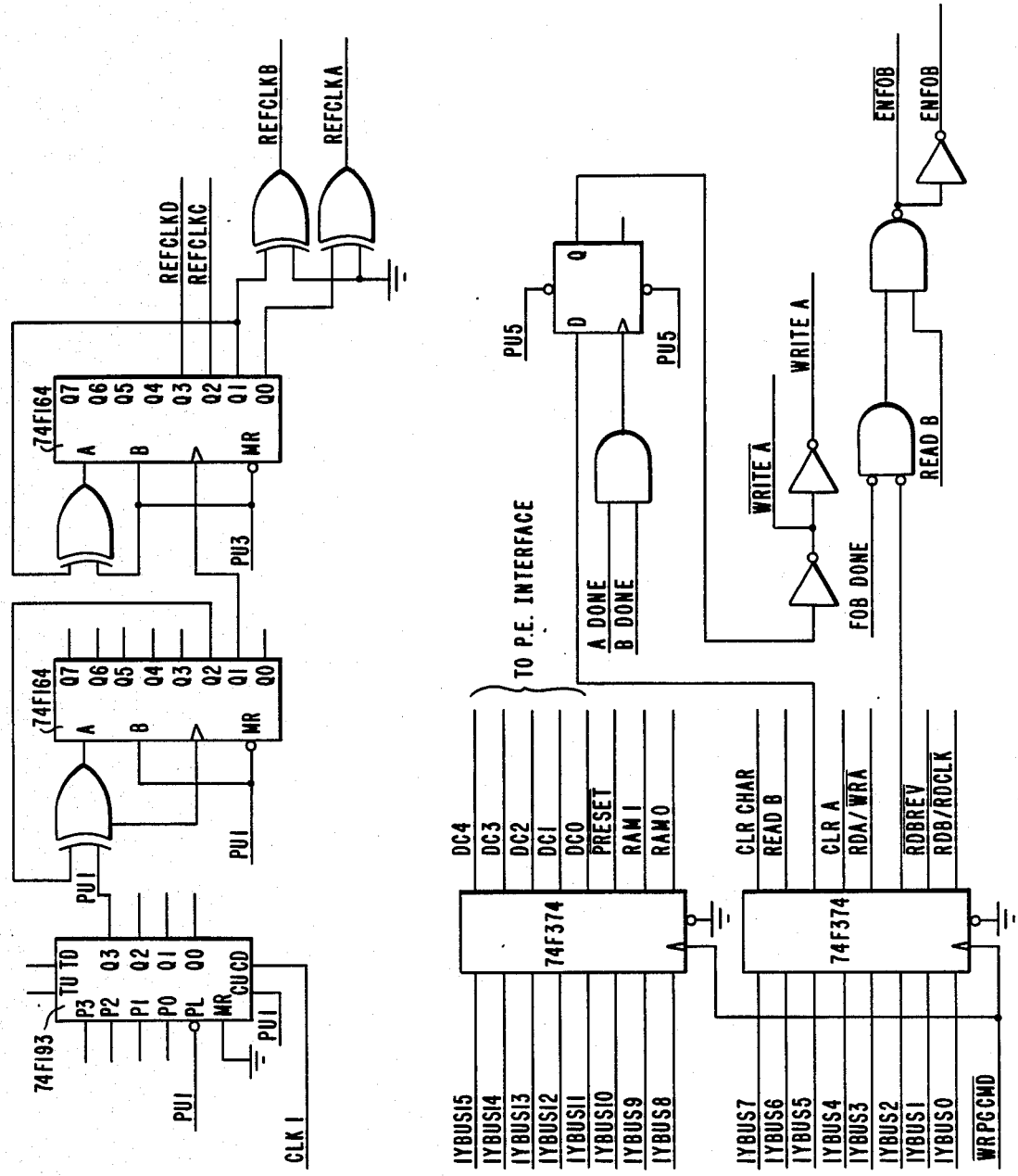
FIGS. 41A-D are a detailed schematic of the refresh clock generator and control register.
Figure 41C:
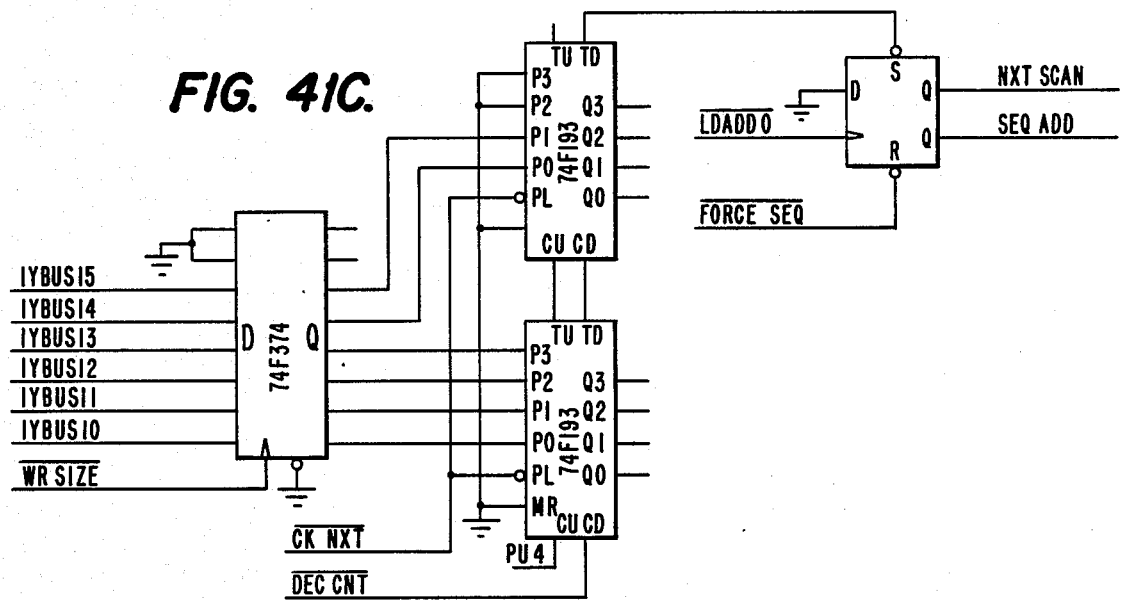
Figure 41D:
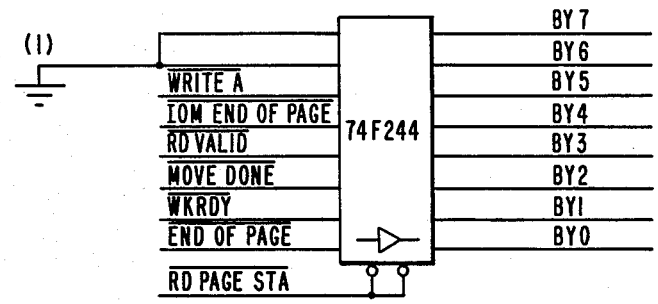
Figure 42A:
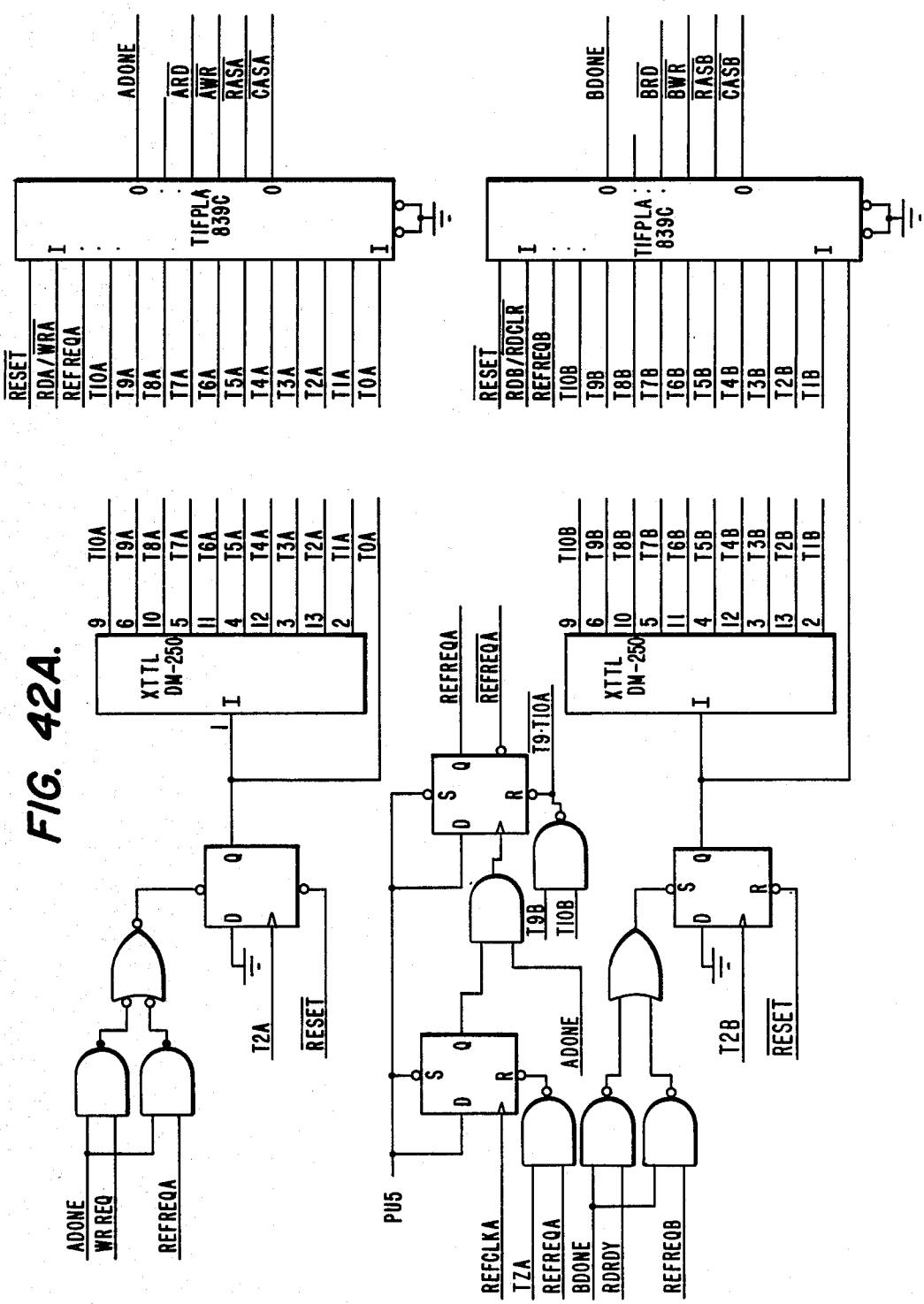
FIGS. 42A-C are a detailed schematic of the page memory timing generator for the read, row access select, column access select and write cycles.
Figure 42B:
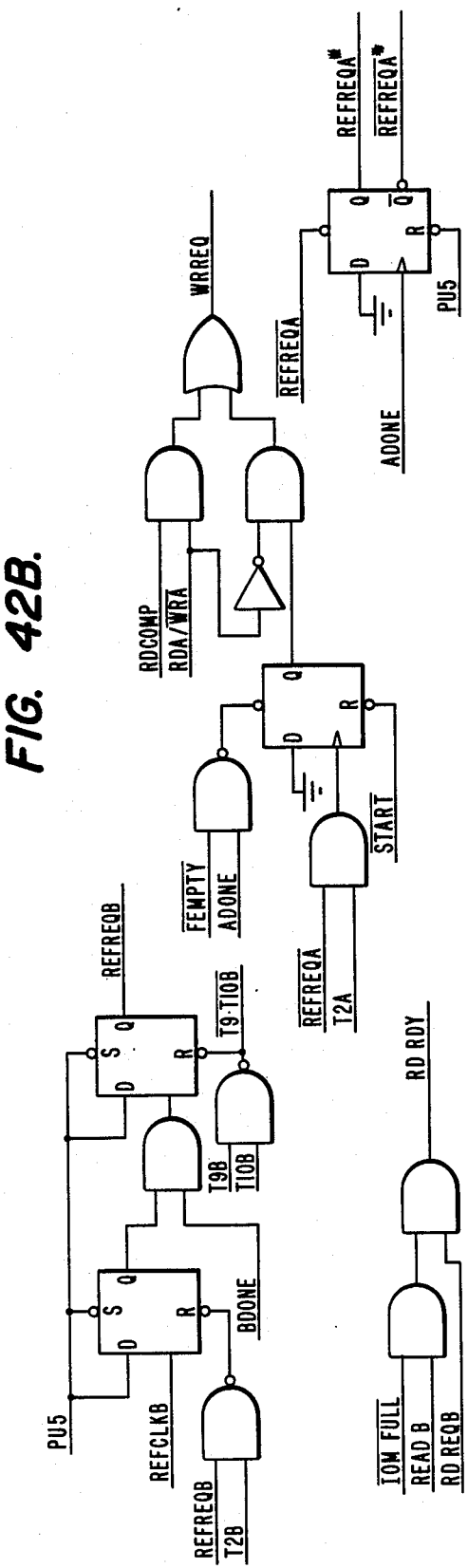
Figure 42C:
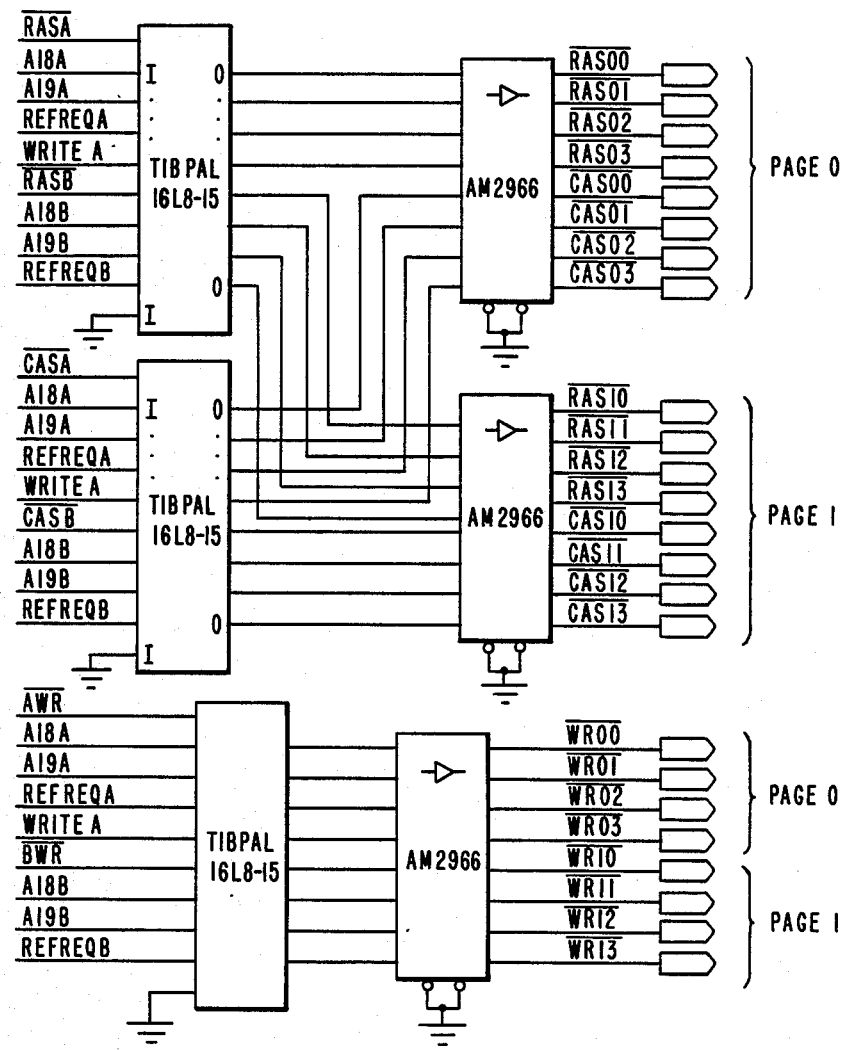
Figure 43A:
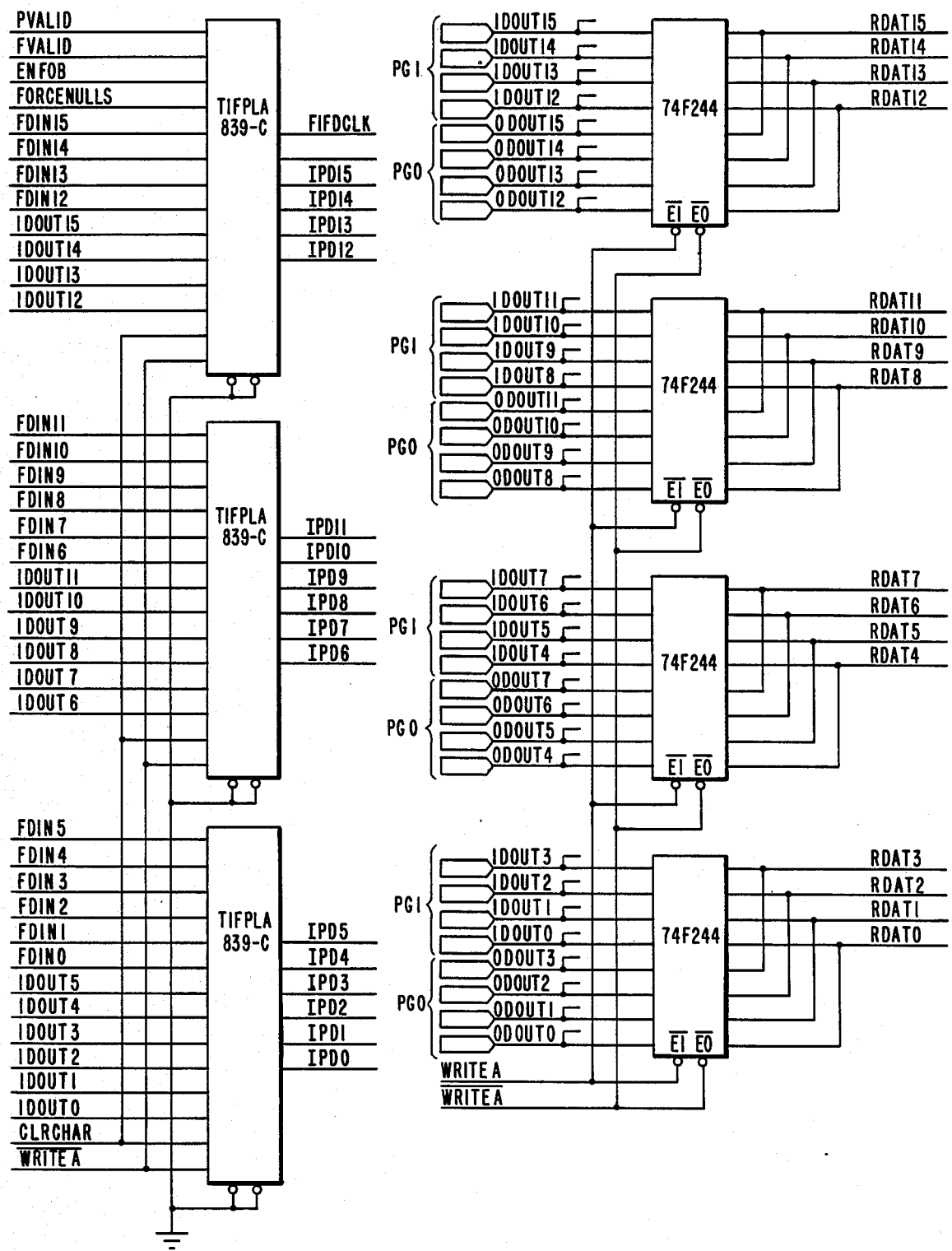
FIGS. 43A-C are a detailed schematic of page memory data to the data bus multiplexer and data programmable logic arrays for page 1 of the page memory.
Figure 43B:
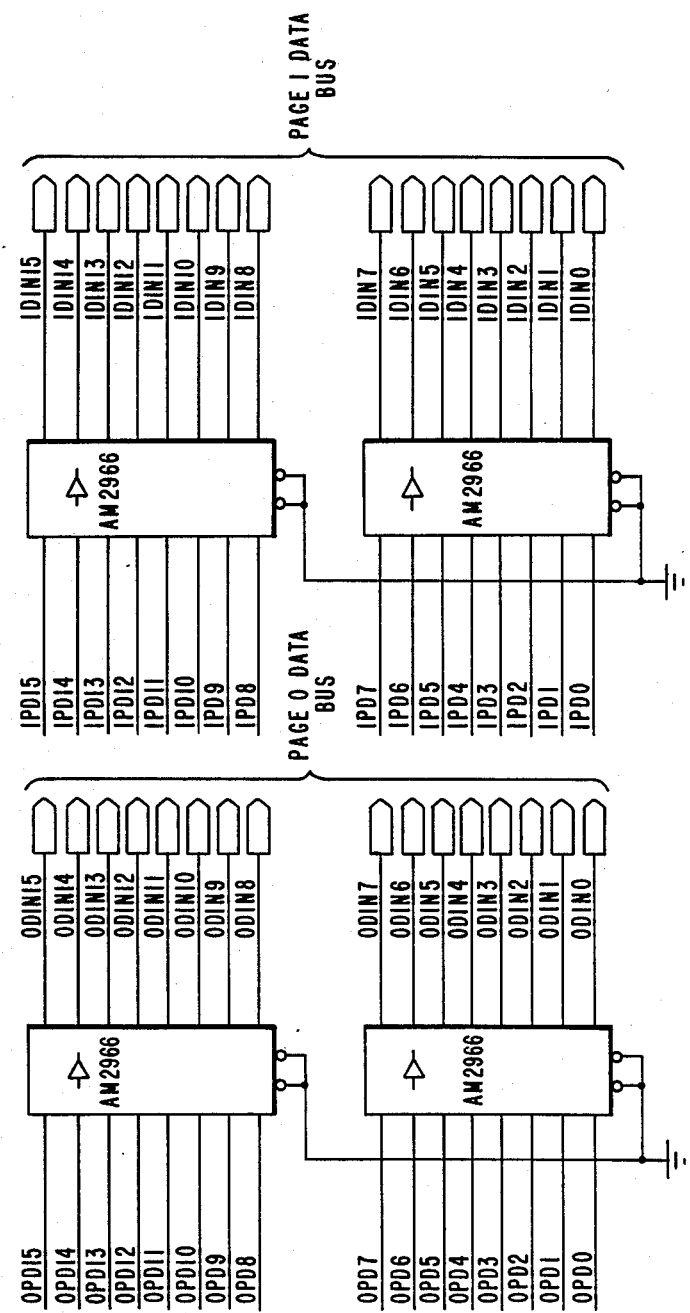
Figure 43C:
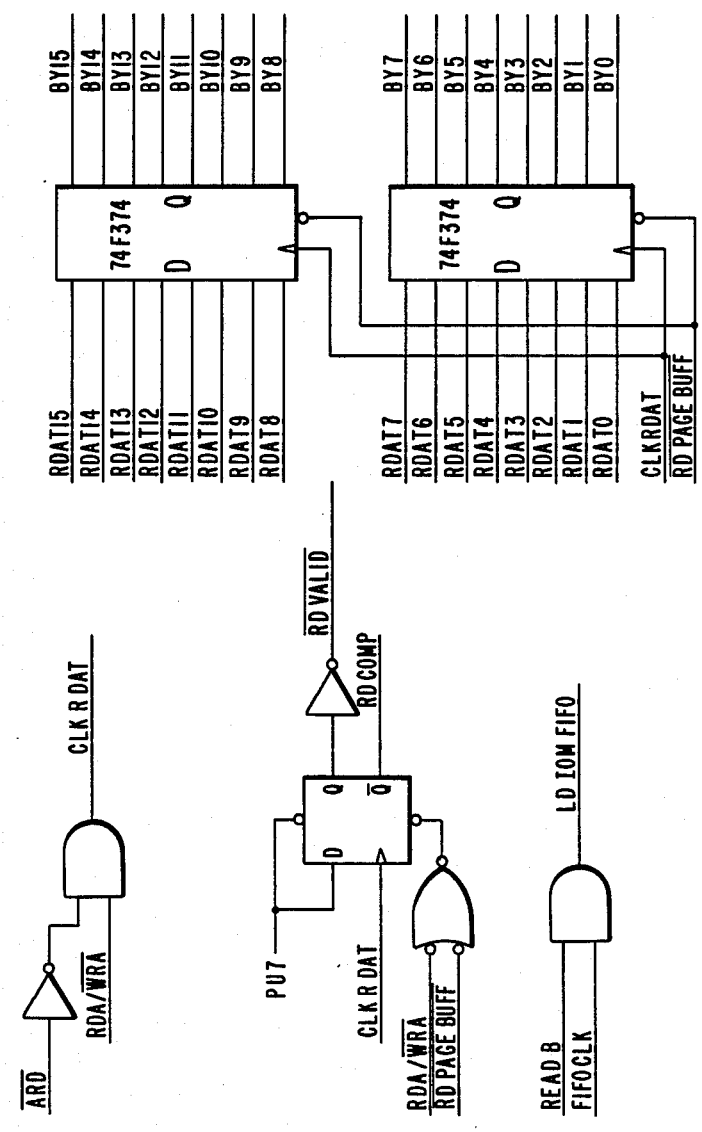
Figure 44B:
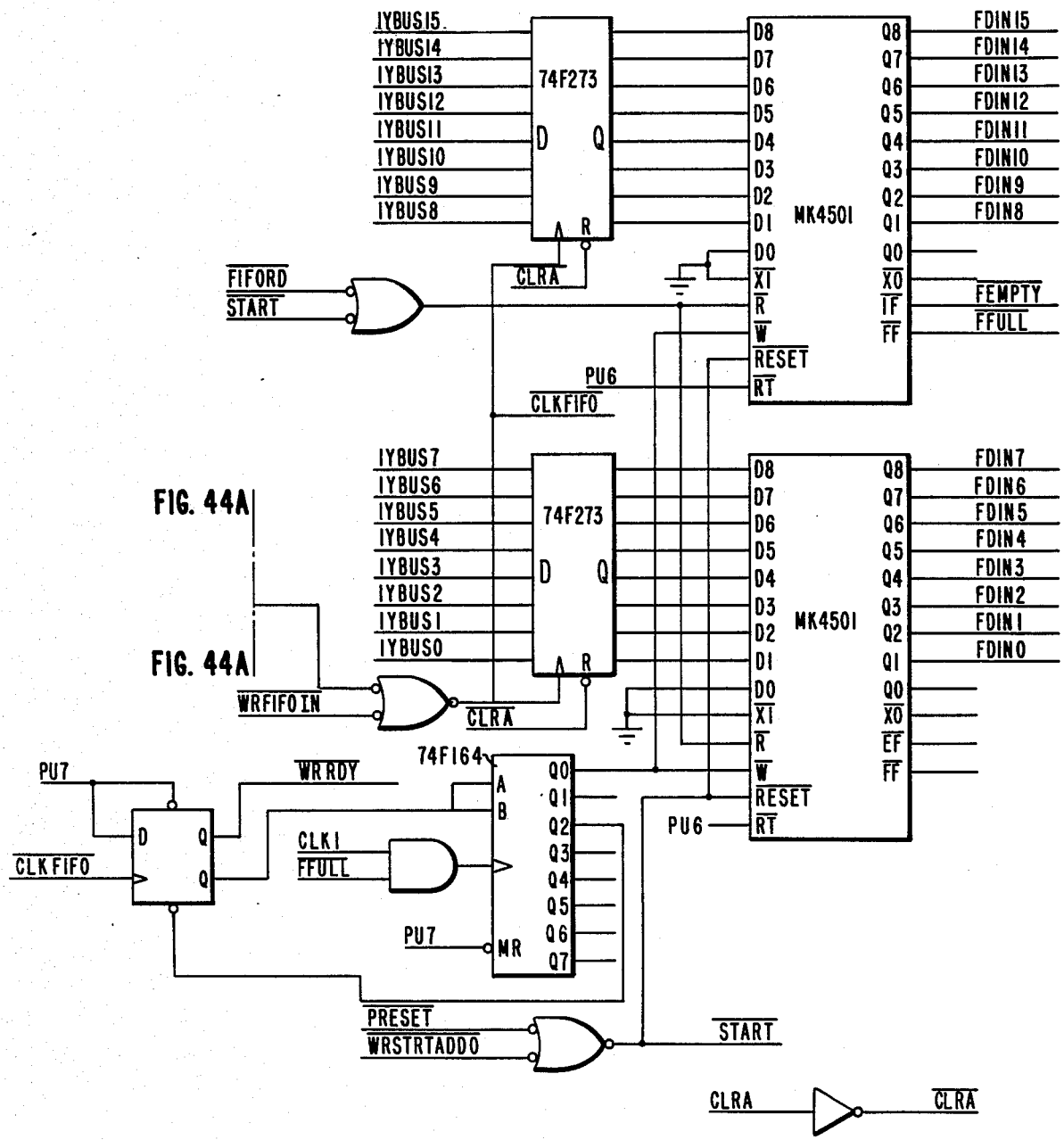
Figure 44C:
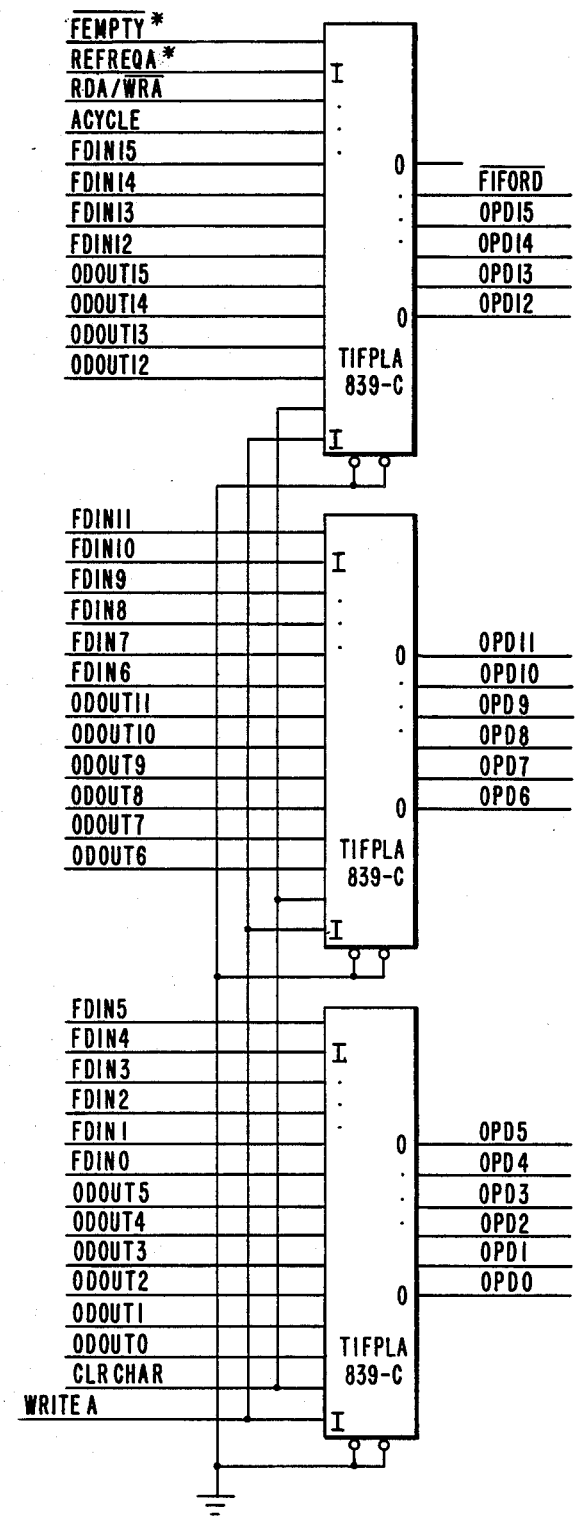
Figure 45A:
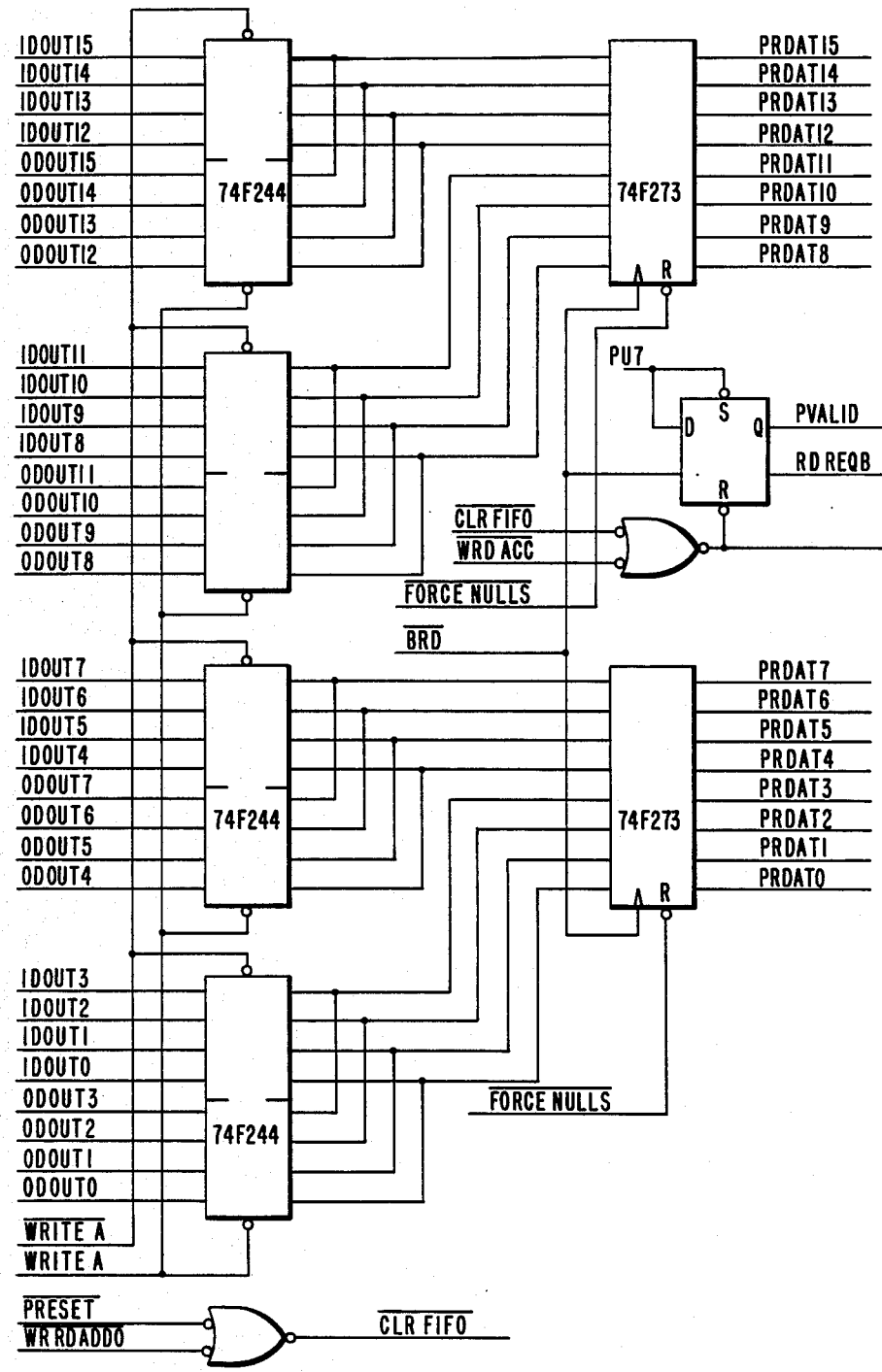
FIGS. 45A and B are a detailed schematic of the print engine interface and raster form storage unit synchronization.
Figure 45B:
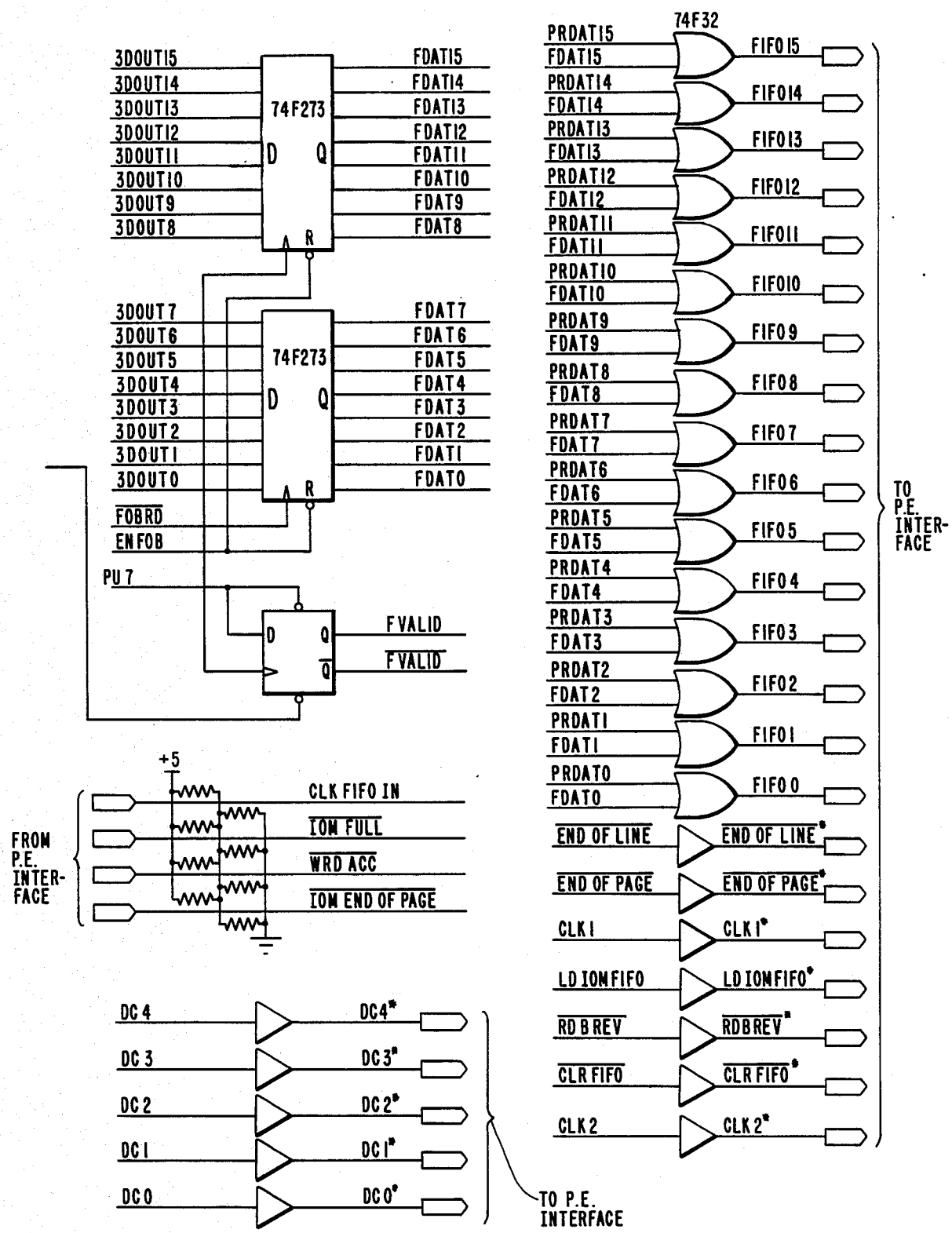
Figure 46A:
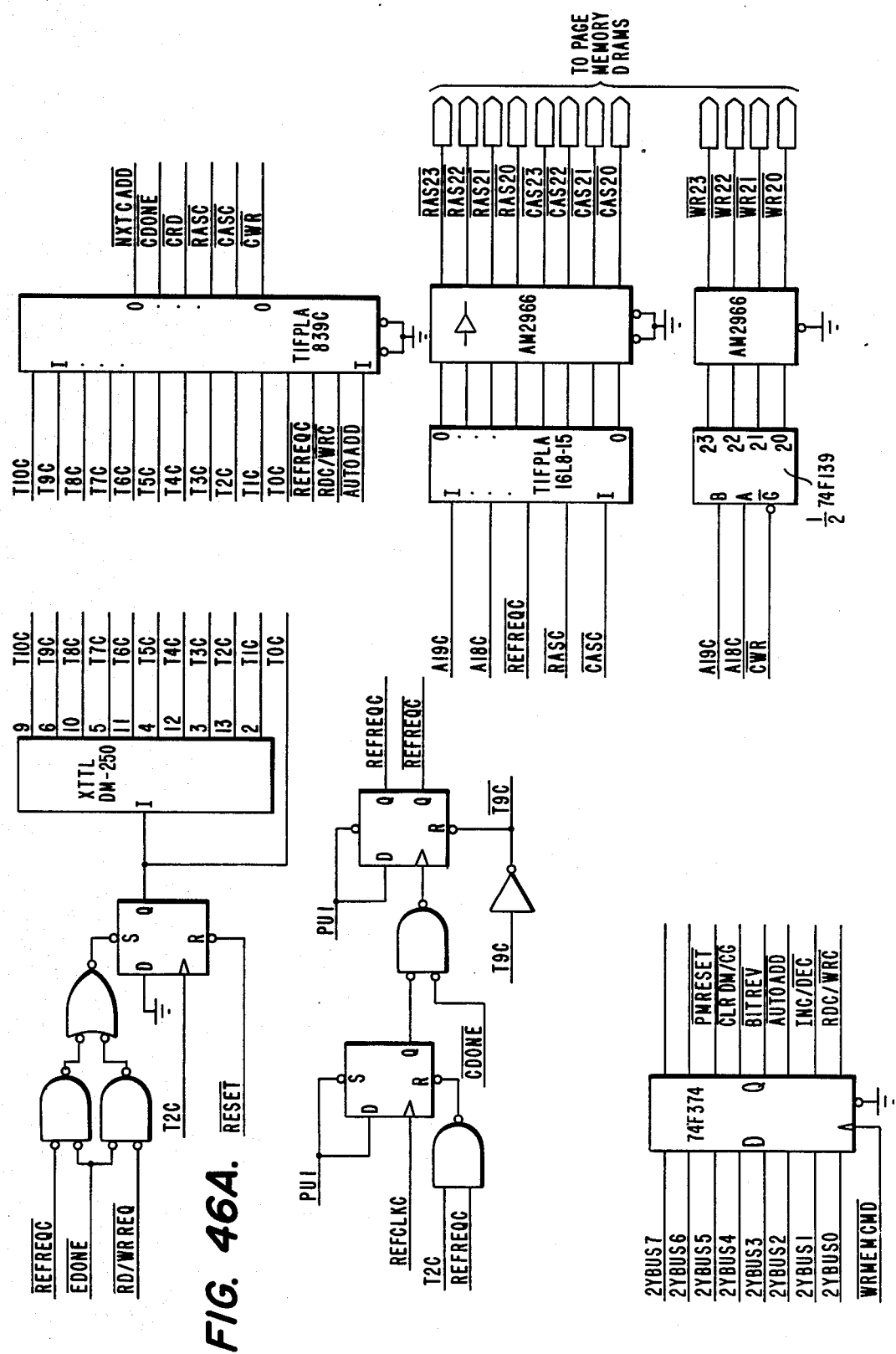
FIGS. 46A and B are a detailed schematic of the page memory of the page memory and font storage unit and character generator address control.
Figure 46B:
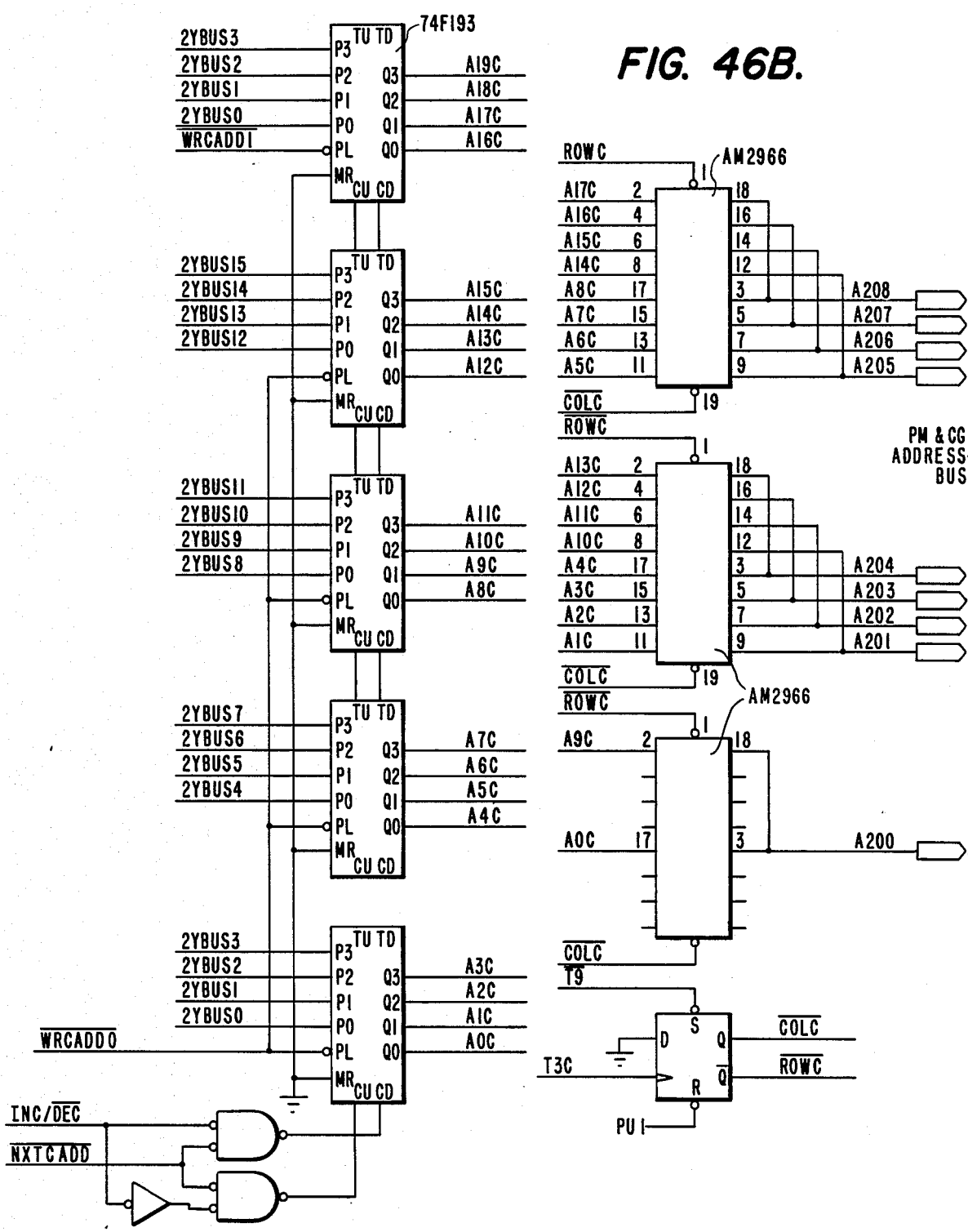
Figure 47A:
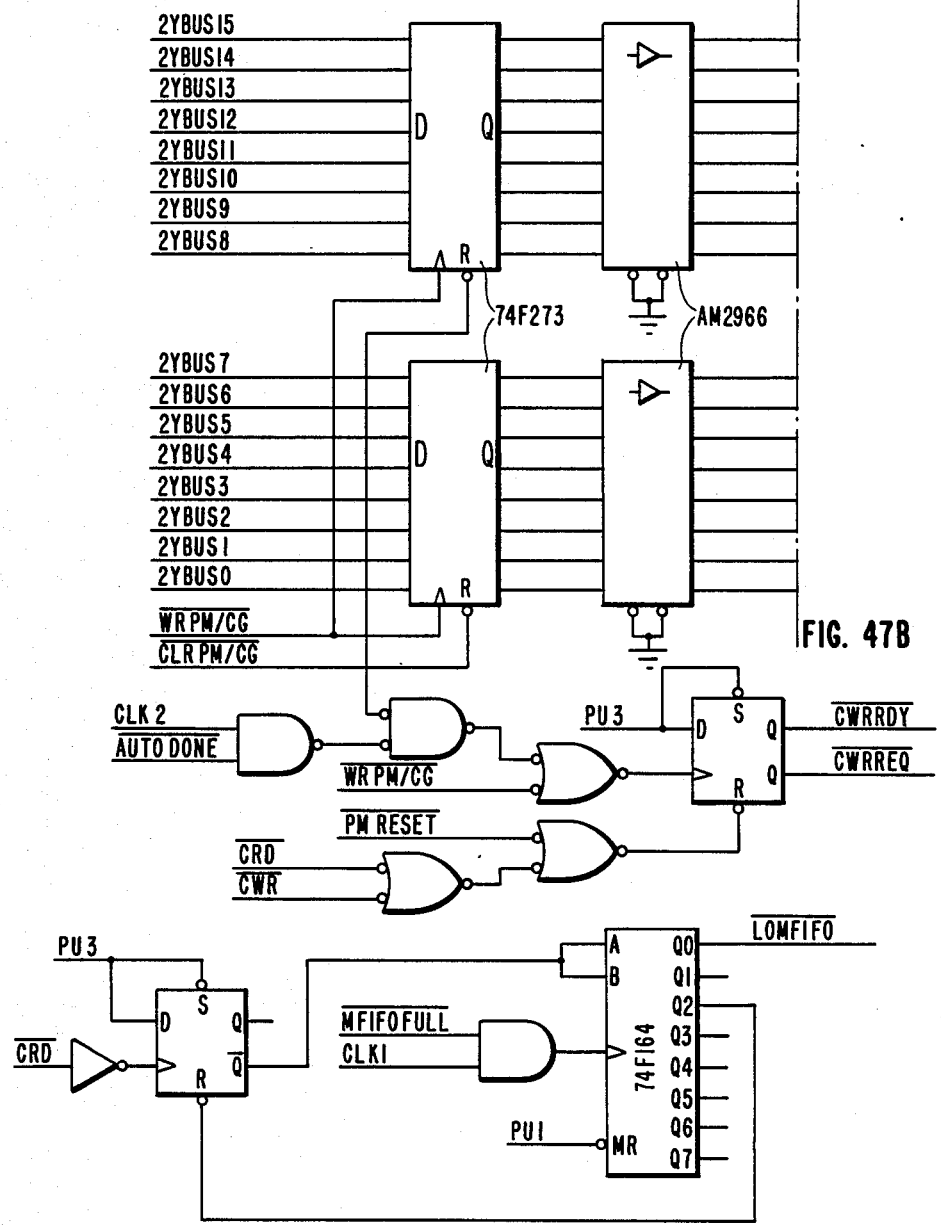
FIGS. 47A-C are a detailed schematic of the page memory and character generator data FIFO storage and bit reverser.
Figure 47B:
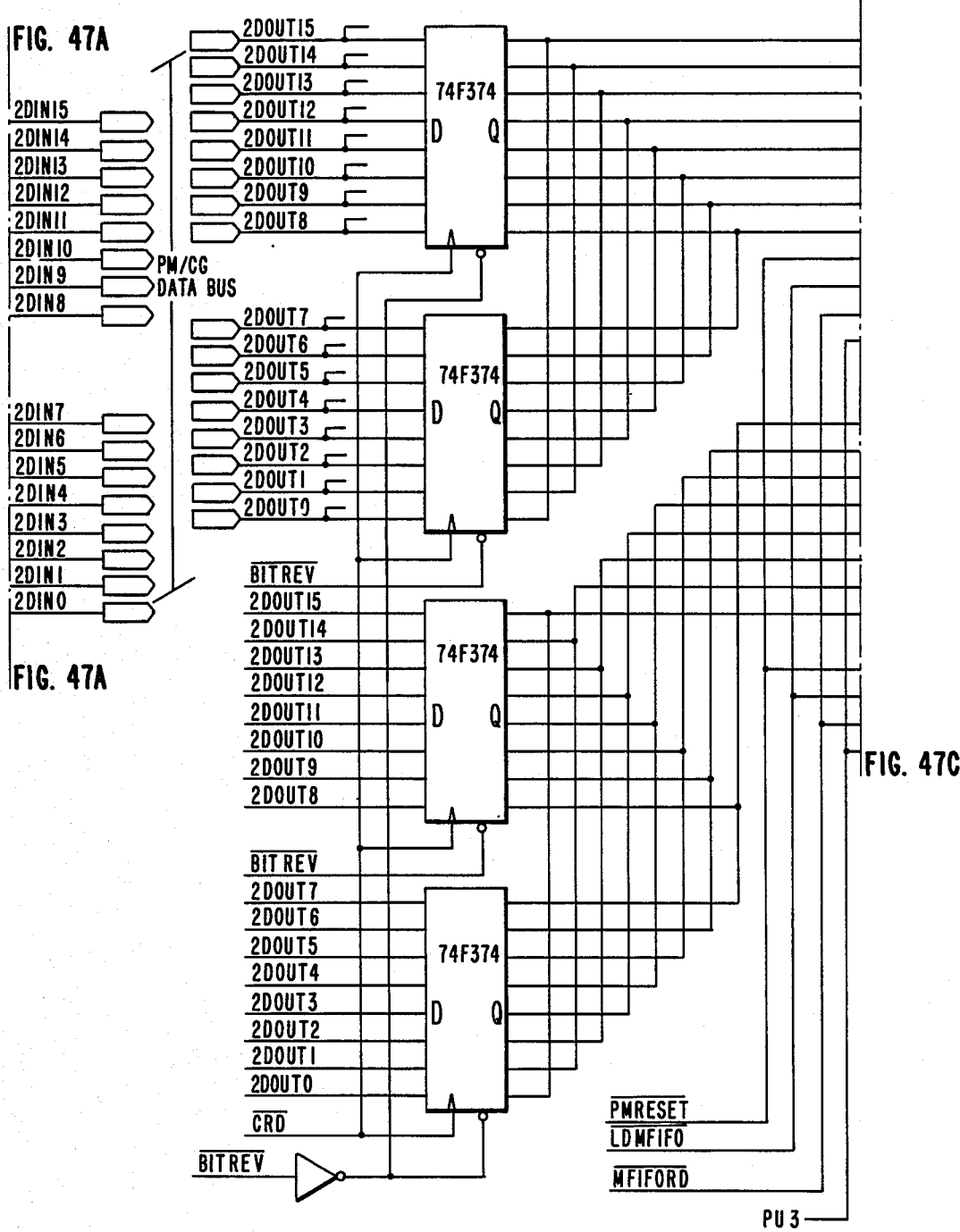
Figure 47C:
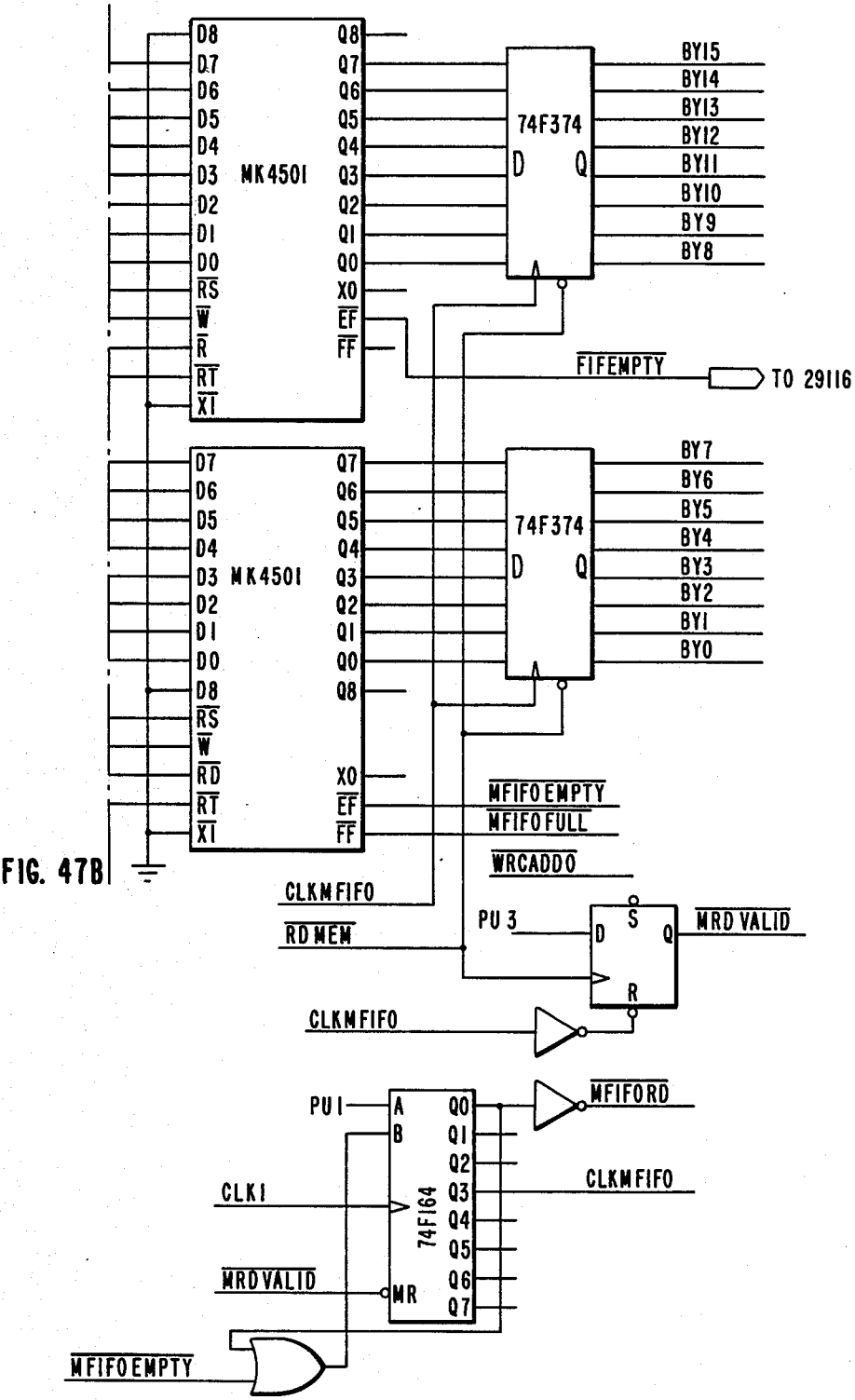
Figure 48:
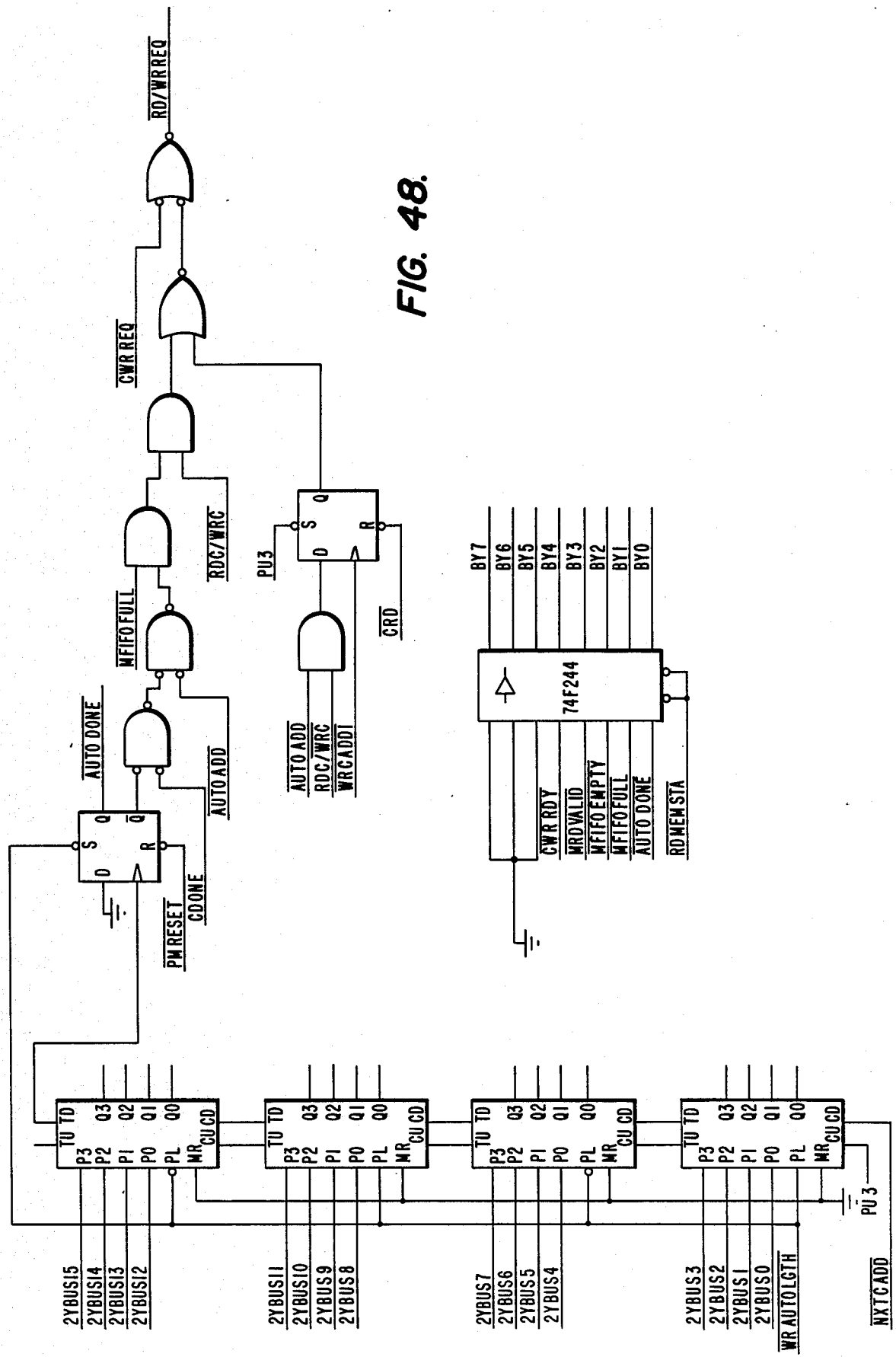
FIG. 48 is a detailed schematic of the page memory and character generator word counter.
Figure 50A:
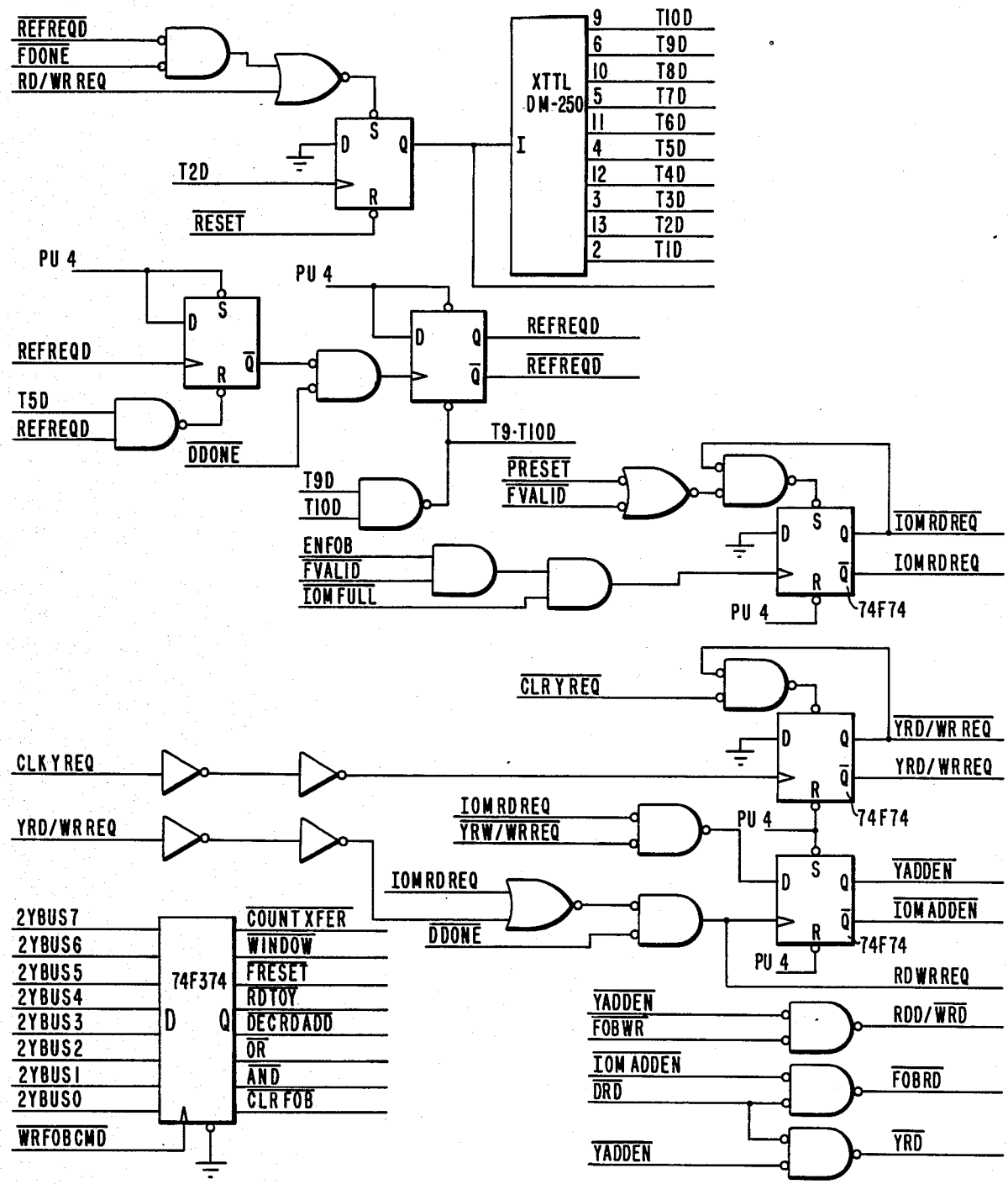
FIGS. 50A and B are a detailed schematic of the raster form storage unit timing and control.
Figure 50B:
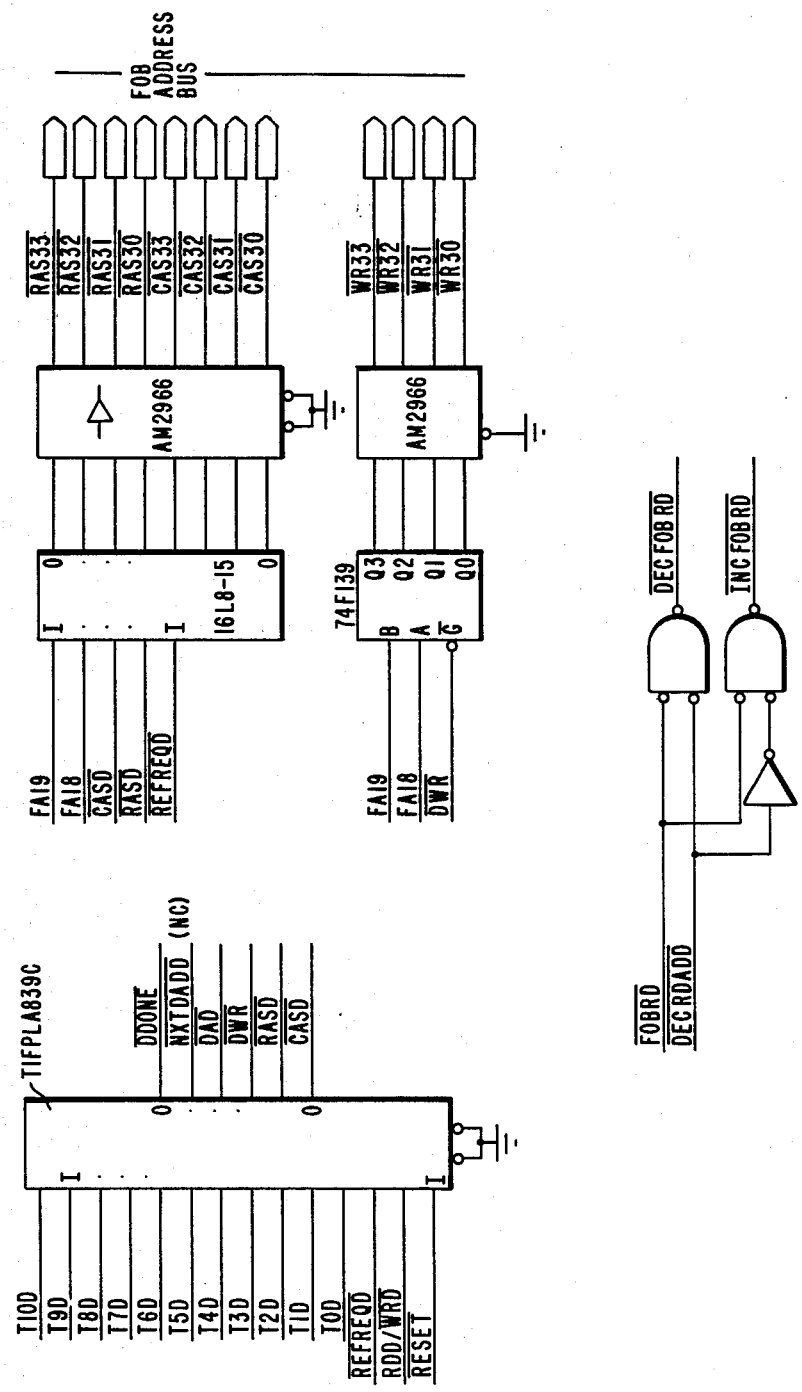
Figure 51A:
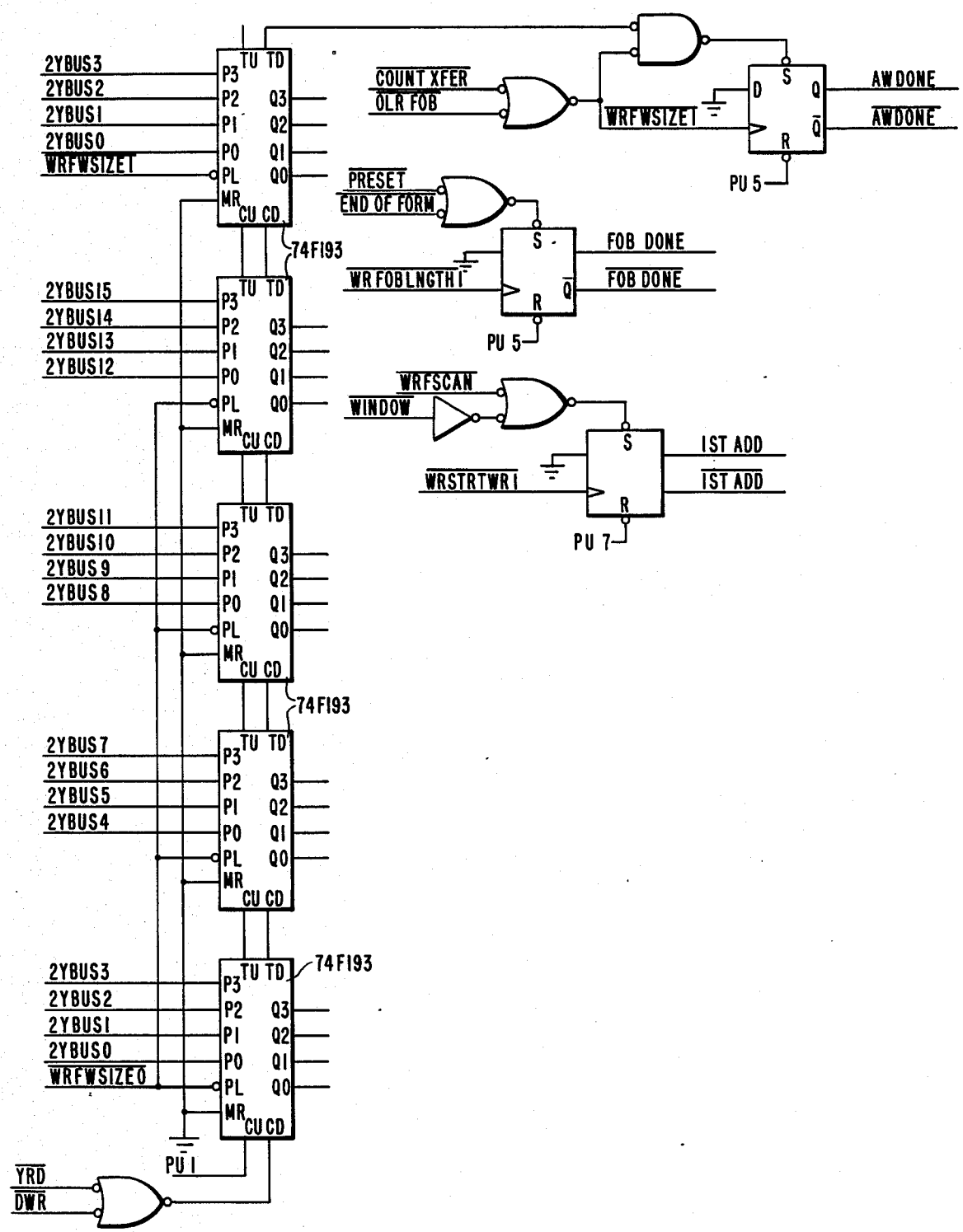
FIGS. 51A and B are a detailed schematic of the raster form storage unit window control and status.
Figure 51B:
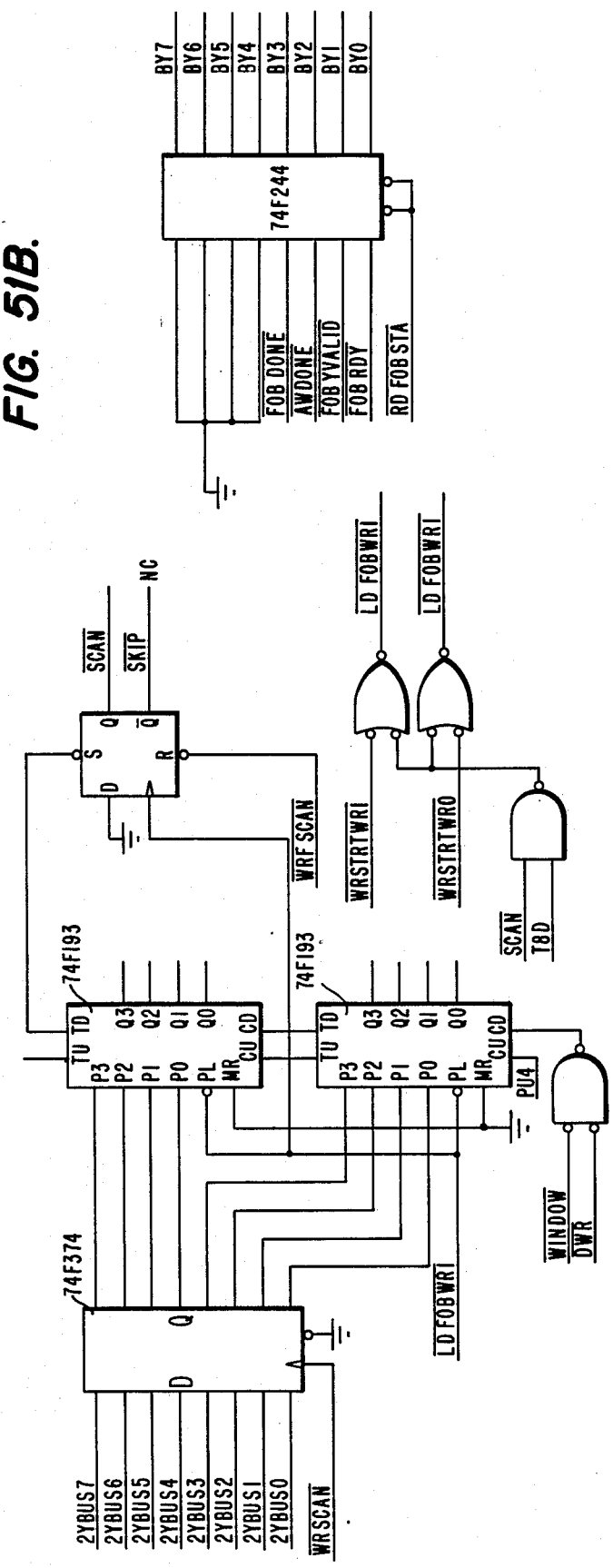
Figure 52A:
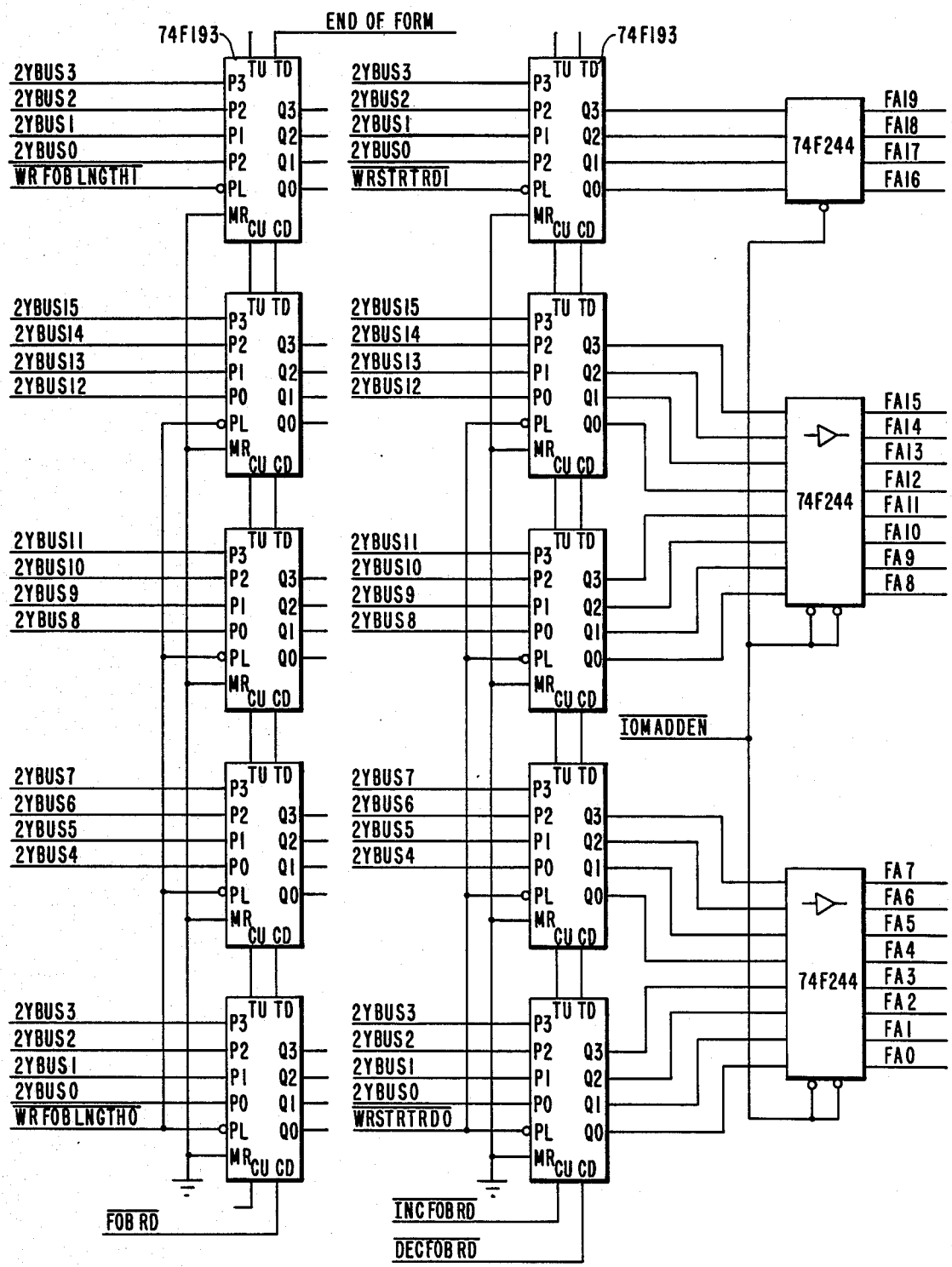
FIGS. 52A and B and 53A and B are a detailed schematic of the raster form storage unit address control.
Figure 52B:
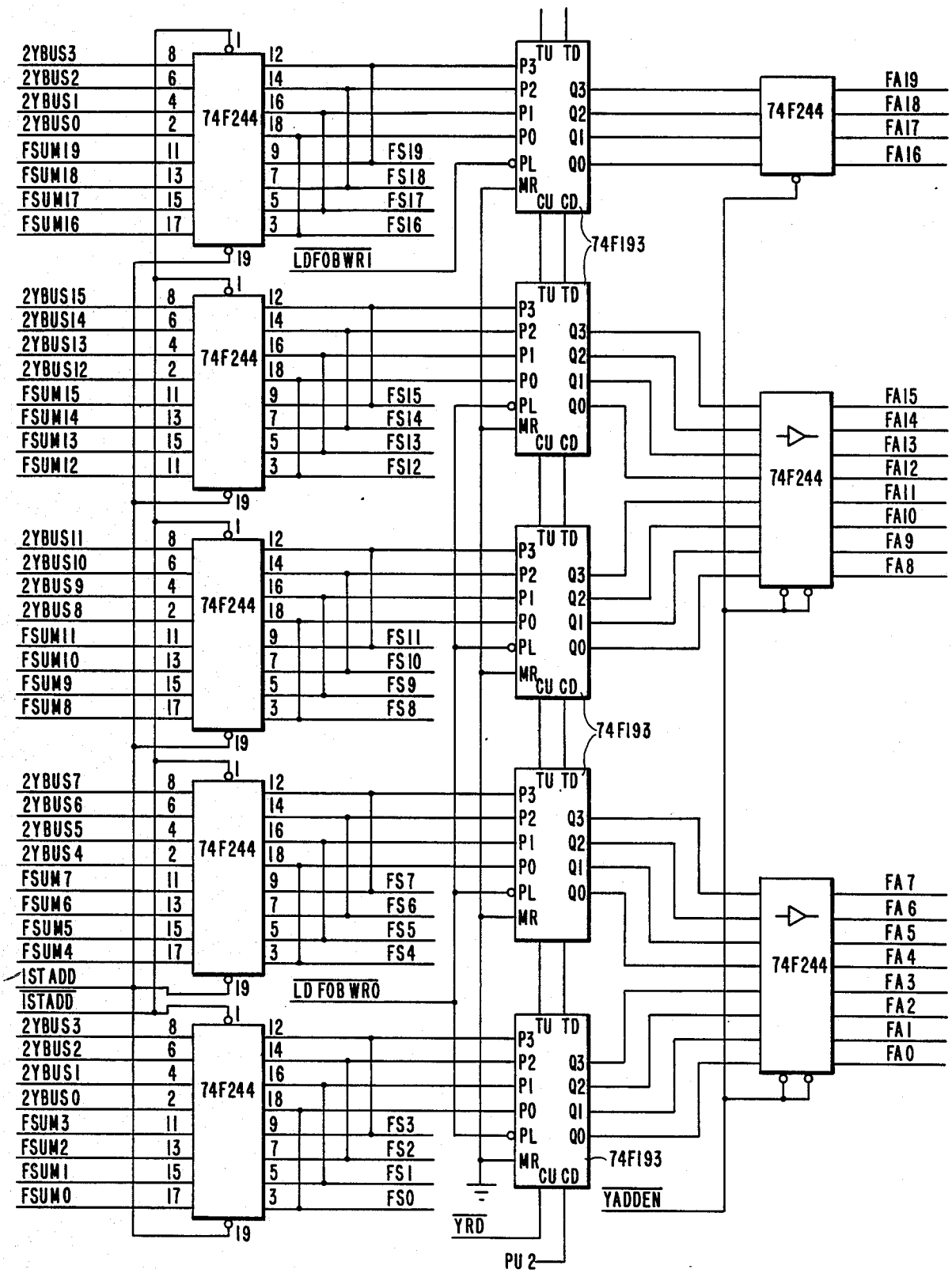
Figure 53A:
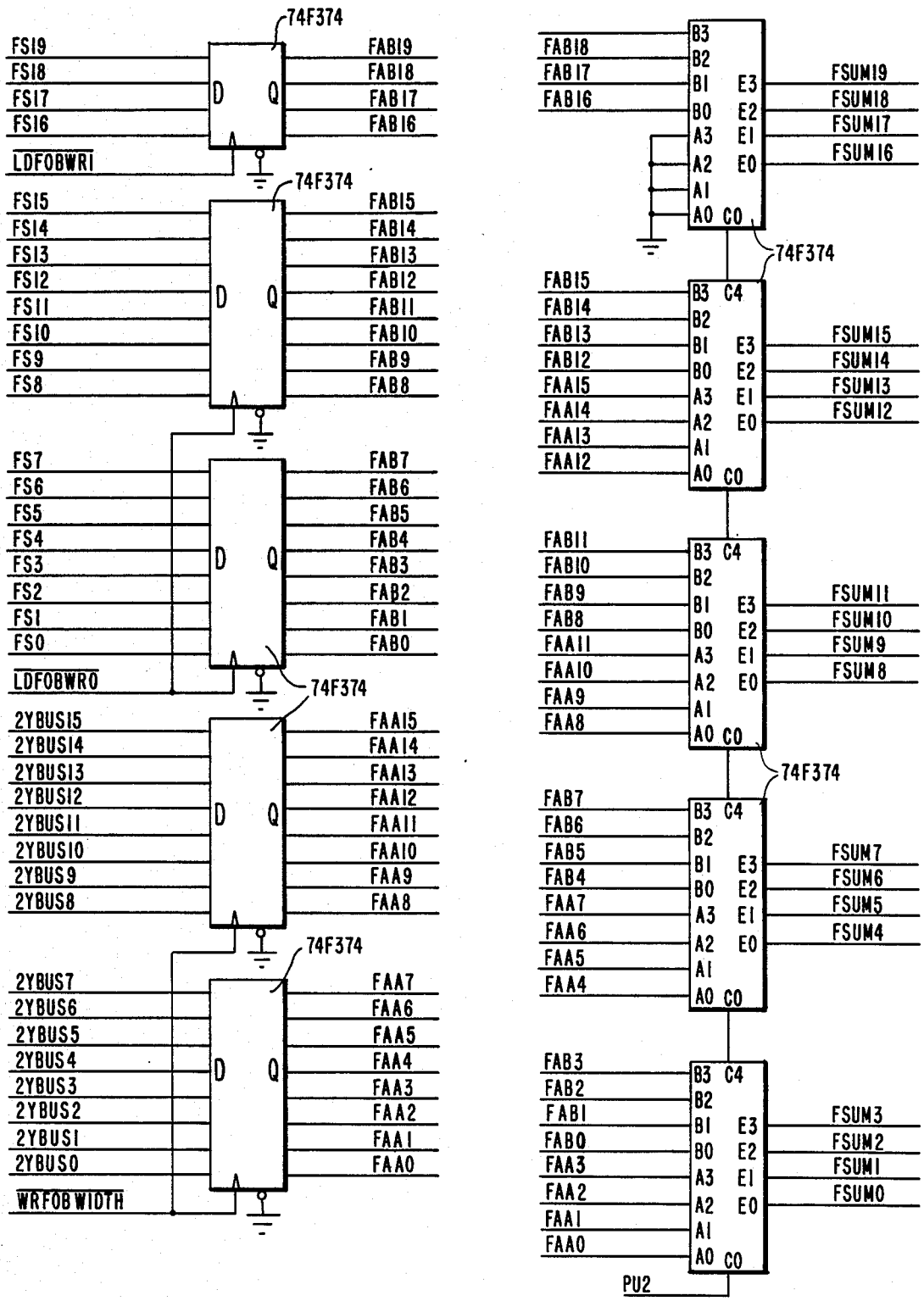
Figure 53B:
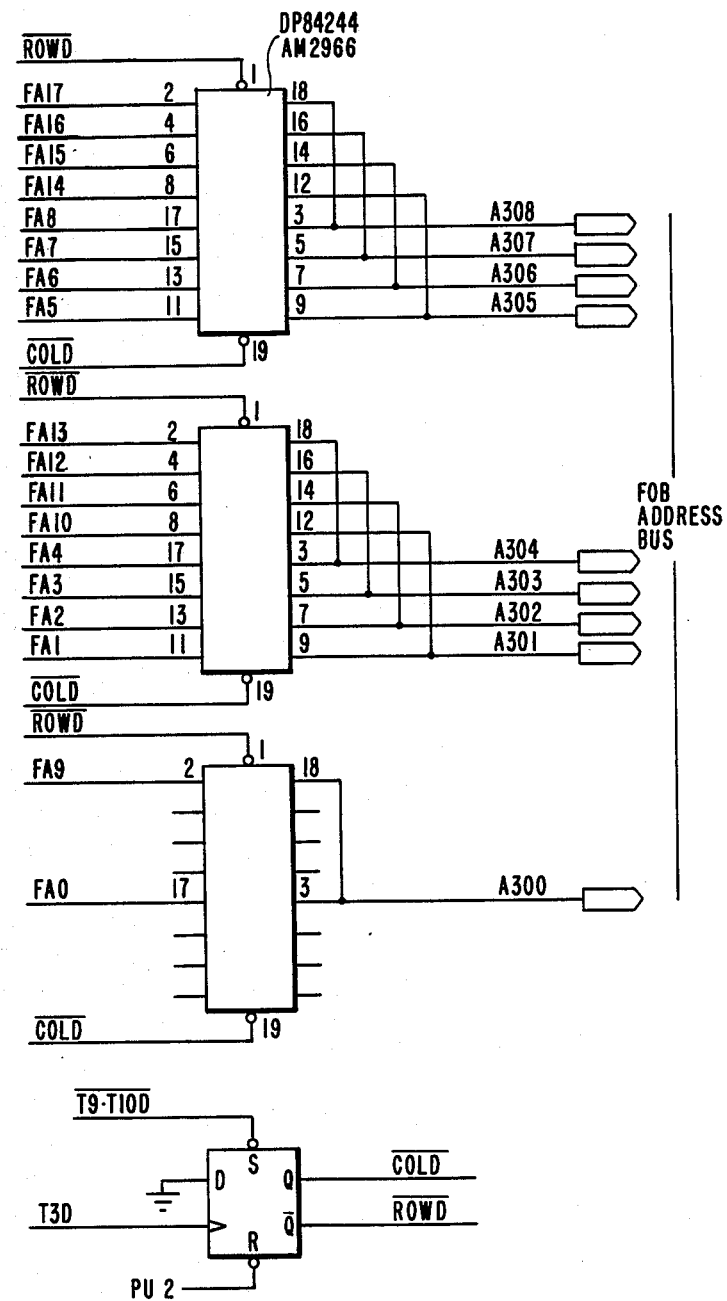

FIG. 4 illustrates a more detailed block diagram of the main processing unit 12 illustrated generally in FIG. 2. The disk controller 16 is also provided with a processing unit which is not discussed herein in detail. It should be understood that FIG. 4 is a somewhat simplified diagram of the actual implementation of the processing unit 12 which is illustrated in detail in the detailed schematic of the processing unit contained in FIGS. 17A and B. A condition code multiplexer 60 receives a plurality of individual status flag inputs from various parts in the system including the operation of the print engine, the paper path, etc. The output of the condition code multiplexer is a single bit wide. A sequencer 62 is provided for generating the addresses of microcode instructions stored in a microcode/pipeline 64 which may be either RAM or ROM. The sequencer 62 functions as a state machine. Multiplexer 66 permits the selective multiplexing of immediate data received from either the micro/pipeline 64 or the bus 42 under the control of the microcode pipeline. The immediate data is applied to the arithmetic logic unit 68. Data is inputted and outputted from the arithmetic unit 68 by a bus 42. Clock 70 provides the basic timing signal for the operation of the system.

Figure 5:
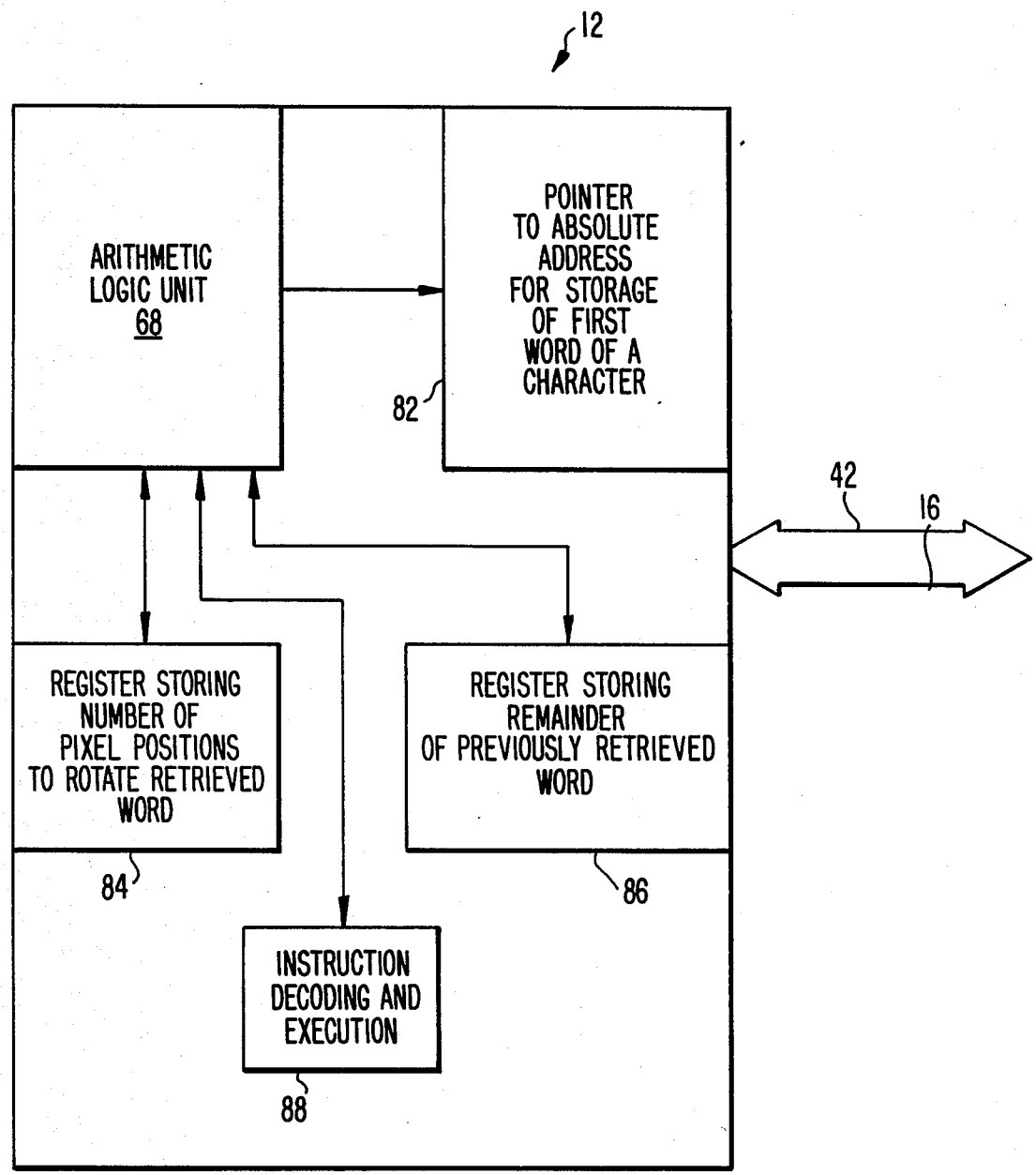
FIG. 5 is a block diagram of the processing unit which illustrates the various significant elements of the processing unit for processing words of pixels of characters retrieved from the page memory and font storage unit.

FIG. 5 illustrates a more detailed functional block diagram of the processing unit 12 of FIG. 2. The processing unit 12 includes the arithmetic logic unit 68 for performing various mathematical and logical functions necessary for operation of the system. The arithmetic logic unit 68 performs a rotation and merging function in one clock cycle which permits extremely fast positioning of the pixels of a retrieved word received from the page memory and font storage 24 with respect to word boundaries in the page memory of the raster storage unit 26 as described below and with reference to FIG. 11. The position of the leftmost edge of the very first character in a line of a page typically is determined by a specified margin or a default margin if no margin is specified such as one-half inch. The arithmetic logic unit 68 calculates the leftmost position of each successive character by adding the width of the character in pixels being retrieved, which is stored in a header with each character, to the leftmost position of the previous character or alternatively storing a specified leftmost position as a consequence of executing a command to place the next character at a specified position. The processing unit 12 further has word pointer 82 which points to the absolute address for storage of the first word of a character currently being retrieved from the font memory of the page memory and font storage unit 24 in the page memory of the raster storage unit 26. The value of the word pointer is determined by dividing the absolute pixel address of the leftmost pixel of the first word of the character being retrieved by the number of pixels per word (e.g., sixteen), and storing the integer result. Any remainder of the aforementioned calculation is stored in register 84 and used for positioning each of the words of a next character to be retrieved with respect to word boundaries in the page memory of the raster storage unit 26 as described below. The value of the pointer 82 is transmitted to the raster storage unit 26 prior to the beginning of the storage of the words of each retrieved character in the page memory. The value of the registers 82 and 84 are updated once for each character being retrieved from the page memory and font storage unit 26. The value stored in register 84 determines the number of pixel positions that the new word being retrieved is to be rotated prior to merger with the remainder of the preceding word. The remainder from the previous rotation assumes the most significant pixel positions. The rotation properly positions a word of pixels within the arithmetic logic unit 68, consisting of the most significant pixel positions, for storage in the page memory of the raster storage unit 26 at an address generated as described below in conjunction with FIGS. 6 and 11. Register 86 is provided for storing the remainder of the immediately previously retrieved word. The register 86 stores up to sixteen bits. The contents of the register 86 are provided to the arithmetic logic unit 68 after the rotation of a number of pixels equal to the remainder stored in register 84 is performed to properly position the leftmost first pixel in the retrieved word with respect to the boundary of the word in the page memory where the word is to be stored. The processing unit 12 also has an instruction decoding an execution section 88 which permits the execution of the individual instructions provided by the microcode/pipeline 64.

Figure 6:
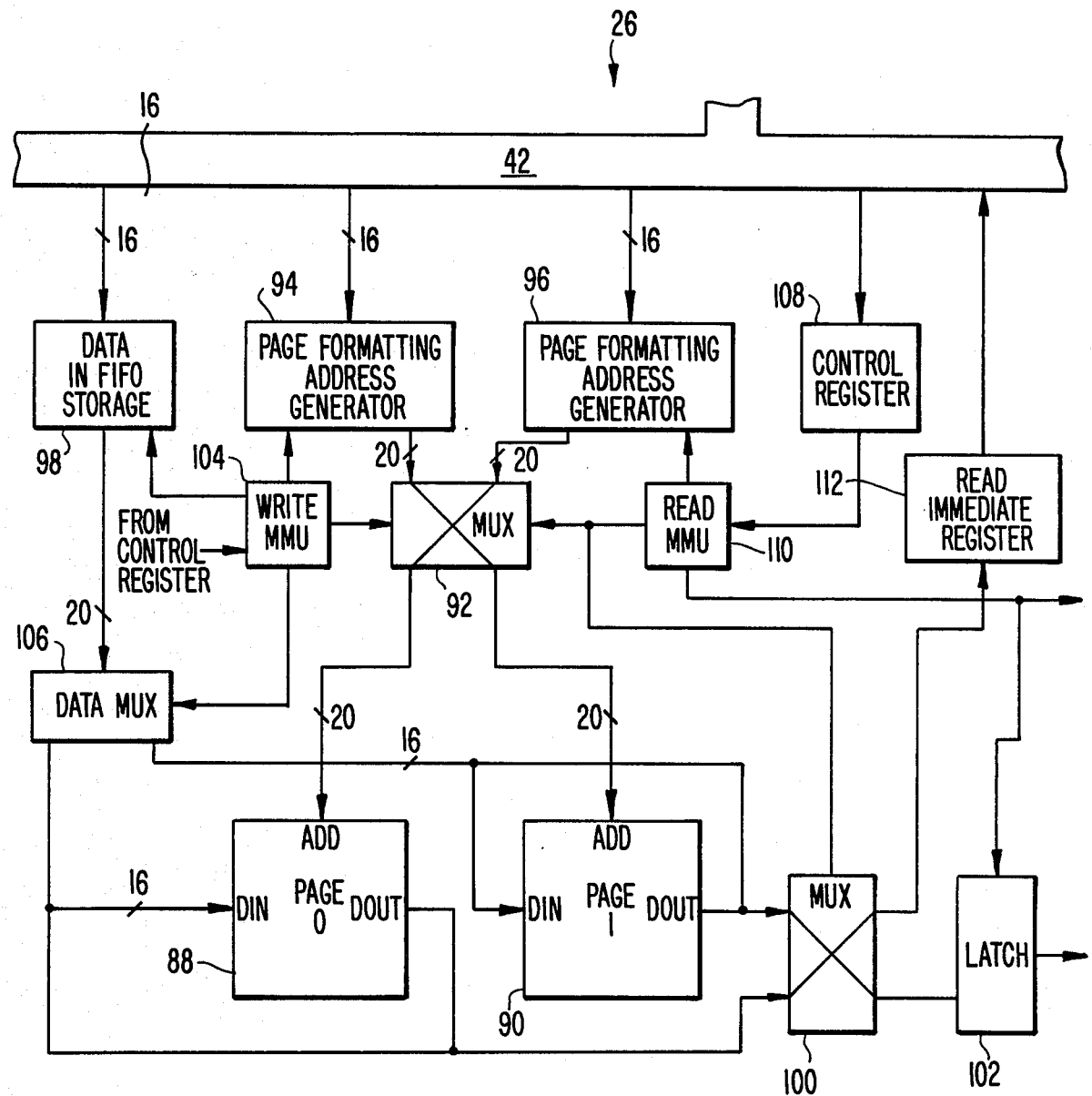
FIG. 6 is a block diagram of a preferred implementation of the raster storage unit of FIG. 2.

FIG. 6 illustrates a detailed block diagram of the raster storage unit 26 of FIG. 2. A pair of page memories 88 and 90 each have storage for a complete page of pixels which are received from the processing unit 12 for later printing by the print engine. The page memory 88 is referred to as "page 0" and the page memory 90 is referred to as "page 1". The page memories 88 and 90 are alternately loaded with a page of information while a page of information stored in the other of the pages is being read out to drive the print engine which enhances speed. Multiplexer 92 alternatively couples the page formatting address generator 94 and the page transfer address generator 96 to the addressing inputs of the page memories 88 and 90. The page formatting address generator 94 controls the generation of word addresses for writing words received from the processing unit 12, via the data in FIFO storage 98 into the page memories 88 and 90. The page transfer address generator 96 controls the generation of word addresses for reading out words from the page memories 88 and 90. Specifically, when the page 0 memory 88 is being written with words received from a retrieved character which are stored in a data FIFO storage 98, the page formatting address generator 94 is coupled to the page 0 memory by multiplexer 92. At the same time, individual words stored in the page 1 memory 90 are being read out under the control of addresses generated by page transfer address generator 96 which is coupled to the page 1 memory by the multiplexer 92. When the functions of the page 0 memory 88 and page 1 memory 90 are switched, the multiplexer 92 reverses the application of the output signals from the page formatting address generator 94 and page transfer address generator 96 are described above respectively to the page 1 memory 90 and page 0 memory 88. The data in FIFO storage 98 functions to store each word which has been processed by the processing unit 12 by the arithmetic logic unit 68 as described above prior to storage in either the page memory 88 or page memory 90 depending upon the state of multiplexer 106 which is switched in conjunction with multiplexers 92 and 100. The data in FIFO storage 98 has a flag which signals when it contains one or more words. Multiplexer 100 permits the alternate reading of pages stored in the page 0 memory 88 and page 1 memory 90 into latch 102 for temporary storage of groups of words prior to transmission to the print engine or to a read immediate register 112 as will be discussed below. The switching of the multiplexers 92, 100, and 106 is synchronized under the control of the processing unit 12. A write memory management unit 104 is provided for controlling the operation of the write cycle into the page 0 memory 88 and page 1 memory 90. The function of the page formatting address generator 94 in generating absolute addresses is described below in conjunction with FIG. 15. The write memory management unit 104 controls the writing of characters or other pixel data into a window of the page memory which is less than the total address space of the page 0 memory 88 or page 1 memory 90. Both the page formatting address generator 94 and the page transfer address generator 96 generate a twenty bit address from a combination of two sixteen bit words inputted from the bus 42 with the last twelve bits of the second word being discarded. A control register 108 controls both the write memory management unit 104 and a read memory management unit 110. The read immediate register 112 permits the immediate outputting of words read from one of the page memories 88 and 90 onto the bus 42.

Figure 7:
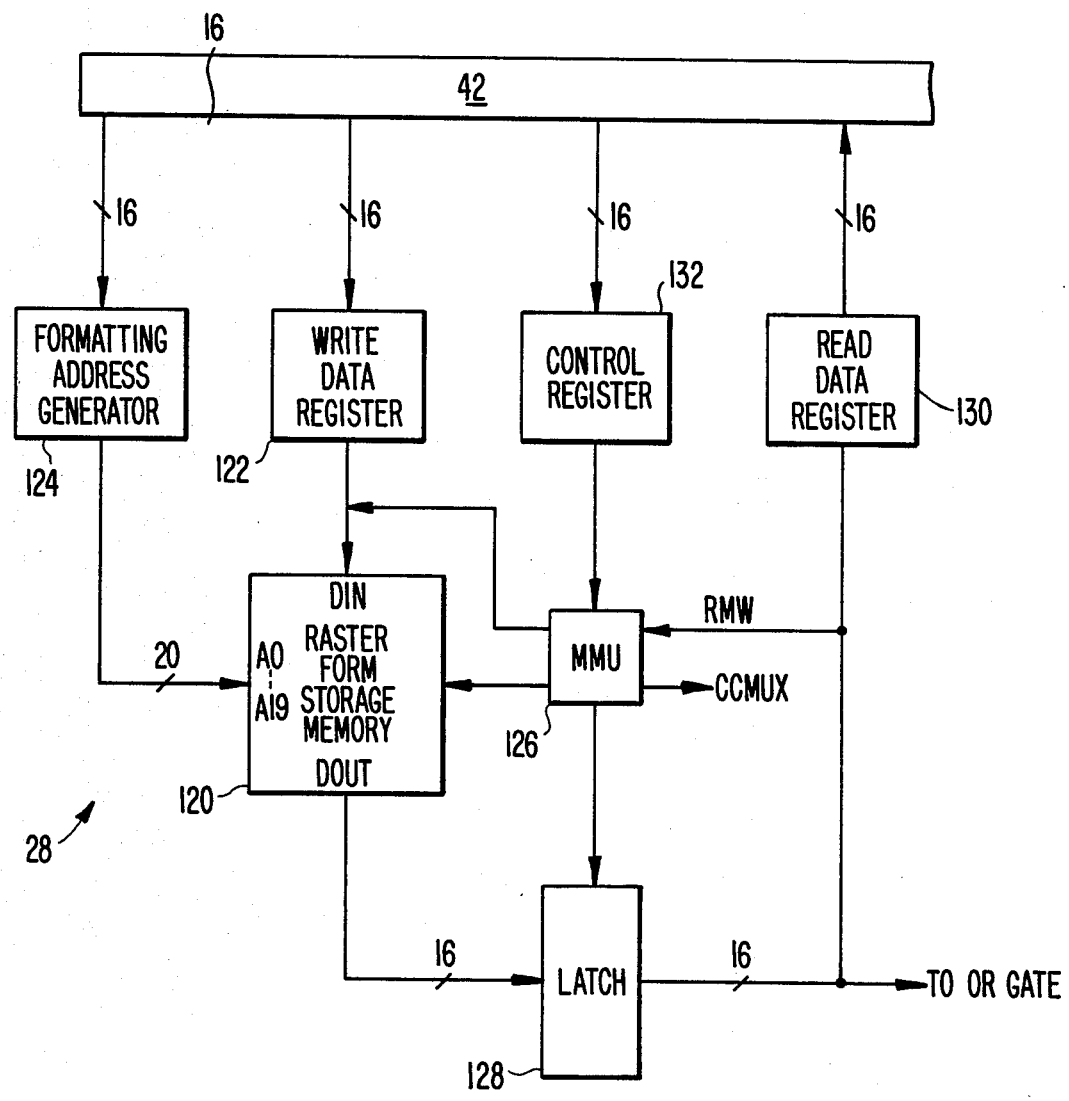
FIG. 7 is a block diagram of a preferred implementation of the raster form storage unit of FIG. 2.

FIG. 7 illustrates a detailed block diagram of the form storage unit 28 of FIG. 2. A raster form storage memory 120 contains a full pixel map for storing at least one page of information to permit the downloading of forms to the print engine to permit a form to be merged with variable data stored in the page memories 88 and 90. The one or more forms stored in the forms memory 120 are inputted from a write data register 122 on a word basis. The generation of addresses is under the control of a formatting address generator 124 which outputs a twenty bit address which is formed from a combination of two sixteen bit words inputted from the bus 42 with the last twelve bits of the second word being discarded. The addresses generated by the formatting address generator 124 control both the writing of data into the raster form storage memory and the reading out of data stored therein. A reversible counter is provided with the formatting address generator 124 which can count in ascending or descending order anywhere within or including the entire address space of the raster form storage memory 120. The counter counts from higher addresses to lower addresses during the duplex mode of printing described below. A memory management unit 126 controls the operation of the raster form storage memory 120. The memory management unit 126 outputs status via condition codes to the condition code multiplexer 60 described above with reference to FIG. 4. The memory management unit 126 also controls data which has been stored in latch 128 as part of a read modify write cycle in which the data is outputted from the latch into the memory management unit 126 and back into the data input of the raster form storage memory 120. The memory management unit 126 controls the latching of a word of data by the latch 128 which has been outputted from the raster form storage memory 120. The output of the latch 128 is applied to the print engine in a manner described in detail below in conjunction with FIG. 8. A read data register 130 permits data read out from the latch 128 to be placed on the bus 42. Control register 132 stores control information for the memory management unit 126 which is received from the processing unit 12. The memory management unit 126 has windowed addressing capability as described above which permits the designation of boundaries between which words are to be read out including up to the entire address space of the raster form storage memory 120.

Figure 8:
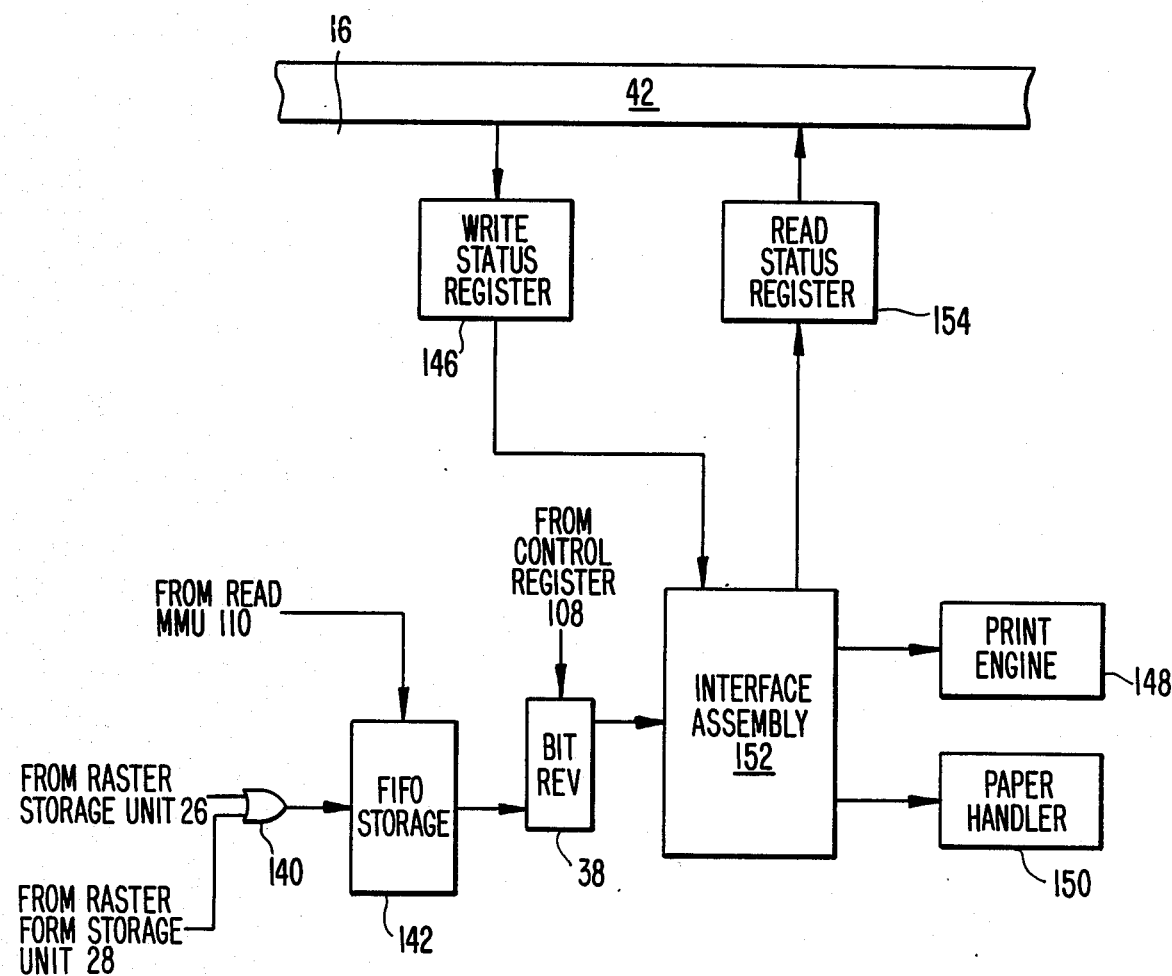
FIG. 8 is a block diagram of a preferred implementation of print engine controller of FIG. 2.

FIG. 8 illustrates a detailed block diagram of the drive for the print engine 148 by the outputs from the raster storage unit 26 and the raster form storage unit 28. Each of the individual pixels of a word retrieved from either the page 0 memory 88 or page 1 memory 90 and from the raster form storage memory 120 (FIG. 7), are processed by OR gate 140. The addressing of individual words, which are read from the page memories 88 and 90 and the raster form storage memory 120, is controlled by the respective memory management units 110 and 126 based upon demands from the print engine 148. A FIFO storage 142 stores a block of one or more words for driving the print engine. The FIFO storage 142 is controlled by the read memory management unit 110 of FIG. 6. The output of the FIFO storage 142 is applied to the bit reverser 38, which is of the same construction as the bit reverser 32 described above in conjunction with FIG. 3, and is described in detail below in conjunction with FIGS. 13 and 14. The function of the bit reverser 38 is to permit the selective reversing of the order of the significance of the bits in words outputted by the FIFO storage 142. When the words within either the page memory 88 or 90 and/or the raster form storage memory 120 are read out from the top lines of memory toward the bottom lines of memory, the significance of the pixels positions outputted by the bit reverser is the same as the significance of the pixels as stored in the memory (180 of FIG. 13) and when the words within either the page memories and/or the raster form storage memory are read out from the bottom lines of memory toward the top lines of memory, the significance of the pixels is reversed from the order stored in memory (182 of FIG. 13). A write status register 146 stores control information for the print engine 148 and the paper handler 150 which is received from the processing unit 12 via the bus 42. Interface assembly 152 provides suitable interfacing between the print engine 148, paper handler 150, the processing unit 12, the outputs of the page memories 88 and 90 and the raster form storage memory 120. The read status register 154 stores status information regarding the print engine for transmission to the processing unit 12. It should be understood that the print engine may be any known print engine which is driven by digitally stored images including ion deposition, laser writing.

FIG. 9 illustrates a memory map of the page memory and font storage unit 24 which has a page memory section 160 and a font storage section 162. As has been explained above, the page memory 160 and font storage 162 are addressed by a twenty bit address field 164 which is generated by address generator 46 as described above in conjunction with FIG. 3. Words of data are inputted via input 166 and outputted via output 168. The page memory 160 contains space for storing from 1–8 pages of textual material with individual characters preferably encoded by ASCII or an equivalent code in positions on a page to be printed. The encoded characters are written into the page memory 160 under the control of the processing unit 12. Addressing of the storage locations for individual encoded characters within the page memory 160 is via the address line 164. The font storage 162 contains space for storing multiple fonts each of which may have up to two-hundred and fifty-six possible characters. As has been described above, each character is composed of one or more words per line in which a plurality of lines are provided for each character. Typically, each character is stored in one to three words per line with each word being sixteen bits. Each character is typically forty lines high but any number of lines may be used. The characters may be any width so that the last word per character per line is usually not completely filled. Each character is fetched under the control of addresses generated by the address generator 46 with a single word at a time being transmitted to the read FIFO storage 54. The generation of the addresses for fetching the individual words of a character by the address generator 46 is asynchronous to the operation of the processing unit 12 which frees the processing unit to perform non-addressing functions such as character positioning as described in conjunction with FIG. 11.

FIG. 10 is an expanded section of the font storage memory 162 which illustrates the fetching of the words from the font storage memory which define a typical character. It is assumed that each character is allotted two words of width (which are not necessarily completely filled) with a total of forty lines per character. It should be clearly understood that other character sizes are possible and that the invention is applicable to any character size. FIG. 10 illustrates the addressing of a single character within one of the fonts beginning at word 0. As is illustrated in FIG. 10, word 0 contains the first sixteen bits of a character followed by word one, two, through word seventy nine as illustrated. Each successive word is addressed by the address generator 46 augmenting the address to be fetched by one. It should be understood that all of the remaining possible characters would be similar to the memory map as illustrated.

FIGS. 11A–F illustrate the sequence of data flow of individual words from the font memory 162 to the storage in the page memories 88 or 90. Below each subfigure A–F is a legend "SYSTEM POSITION" which identifies the position in the system of the contents illustrated in the subfigure. The number within each block is the significance of the pixel position as determined from the significance of the pixels in the storage of words in the font memory 162 with the most significant pixel having the position "15" and the least significant pixel having the position "0". The number above a block indicates the significance of the block in either data storage or data paths with the highest number identifying the most significant pixel positions. As has been described above with reference to FIG. 10, a sixteen pixel word is fetched from the page memory and font storage 24, as illustrated at FIG. 11A, at an address specified by the address generator 46 and stored in the FIFO storage 54 as illustrated in FIG. 11B. The presence of one or more words in the FIFO storage 54 causes the flag to be set to signal the processing unit 12 that a word is in a position to be fetched. Upon the fetching of a single word from the FIFO storage 54, the processing unit 12 merges any remainder of the word from a previous processing cycle stored in register 86 with the current word after the current word has been rotated by the arithmetic logic unit 68 a number of positions equal to the number stored in register 84 to produce a field of pixels up to thirty-one pixels long as illustrated in FIG. 11C. The number of pixels which remain from the previous word is determined by the contents of the register 84 in the processing unit 12 as discussed above in conjunction with FIG. 5. It should be noted that the preferred processing unit 12 performs the merger of the remainder of the previous word after the rotation of the current word by a number of pixel positions equal to the number stored in register 84 in a single clock cycle which enhances the throughput of the present invention. This rotation operation insures the proper positioning of the beginning pixel of a word with respect to the word boundaries of a page memory 88 or 90 within which the word is to be stored as illustrated at FIG. 11D. A word defined by the most significant pixels of the rotated and merged contents of the arithmetic logic unit 68 is stored in the FIFO storage 98 prior to storage in the page memory 88 or 90 at the address specified by page formatting addressing generator 94 (FIG. 6) as illustrated in FIG. 11E. Finally, FIG. 11F illustrates the storage of the current word, the immediately preceding word and a next word to be stored, in one of the page memories. The address for storage of each of the words is determined by address generator 94 as described below.

Figure 12:
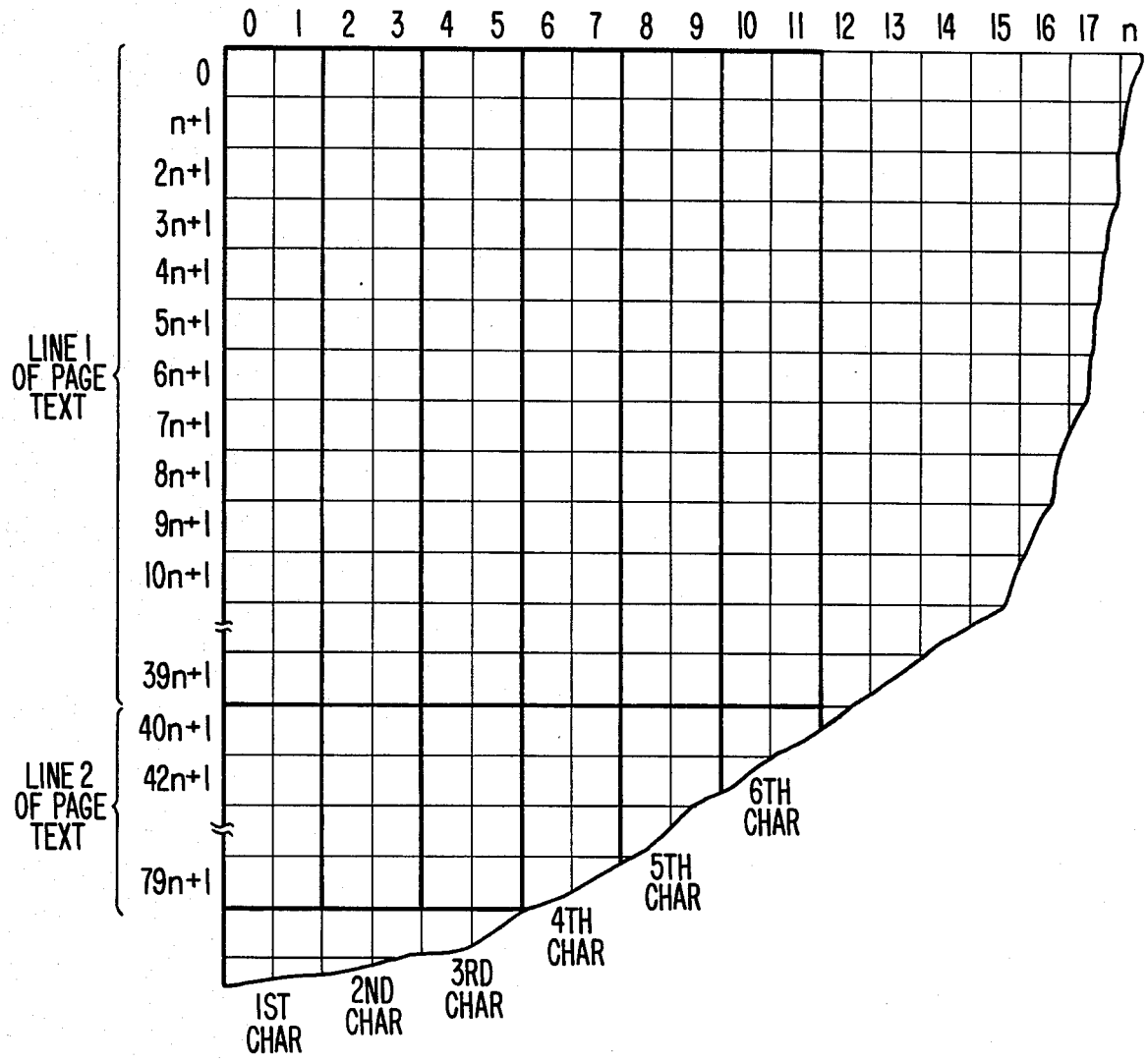
FIG. 12 is an expanded section of the page memory illustrating the storage of six characters in two successive lines of text to be printed by a print engine.

FIG. 12 illustrates an expanded memory map of six characters disposed across two lines of text in one of the page memories 88 or 90 of the raster storage unit 26. It is assumed for purposes of simplifying the example that the first line of page text starts at word address zero in the page memory 88 or 90 which is being loaded. Each of the square cells is a single word composed of sixteen pixels. Each character is contained within a heavy rectangular box storing a total of eighty words with each line being two words wide. Typically, character boundaries do not coincide with the word boundaries in the page memory which necessitates the rotation operation of the processing unit 12. Both of the simplifications (characters of multiple word width and characters falling on word boundaries) have been made for the purpose of simplification of the drawing. The addressing of the individual words and each successive line is absolute. In other words, the first line varies from address "0 to n" and the next line begins with address "n+1" through "2n" with the beginning address of each successive line being equal to its line number times "n+1+ as illustrated. Line two of page text begins at line $40n+1$ and ends at line $79n+1$. The aforementioned absolute addressing is used to address the entire page 0 and page 1 memories 88 and 90 under addresses generated by the page formatting address generator 94. The operation of the page formatting address generator 94 in conjunction with the processing unit 12 is described below in conjunction with FIG. 15

The operation of the system in retrieving individual characters from the page memory and font storage unit 24 and processing by the processing unit 12 to position the characters in the correct position for storage in the page memory of the raster storage unit 26 is as follows. It is assumed in this explanation that a pair of characters are being processed which have a different width in pixels measured across the width of the characters. The first and second characters are assumed to be the letters "A" and "D" which are spaced adjacent to each other and stored in the page memory of the page memory and font storage unit 24 in ASCII encoded format with the characters belonging to one of the fonts stored in the font storage unit. The letter "A" is retrieved from the page memory of the page memory and font storage unit 24 and decoded by the processing unit 12 to determine the identification of the character and the font to which it belongs. The processing unit 12 then issues a command to the page memory and font storage unit 24 which addresses the particular font and the particular letter by the generation of a twenty bit address applied to the address line 164 of FIG. 9. The memory management unit 50 of the page memory and font memory 44 (FIG. 3) in conjunction with the address generator 46 causes the sequential outputting of the plurality of words of pixels which define the letter "A". Each of the addresses for the words of the character of the letter "A" are sequentially outputted by the address generator 46 independently of the operation of the processing unit 12 to control the outputting of the words. For purposes of this example, it is assumed that the bit reverser 32 is configured such that he words of the character are read out from the font memory of the page memory and font memory 44 from the top line to the bottom line with the addresses being generated in ascending order. The bit reverser 32 under this mode of operation outputs the bits into the read FIFO storage 54 in the same order of significance in which they were outputted from the DOUT terminal of the page memory and font memory 44 (output from 180 of FIG. 13). As soon as the first word of the character is inputted into the read FIFO storage 54, the flag therein is set which signals the processing unit 12 that a word is in condition to be retrieved for processing by the processing unit 12 to position it with respect to the word boundaries in the page memory of the raster storage unit 26. The contents of the register 84 (FIG. 5) of the processing unit 12 govern the number of positions that each retrieved word of the character is to be rotated to properly position the words for storage in the page memories 88 or 90.

The contents of the register 84 for the processing of the first word in this example are calculated from the immediately preceding word by dividing the address of the leftmost pixel of the immediately preceding word by the number of pixels per word and storing the remainder in register 84 as discussed above. The contents of the current word are rotated a number of positions equal to the number stored in the register 84 and merged with the remainder in register 86 in one clock cycle. The word of the most pixel positions in the arithmetic logic unit 68 is stored beginning in th previously unfilled pixel positions in the last word. The remainder from the current rotation is stored in register 8 in condition to be merged with the next word to be fetched. The processing of each of the words of the character "A" continues in the foregoing manner until completion.

Prior to fetching of the character "D" after the letter "A", the new contents of the register 84, are calculated by adding the width of the character "A" as specified by the header accompanying the character "A" in the font storage of the page memory and font storage unit 24 to the leftmost pixel address of the previous character and dividing that result by the number of pixels per word. Because of the fact that characters are rarely an integer number of words wide, the width of each character is variable in pixel width which causes the contents of the register 84 to be varied. Thus, each of the words of the character "B" are processed as described previously with the exception that the number of pixel positions that each word is to be rotated are varied in accordance with the contents of the register 84 calculated for the character "A".

It should be understood that the position of any of the characters can be specified by a command specifying absolute position on the page. The position specification is converted by the processing unit 12 to determine the absolute address of the first word of a character to be stored and stored in pointer 82 (FIG. 5) and into the number of positions that each word is to be rotated and stored in register 84 by performing the above-described calculations.

FIG. 13 illustrates the preferred embodiment of the bit reversers 32 and 38 described above in conjunction with FIGS. 2, 3, and 8. Each bit reverser performs the function of selectively permitting the output, on the same output lines, of a word with the significance of the pixels in a first order or the same word with the significance of the pixels in a second order in which the significance of the pixel positions are reversed. A pair of tristate buffers 180 and 182 of identical construction each process a number of lines equal to the number of pixels in a word applied to the input 184. The significance of the lines of the input 184 and the output 186 is with the most significant lines being identified by the highest number and the least significant lines being identified by the lowest number. Each input to one of the tristate buffers 180 and 182 is connected to a single one of the outputs having the correspondingly numbered output line which identifies the significance of the output line when the buffer is enabled. When one of the tristate buffers 180 is enabled, the other is disabled so that a word applied to the input 184 appears on the output 186 from only one of the tristate buffers. When the tristate buffer 180 is enabled, the significance of the outputs from buffer 180 on output 186 are as identified by the legend "Output From 180". When the tristate buffer 182 is enabled, the significance of the outputs from buffer 182 on the output 186 are as appear on the output 186 as identified by the legend "Output From 182". Therefore, it is seen that enablement of tristate buffer 180 outputs a word of pixels in a first order from the most significant pixel to the least significant pixel on output 186 which is used when the direction of reading is in a first direction and enablement of the tristate buffer 182 outputs a word of pixels in a second fixed order, opposite the first fixed order, from the least significant pixel to the most significant pixel on the output 186 which is used when the direction of reading is in the second direction. The output 186 is either applied to the processing unit 12, when the reverser functions as bit reverser 32, or is applied to the interface assembly 152 which is coupled to the print engine 148, when the reverser functions as bit reverser 38.

Figure 14:
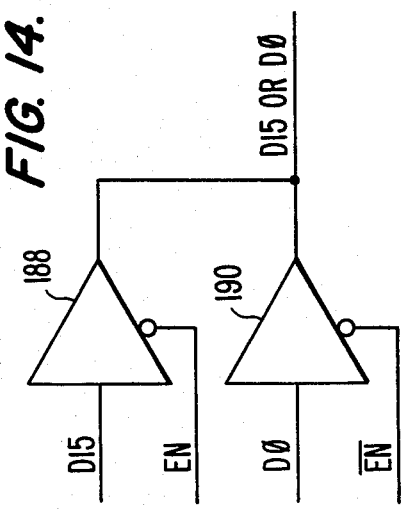
FIG. 14 is a detailed schematic of the processing of a single pair of pixels in the tristate buffers of FIG. 13

FIG. 14 illustrates a schematic of the processing of input lines 0 and 15 of FIG. 13 The most significant line D15 is applied to tristate amplifier 188 which selectively outputs the input pixel value when the signal EN is high. The least significant line D0 is applied to tristate amplifier 190 which outputs the pixel value applied to the input when the signal $\overline{EN}$ is low. The respective outputs of the tristate amplifiers 188 and 190 are coupled together as illustrated in FIG. 13.

Figure 15:
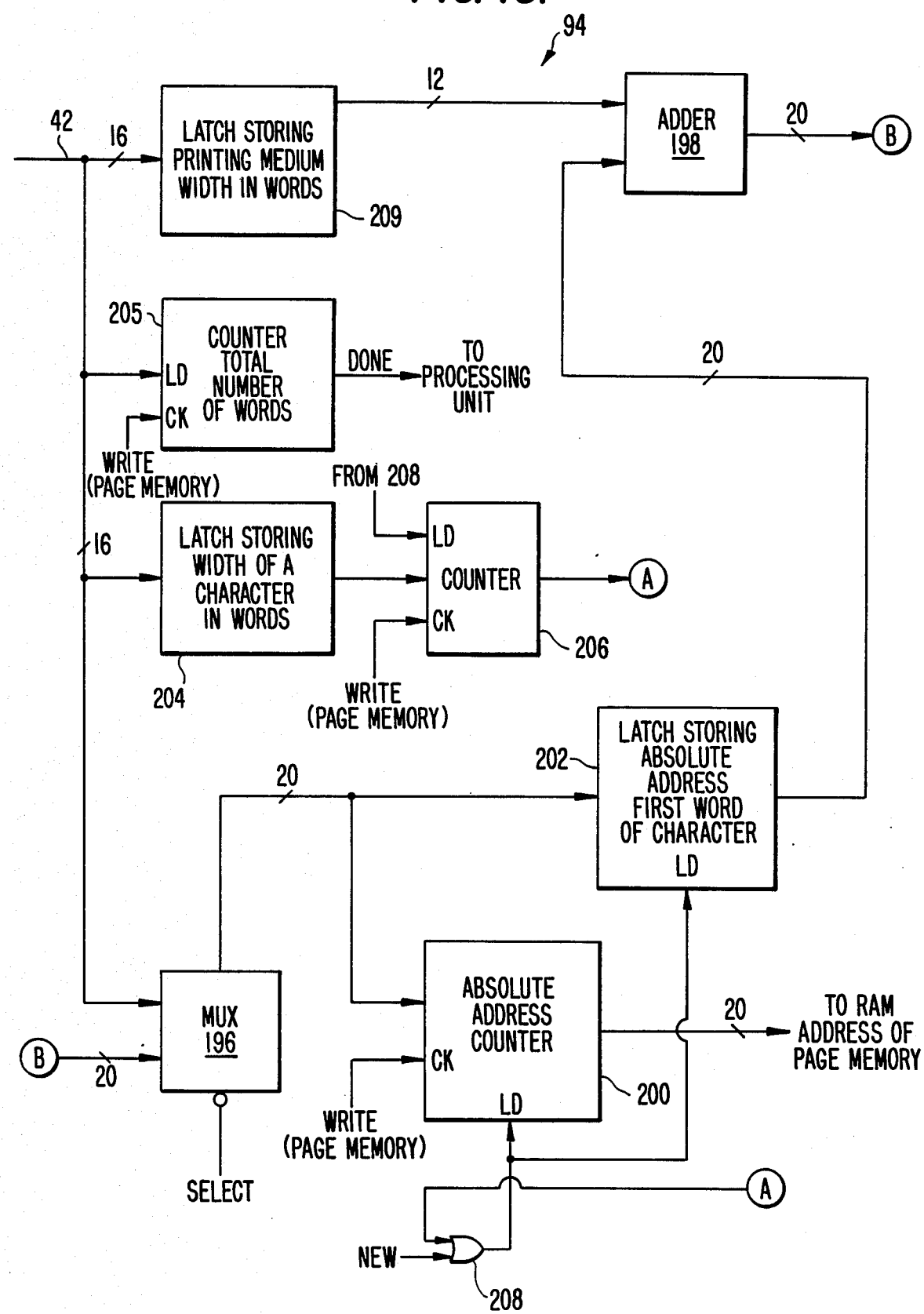
FIG. 15 is a block diagram of the page formatting address generator of the raster storage unit of FIG. 2.

FIG. 15 illustrates a block diagram of the page formatting address generator 94 of FIG. 6. The formatting address generator 94 substantially lessens the overhead of the processing unit 12 in calculating addresses for storage of words from retrieved characters by calculating all addresses after the first address of the first word of each character has been calculated by the processing unit and transmitted to the formatting address generator 94. The absolute address for storing the first word of each character retrieved from the character memory is calculated by the processing unit 12 and transferred over the bus to the page formatting address generator 96 as described above in conjunction with the pointer 82. All subsequent addresses for storing the words of a character are generated by the page formatting address generator 96 independently of the operation of the processing unit 12. The width of each character in words is determined by the processing unit 12 by reading the header which is stored with each character. The width of characters will typically be from one to three words wide although other widths are possible with the last word per line usually not being filled. The processing unit 12 also computes the number of words which define each character in the font storage unit which is stored in counter 205. Multiplexer 196 selectively outputs an absolute address received from the bus 42 which is the storage address for the first word of the first character, described above, that is transmitted by the processing unit 12 from the register 82 prior to transmission of the first word of a character or from the output of adder 198 which functions to calculate the word address of the first word in each of the remaining lines of a character in a manner described below. The input from the bus 42 from the processing unit 12 is outputted from the multiplexer 196 to the absolute address counter 200 and to the latch 202 for storing the absolute address of the first word of a character. At all other times, the output from the adder 198 is applied to the counter 200 and latch 202 thru the multiplexer 196. At the beginning of processing a character, the total number of words per character is also transmitted from the processing unit and stored in a decrementing counter 205 which is decremented by one each time a write cycle occurs for one of the page memories 88 or 90 until the count reaches zero causing the generation of a DONE signal to inform the processing unit 12 that the entire character has been stored. At the beginning of processing each line of a character, counter 206 is loaded with the width of the character being processed which is stored in latch 204. The counter 206 is decremented by one each time one of the page memories 88 or 90 is written into until zero count is reached. When the counter 206 reaches zero, its output is applied to OR gate 208 which also receives an input from the processing unit 12 when the first word of a new character is being transmitted. The OR gate 208 enables the loading function of the absolute address counter 200 and the latch 202 for storing the address received from the bus 42 or from the adder 198. Both the absolute address counter 200 and the latch 202 are loaded with the address of the first word of a character in a line upon the application of the LD signal from OR gate 208. Additionally, the absolute address counter 200 is incremented by one when the WRITE signal is produced by the writing into the page memory 88 or 90. Each signal causes a new address to be outputted to address the location in the page memory where the next word is to be written. Latch 209 is loaded with the width of th printing medium in words. The width of the printing medium in words is added by adder 198 to the absolute address of the first word of the first character of the current line to calculate the absolute address of the first word of the character in the next line which is stored in counter 200 and latch 202 as described.

The operation of the page formatting address generator 96 in calculating the storage addresses of each of the words of the page memories 88 and 90 is as follows. The processing unit 12 transmits the absolute address of the first word of each character from the register 82 through the multiplexer 196 for storage in the absolute address counter 200 and the latch 202. The latch 204 is loaded from the processing unit 12 to store the width of a character in words. The counter 205 is also loaded at the beginning of a processing cycle of a character with the total number of words of a character to be transmitted for storage. The output from OR gate 208 causes the counter 206 to be loaded with the width of the character in words. Counters 205 and 206 are decremented by one and absolute address counter 200 is augmented by one upon each write cycle into the page memories. A new absolute address is generated by the absolute address counter 200 after each write cycle into the page memories 88 or 90. Each successive WRITE cycle causes the counter 206 to be decremented by one until the counter 206 counts to zero. When the counter 206 reaches zero, the adder 198 adds the stored width of the printing medium in words in latch 209 to the absolute address of the first word of the character stored in latch 202 to produce and latch the calculated address for the first word of the next line of the character. At the end of each line, the contents of the counter 206 are updated with the number of words of the width of the character stored in latch 204. This process continues successively for each line until each of the words of a character across all of the lines have been stored when counter 205 counts to zero which signals the processing unit 12 that storage is completed.

Figure 16:
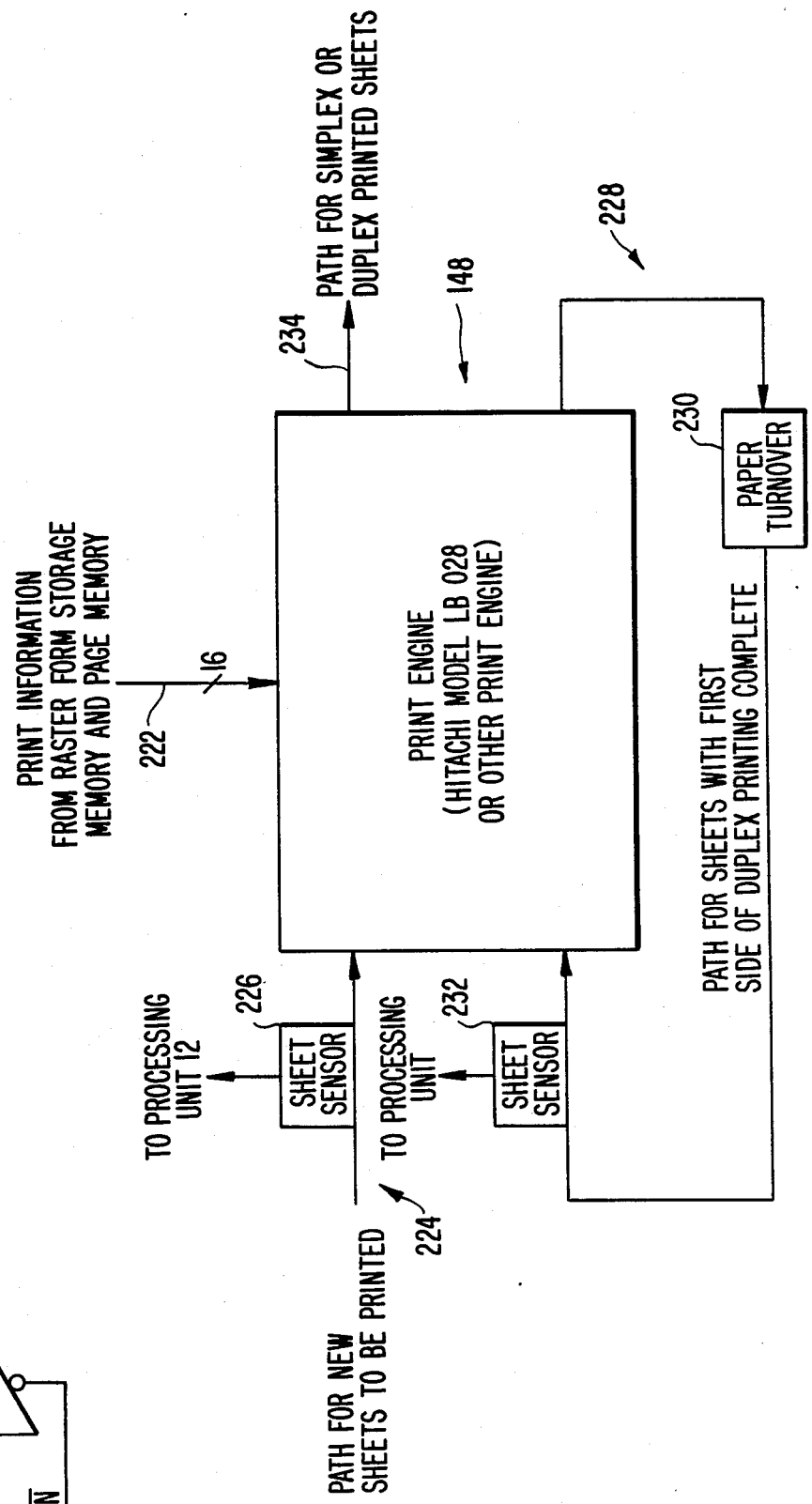
FIG. 16 illustrates a print engine in accordance with the present invention for performing duplex printing.

FIG. 16 illustrates a block diagram of a suitable print engine which may be used with the present invention. The print engine 148 may use diverse printing technologies, such as, ion deposition, laser writing or other technologies based upon nonimpact printing which are driven by a digitally stored image. A preferred embodiment of the present invention utilizes the Hitachi Model LB 028. The print engine 148 has an input path 224 for receiving new sheets to be printed. A sensor 226 outputs a flag to the processing unit 12 to signal that a sheet is in position to be printed in either simplex or duplex printing. The print engine 148 also has a path 228 used for duplex printing for feeding sheets which have their first side printed to a position to have their back side printed. The path 228 includes a paper turnover which flips the paper to the unprinted side and the top edge to the bottom edge Paper sensor 232 senses when the backside of a sheet, which has not been printed on the back side, is in position to be printed during the duplex mode of printing. A path for completed simplex or duplex printed sheets 234 outputs the sheets which have completed the printing cycle during either simplex or duplex printing. The print engine operates such that the front side of a plurality of sheets is printed until the paper path 228 is full of sheets. Thereafter, the sheets contained in the paper path 228 are fed back into the print engine to print the reverse sides. Then, the front sides of the next four new sheets are fed into the print engine 220 in the path for new sheets to be printed 224 to have their front side printed to fill up the path 228. Then the backsides are printed, etc. This order may be visualized as the following sheet order, "1, 3, 5, 7, 2, 4, 6, 8, 9, 11, 15, 17, 10, 12, 14, 16," etc. wherein the odd numbers are the front sides of sequential sheets and the back sides are the even numbers of sequential sheets as pages are sequentially numbered in a book. The processing unit 12 monitors the feeding of new sheets to determine when the requisite number of sheets has been fed through the print engine to have the second side of the sheets printed. Upon the occurrence of a sheet being at the position of sensor 232 and the processing unit 12 sensing that the requisite number of new sheets has been fed into the print engine to have their first side printed, the print engine 148 is activated to print the backside of the sheets with pages of information which have been downloaded from the page memory of the page memory and font storage unit 24 into one of the page memories 88 or 90 of the raster storage u it 26.

FIGS. 17A-B-53A-B illustrate a detailed electrical schematic of a preferred embodiment of the present invention. In each of the figures of drawings of the detailed electrical schematic, known identifications of integrated circuits are used to identify the particular integrated circuit which is utilized. The interconnections between the various integrated circuits are identified by suitable mnemonics. Furthermore, the aforementioned Microfiche Appendix discloses routines utilized with the preferred embodiment illustrated in FIGS. 17A-B-53A-B.

While the invention has been disclosed in terms of its preferred embodiment, it should be understood that numerous modifications may be made thereto without departing from the spirit and scope of the invention as defined in the appended claims.

We claim:

1. A printing system comprising:
   (a) a raster storing means including a page memory for storing at least one page of information to be printed, each page being comprised of a plurality of lines of information including a beginning line, a plurality of intermediate lines and an ending line, each line having one or more successively addressed words each having a plurality of pixels, with a beginning word having the lowest address, with each successive word having a higher address, and with the last word having the highest address;
   (b) means, coupled to the page memory, for causing the readout of words stored in the page memory in either a first direction or a second direction, the first direction being from the first line successively thru the intermediate lines thru the last line with each line being read out in a direction from the lowest addressed word to the highest addressed word, the second direction being from the last line successively thru the intermediate lines thru the first line with each line being read out in a direction from the highest addressed word to the lowest addressed word and the significance of pixel positions of pixels from words read in the second direction being reversed from the significance of pixel positions of pixels from words read in the first direction; and (c) printing means for printing on first and second sides of a printing medium, coupled to the means causing the readout of words, for printing pages of information stored in the page memory on a printing medium having a top and bottom, with the printing of the first side of the printing medium being performed by printing the page of information read out from the page memory in one of the first and second directions while moving the printing medium from the top to the bottom thru a printing station and the printing of second side of the printing medium being performed by printing the page of information readout from the page memory in the other of the first and second directions while moving the printing medium from the bottom to the top.

2. A printing system in accordance with claim 1, wherein the page of information to be printed comprises:

characters chosen from one or more fonts stored in a font storage memory, each character of each font being stored as a matrix of pixels which are addressable as words with each word being comprised of a plurality of pixels.

3. A printing system in accordance with claim 1, wherein the page of information to be printed comprises:

one or more forms which may be selected that are stored in a raster forms storage means with each form being stored as a matrix of pixels which are addressable as words with each word being comprised of a plurality of pixels.

4. A printing system in accordance with claim 1, wherein the information to be printed comprises:

(a) characters chosen from one or more fonts stored in a font storage means, each character of each font being stored as a matrix of pixels which are addressable as words with each word being comprised of a plurality of pixels; and 7 (b) at least one form stored in a raster forms storage means which may be selected with each form being stored as a matrix of pixels which are addressable as words with each word being comprised as a plurality of pixels.

5. A printing system in accordance with claim 1, wherein the printing means comprises:

(a) a printing station for printing pages stored in the page memory on the printing medium fed to the printing station with the printing medium being comprised of individual sheets each having a top end and a bottom end and first and second sides which are fed successively thru the printing station to print the first and second sides of a sheet with first and second pages of information being stored in the page memory;

(b) means for feeding individual sheets to the printing station with the first side of a sheet being fed in a position which is printed during a first time interval and with the second side of a sheet being fed in a position which is printed during a second time interval, the means for feeding causing one end of the sheet to move first thru the printing station during the first time interval to print the first side and the other end of the sheet to move first thru the printing station during the second time interval to print the second side; and (c) means for controlling, coupled to the means for causing the readout, for causing the means for causing the readout to read out pages of information stored in the page memory in one of the first and second directions when one of the two sides of sheets are being printed and to read out pages of information stored in the page memory in the other of the first and second directions when the other of the two sides of sheets are being printed.

6. A printing system in accordance with claim 5, wherein the means for controlling comprises:

(a) means for sensing the position of individual sheets in the means for feeding which indicates when a sheet that has had its first side previously printed is in a position in the means for feeding to have its second side printed by the printing station;

(b) means for sensing when the printing station has completed the printing of the first side of a sheet; and (c) means, responsive to the two means for sensing, for causing the means for feeding to feed the sheet, which has had its first side printed that is in a position to have its second side printed, to the printing station when the two means for sensing each sense the occurrence of a sheet.

7. A printing system in accordance with claim 1, further comprising:

(a) a page memory for storing a plurality of pages of information in a format of encoded characters to be printed and a font storage memory for storing one or more fonts of selectable characters each having a plurality of characters, and each character is stored as a matrix of pixels which are addressable as words with each word having a plurality of pixels;

(b) a raster forms storage memory for storing at least one form which may be selected with each form being stored as a matrix of pixels which are addressable in words with each word being comprised of a plurality of pixels and wherein:

(c) the page memory has a first page memory for storing a full page of pixels of information to be printed and a second page memory for storing a full page of pixels of information to be printed;

(d) the first page memory and the second page memory are alternately loaded with a page of information while a page of information stored in the other of the first page memory and the second page memory is being read out by the means for causing the readout and printed by the printing means; and (e) the means for causing the readout of words is coupled to the first page memory, the second page memory and the raster forms storage memory so as to permit readout of the first page memory, the second page memory and the raster forms storage memory in either the first or second directions.

8. A printing system in accordance with claim 1, wherein the means for causing the readout of the words comprises:

(a) means for providing the addresses of words to be sequentially read out from the page memory, the means for providing addresses of words containing a counter which is programmed to count a total equal to the number of words which are contained in the page memory and counting in ascending order with an address field anywhere between a minimum address and a maximum address when reading in the first direction and counting in descending order within an addressing field anywhere between the maximum address and the minimum address when reading in the second direction, each word having a plurality of pixels each having an address with the pixels ranging in address from a most significant pixel to a least significant pixel; and (b) means, coupled to the page memory, for selectively reversing the order of outputting of pixels in a single word on an output having a number of lines equal to the number of pixels in a word so as to either output the pixels in a first fixed order from the most significant pixel to the least significant pixel when the direction of reading is in the first direction or in a second fixed order, opposite the first fixed order, from the least significant pixel to the most significant pixel, when the direction of reading is in the second direction, and the output lines being coupled to the printing means.

9. A printing system in accordance with claim 1 further comprising:

(a) a font storage memory for storing a plurality of characters to be printed by the printing means with each character being stored as a matrix of pixels contained in plurality of lines having a beginning line, a plurality of intermediate lines and an ending line with each line having at least one addressable word with each word having a plurality of pixels; and (b) means, coupled to the font storage means, for causing the readout of words in either a first direction or a second direction, the first direction being from the first line thru the last line with each line being read out in a direction from the lowest addressed word to the highest addressed word and the second direction being from the last line thru the first line with each line being read out in a direction from the highest addressed word to the lowest addressed word and the storage of each character that has been read out in either the first or second direction from the font storage memory in the page memory.

10. A printing system in accordance with claim 9, wherein:
the font storage memory stores each character with orientations consisting of a first orientation and a second orientation rotated 90° with respect to the first orientation.

11. A printing system in accordance with claim 9 wherein:

(a) the font storage memory has a number of individual addressable word storage locations defined by an address field extending between a minimum address and a maximum address; and (b) a subfield of contiguous addresses of the words defining a single character readable in either the first or second direction.

12. A printing system in accordance with claim 11 wherein the means for causing the readout of words comprises:

(a) a means for providing the addresses of words to be sequentially read out from the font storage memory, the means for providing addresses having a counter which counts a total equal to the number of words which are contained in an individual character within an address field anywhere within font storage locations of the font storage memory and counting in ascending order from a minimum address to a maximum address when reading out in the first direction and counting in descending order from the maximum address to the minimum address when reading out in the second direction, each word having a plurality of pixels each having an address with the pixels ranging in address from a most significant pixel to a least significant pixel; and (b) means, coupled to the font storage memory, for selectively reversing the order of outputting pixels in a single word on an output having a number of lines equal to the number of pixels in a word so as to either output the pixels in a first fixed order from the most significant pixel to the least significant pixel when the direction of readout is in the first direction or in a second fixed order, opposite the first fixed order, from the least significant pixel to the most significant pixel, when the direction of readout is in the second direction the output lines being coupled to the page memory.

13. A printing system in accordance with claim 1 wherein:

(a) the page memory has a number of individual addressable word storage locations defined by an address field extending between a minimum address and a maximum address; and (b) at least two contiguous addresses within the address field between the minimum address and a maximum address may be read in either the first or the second direction.

14. A printing system comprising:

(a) a font storage means including a font storage memory for storing a plurality of characters to be printed, each stored character being comprised of a matrix of pixels contained in a plurality of lines having a first line, a plurality of intermediate lines, and a last line, each line having one or more successively addressed words, with the beginning word having a lowest address, with each successive word having a higher address, and with a last word having the highest address, each word having a plurality of pixels;

(b) means, coupled to the font storage means, for causing the readout of words stored in the font storage memory in either a first direction or a second direction, the first direction being from the first line thru the last line with each line being read out in a direction from the lowest addressed word to the highest addressed word and the second direction being from the last line thru the first line with each line being read out in a direction from the highest addressed word to the lowest addressed word, and the storage of the words of a character, which have been readout from the font storage memory, in a page memory contained within a raster storage means which stores one or more pages of information to be printed; and (c) printing means, coupled to the raster storage means, for printing on a printing medium pages of information stored in the page memory.

15. A printing system in accordance with claim 14 wherein:

(a) the font storage memory has a number of individual addressable word storage locations defined by an address field extending between a minimum address and a maximum address; and (b) a subfield of contiguous addresses of the words defining a single character are readable in either the first or second direction.

16. A printing system in accordance with claim 15 wherein the means for causing the readout of words comprises:

(a) a means for providing the addresses of words to be sequentially read from the font storage memory, the means for providing addresses having a counter which is programmed to count a total equal to the number of words which are contained in an individual character in ascending order from a minimum address to a maximum address when reading out in the first direction and in descending order from the maximum address to the minimum address when reading out in the second direction, each word having a plurality of pixels each having an address with the pixels ranging in address from a most significant pixel to a least significant pixel; and (b) means, coupled to the font storage memory, for selectively reversing the order of outputting pixels in a single word on an output having a number of lines equal to the number of pixels in a word so as to either output the pixels in a first fixed order from the most significant pixel to the least significant pixel when the direction of reading out is in the first direction or in a second fixed order, opposite the first fixed order, from the least significant pixel to the most significant pixel, when the direction of reading out is in the second direction, the output lines being coupled to the page memory.

17. A printer in accordance with claim 14, wherein the font storage memory stores each character with orientations consisting of a first orientation and second orientation rotated 90° with respect to the first orientation.

18. A printing system in accordance with claim 14, further comprising:

(a) a processing unit, coupled to the font storage means and the raster storage means, for controlling the retrieval of characters from the font storage memory and the storage of retrieved characters in the page memory; and (b) means, coupled to the page memory, for generating addresses where words of a character are to be stored in the page memory, the address of a first word of a character to be stored in the page memory being specified by the processing unit but all addresses of any other words of a character being generated by the means for generating addresses independently of the operation of the processing unit.

19. A printing system in accordance with claim 14, further comprising:

(a) a processing unit, coupled to the font storage means and the raster storage means, for controlling the retrieval of characters from the font storage memory and the storage of retrieved characters in the page memory; and (b) means, coupled to the font storage memory, for generating all of the addresses of where words of a character to be retrieved are fetched from the font storage memory in response to a request for retrieving a character from the processing unit.

20. A printing system in accordance with claim 14, further comprising:

(a) a processing unit, coupled to the font storage means and the raster storage means, for controlling the retrieval of characters from the font storage memory and the storage of retrieved characters in the page memory;

(b) means, coupled to the page memory, for generating addresses where words of a character are to be stored in the page memory, the address of a first word of a character to be stored in the page memory being specified by the processing unit but all addresses of any other words of a character being generated by the means for generating addresses independently of the operation of the processing unit; and (c) means, coupled to the font storage means memory, for generating all of the addresses of where words of a character to be retrieved are fetched from the font storage memory in response to a request for retrieving a character from the processing unit.

21. A printing system comprising:

(a) a processing unit having an input for receiving data and commands specifying operations to be performed, the processing unit sequentially issuing commands specifying that an individual character from a specified font is to be retrieved from storage where the character is stored as a matrix of pixels in a series of addressed words with each word having a plurality of pixels, processing each retrieved word of each character to position each word with respect to a word storage location where each individual character is to be stored within a memory for storing a page of information to be printed and specifying an address where a first word of each character will be stored in the memory for storing a page of information;

(b) a font storage means, coupled to the processing unit, including a font storage memory for storing at least one font of characters each comprised of a plurality of characters to be retrieved and for processing a command issued from the processing unit that a specified character from a specified font is to be retrieved to cause the words of the specified character to be sequentially fetched from storage in the font storage memory by addresses generated by the font storage means and transmitted to the processing unit;

(c) a raster storage means, coupled to the processing unit, including a page memory for storing the processed words defining each character sent from the processing unit to create pages of information to be printed, the raster storage means having means for generating the addresses of word locations within the page memory where each of the words of a character are to be stored and causing the storage of the words of each character in a page at the generated addresses, the means for generating the addresses specifying that the first word of each character is stored at the address specified by the processing unit and that all subsequent words of each character are stored within the page memory at addresses generated by the means for generating addresses independently of the operation of the processing unit; and (d) a printing means, coupled to the raster storage means, for sequentially printing pages of information stored in the page memory on a printing medium.

22. A printing system in accordance with claim 21, wherein the processing unit includes means for specifying a position in the page memory with respect to a word boundary where the first pixel of words of each character are to be stored.

23. A printing system in accordance with claim 22, wherein:
 (a) the processing unit has a pointer which identifies a word address where a first word of each character is to be stored; and
 (b) the processing unit calculates a position of each word to be stored in the page memory with respect to word boundaries in the page memory with the calculated position being used to designate a number of positions that a word retrieved from the character memory prior to transmission to the page memory for storage is to be rotated by the processing unit.

24. A printing system in accordance with claim 21 further comprising:
 (a) a first storage coupled between the font storage means and the processing unit for storing each retrieved word from each character prior to transmission to the processing unit;
 (b) a second storage, coupled between the processing unit and the raster storage means, for storing each word from each character prior to transmission to the raster storage means; and
 (c) a third storage, coupled between the raster storage means and the printing means, for storing at least one word stored in the raster storage means prior to transmission to the printing means.

25. A printing system in accordance with claim 24, wherein:
 (a) each of the first and second storages has a flag which is set for signalling when the storage contains information;
 (b) the processing unit reads the first storage only when the flag of the first storage is set;
 (c) the raster storage means reads the second storage only when the flag of the second storage is set;
 (d) the printing means reads the third storage when the printing means needs information to be printed; and
 (e) the reading of the storages is asynchronous with respect to the issuance of a command specifying that an individual character from a specified font is to be retrieved from font storage memory.

26. A printing system in accordance with claim 24, wherein:
 (a) the retrieval of words from the font storage memory for transmission to the processing unit is in sequentially addressed words which are addressed by an addressing means which operates asynchronously with respect to the processing unit;
 (b) the words stored in the page memory have the same number of pixels as the words addressed by the font storage means;
 (c) the processing of a retrieved word from a character by the processing unit fixes the position of the retrieved word with respect to a word boundary within the page memory; and
 (d) the processing of each retrieved character by the processing unit further specifies an address of where a first word of a character is to be stored in the page memory.

27. A printing system in accordance with claim 24, wherein the processing unit comprises:
 (a) means for storing a remainder from an immediately preceding word which has not been transmitted to the page memory for storage therein;
 (b) an arithmetic logic unit means for rotating a current word retrieved from the font storage memory by a number of pixel positions and merging the rotated word with the remainder stored in the means for storing a remainder with the remainder assuming the most significant pixel positions to position the pixels of the merged remainder and the current word in the arithmetic logic unit for storage as a word in the page memory of the raster storage means with a word of pixels having the most significant pixel positions being transmitted to the page memory; and
 (c) means for determining the specified number of pixel positions that the arithmetic logic unit is to rotate the current word by dividing a specified position of the boundary of the first word of an immediately previous character, to be stored in the page memory of the raster storage means, as expressed in a number of pixels, by the number of pixels in a word.

28. A printing system in accordance with claim 27, wherein:
 any pixels which are a remainder from the current word after rotation that are not within the word to be stored in the page memory are saved as the more significant pixels for merger with a next word immediately following the current word after rotation of the next word by the arithmetic logic unit means.

29. A printing system in accordance with claim 27, wherein:
 the processing unit determines the address for storage of the first word of the first character in the page memory of the beginning of a next line of printing in response to an end of line character or in response to at least one additional command.

30. A printing system in accordance with claim 21, further comprising:
 (a) a raster form storage means, coupled to the processing unit and to the printing means, including a raster form storage memory for storing at least one selectable form to be printed by the printing means with information stored in the page memory, each stored form being comprised of a plurality of words of pixels with each word having the same number of pixels as the number of pixels stored in a word in the page memory; and
 (b) the processing unit issuing commands to the raster form storage means to transmit a stored form to the printing means.

31. A printing system in accordance with claim 30, further comprising:
 means, having inputs coupled to the raster storage means and to the raster form storage means and an output coupled to the printing means, for logically processing individual pixels of words having the same significance read out from the raster storage means and the raster form storage means with an OR function and transmitting the logical result to the printing means.

32. A printing system in accordance with claim 21, further comprising:

(a) means, coupled between the raster storage means and the printing means, for causing the reading out of words stored in a page memory in either a first direction or a second direction, the first direction being in a direction from a first line of a page thru a last line of a page with each line being read in a direction from a lowest addressed word to a highest addressed word and the second direction being in a direction from the last line thru the first line with each line being read in a direction from the highest addressed word to the lowest addressed word, each page having an address field extending between a minimum address and a maximum address with subaddress fields contained between the maximum and minimum addresses being readable in either the first or second detection; and wherein (b) the printing means prints pages of information stored in the page memory in a single direction from the top to the bottom of the printing medium on a side of the printing medium to be printed as fed to a printing station.

33. A printing system in accordance with claim 32 wherein the means for causing the readout of words comprises:
  (a) means for providing the addresses of words to be sequentially read out from the page memory, tee means for providing the addresses containing a counter which is programmable to count a total equal to the number of words which are contained in the page memory and counting in ascending order within an address field anywhere between a minimum address and a maximum address when reading out in the first direction and counting in descending order within an address field anywhere between the maximum address to the minimum address when reading out in the second direction, each word having a plurality of pixels each having an address with the pixels ranging in address from a most significant pixel to a least significant pixel; and
  (b) means, coupled to the page memory, for selectively reversing the order of outputting of pixels in a single word on an output having a number of lines equal to the number of pixels in a word so as to either output the pixels in a first fixed order from the most significant pixel to the least significant pixel when the direction of reading is in the first direction or in a second fixed order, opposite the first fixed order, from the least significant pixel to the most significant pixel, when the direction of reading out is in the second direction, the output lines being coupled to the printing means.

34. A printing system in accordance with claim 32, further comprising:
  (a) a printing station for printing successive pages of stored information on the printing medium with the printing medium being comprised of individual sheets having first and second sides to be printed with successive pages being initially stored in a page memory of the font storage means;
  (b) means for feeding individual sheets to the printing station with the first side of a sheet being fed to the printing station in a position to be printed during a first time interval and with the second side of a sheet being fed to the printing station in a position to be printed during a second time interval, the means for feeding causing one end of the sheet to be moved first thru the printing station during the first time interval and another end of the page to be moved first thru the printing station during the second time interval; and
  (c) means for controlling, coupled to the means for causing the readout of pixels, for causing the readout of pages of information stored in the page memory in one of the first and second directions to the printing means when one of the two sides of sheets are being printed and the readout of pages of information stored in the page memory in the other of the first and second directions to the printing means when the other of two sides of sheets are being printed.

35. A printing system in accordance with claim 34, wherein the means for controlling includes:
  (a) means for sensing the position of individual sheets in the means for feeding which indicates when a sheet that has had its first side previously printed is in a position in the means for feeding to have its second side printed by the printing station;
  (b) means for sensing when the printing station has completed the printing of the first side of a sheet; and
  (c) means, responsive to said two means for sensing, for causing the sheet which has had its first side printed which is in a position to have its second side printed to be fed by the means for feeding to the printing station when the two means for sensing each sense the occurrence of a sheet, and for causing the means for causing the readout of words to readout the page stored in the page memory in the direction opposite to the direction in which the page stored in the page memory was readout by the means for causing the readout during the printing f the first side during the printing of the second side.

36. A printing system in accordance with claim 35, wherein:
  (a) the font storage means has a page memory for storing a plurality of pages of information in an encoded format;
  (b) the raster storage means has a first page memory for storing a page of information to be printed by the printing means and a second page memory for storing a page of information to be printed by the printing means;
  (c) the first page memory and the second page memory are alternately loaded with a page of information while a page of information stored in the other of the first page memory and the second page memory is being readout during printing by the means for causing the readout; and
  (d) the means for causing the readout of the word is coupled to the first page memory, the second page memory and a raster form storage memory so as to permit readout of the contents of first page memory, the second page memory and the raster form storage memory in either the first direction or second direction.

37. In a printing system having a processing unit which controls the retrieval of individual stored characters from a font storage memory of a font storage means as a plurality of words each having a plurality of pixels with each character having a plurality of lines and the storage of the retrieved characters in a page memory of a raster storage means for storing a page of characters to be printed by a printing means, an addressing system for generating the addresses of locations in the page memory at which the plurality of words of each retrieved character are to be stored comprising:
- (a) address calculating means, disposed at the processing unit, for calculating the absolute address for storing the first word of each character retrieved from the character memory and transmitting the calculated absolute address to the raster storage means; and
- (b) means for controlling the storage of each retrieved word of each character in the page memory at a specified absolute address, the absolute address for storing the first word of each retrieved character being the absolute address transmitted from the processing unit and all remaining absolute addresses of each retrieved character being calculated by an absolute address calculating means which operates independently of the operation of the processing unit.

38. An addressing system in accordance with claim 37, wherein the absolute address calculating means calculates the absolute address of every successive word across a line of a retrieved character after the absolute address of the first word by augmenting an absolute address stored in an absolute address counter by one after the storage of each word across the line of the retrieved character in the page memory.

39. An address generator in accordance with claim 38, wherein:
- (a) the absolute address transmitted from the processing unit is stored in the absolute address counter; and further comprising:
- (b) means for counting the number of words which have been stored from each character across a single line and signalling when all of the words have been stored from a character across a single line; and
- (c) means for calculating the absolute address of the first word to be stored of a next line of the character and causing the storage of the calculated absolute address of the first word of the next line of a character in the absolute address counter.

40. An address generator in accordance with claim 39, wherein the means for calculating the absolute address of the first word of pixels to be stored from a next line comprises:
- (a) means for storing the width of a printing medium on which a page is to be printed measured in words;
- (b) means for storing the absolute address of the first word of a retrieved character in a current line; and
- (c) an adder, coupled to the means for storing the width of a printing medium and the means for storing the absolute address, for adding the width of the printing medium to the absolute address of the first word of current line, a calculated total produced by the adder being used to update the total stored in the absolute address counter and the means for storing the absolute address of the first word of a retrieved character in the current line after the adder has completed the addition.

41. A printing system in accordance with claim 37 wherein:
- (a) the processing unit calculates the number of words of each character which are to be sent to the page memory for storage; and
- (b) the addressing system further comprises a counter which is loaded with the calculated total of words transmitted from the processing unit, the counter being decremented by one each time a word is written in the page memory and signalling the processing unit when the counter has counted to zero.

42. A printing system comprising:
- (a) a page memory for storing at least one page of information to be printed, each stored page being comprised of a plurality of lines of information including a beginning line, a plurality of intermediate lines, and an ending line, each line having a plurality of successively addressed words each having a plurality of pixels, with a beginning word having the lowest address, with each successive word having a higher address, and with the last word having the highest address;
- (b) means, coupled to the page memory, for causing the readout of words stored in the page memory in either a first direction or a second direction, the first direction being from the first line successively thru the intermediate lines thru the last line with each line being read out in a direction from the lowest addressed word to the highest addressed word, the second direction being from the last line thru the first line with each line being read out in a direction from the highest addressed word to the lowest addressed word and the significance of positions of individual pixels from words read out in the second direction being reversed from the significance of pixel positions of individual pixels from words read out in the first direction with respect to the significance of pixel positions, each page having an address field extending between a minimum and a maximum address and any one or more addresses within the address field between the minimum and maximum address being readable in either the first or second directions; and
- (c) printing means, coupled to the means for causing the readout of words, for printing the plurality of lines of a page which have been read out in either the first or the second direction on a printing medium.

43. A printing system in accordance with claim 42, wherein the means for causing the readout of the words comprises:
- (a) means for sequentially providing the addresses of sequential words to be readout from the page memory, the means for sequentially providing the addresses containing a counter which is programmed to count a total equal to the number of words which are contained in the page memory and counting in ascending order within an address field anywhere between a minimum address and maximum address when reading out in the first direction and counting in descending order within an addressing field anywhere between the maximum address and the minimum address when reading out in the second direction, each pixel of the word having an address with the pixels varying from a most significant pixel to a least significant pixel; and
- (b) means, coupled to the page memory, for selectively reversing the order of outputting of pixels in a single word on an output having a number of lines equal to the number of pixels in a single word so as to either output the pixels in a first fixed order from the most significant pixel to the least significant pixel when the direction of readout is in the first direction or in a second fixed order, opposite the first fixed order with respect to the significance of the pixels, from the least significant pixel to the most significant pixel, when the direction of readout is in the second direction, the output lines being coupled to the printing means.

44. A printing system in accordance with claim 43, wherein the means for selectively reversing the order of the outputting of pixels comprises:
   (a) an input means, coupled to an output of the page memory and having a number of inputs equal to the number of pixels in a word, for outputting a word fetched from the page memory;
   (b) a first gating means, having a number of inputs and a number of outputs equal to the number of pixels in a word, with each output being coupled to a different one of the inputs when the gating means is enabled for selectively gating pixel values on the inputs to the outputs when an enable signal is applied;
   (c) a second gating means, having a number of inputs and a number of outputs equal to the number of pixels in a word, with each input being coupled to a different one of the inputs for selectively gating pixel values on the inputs to the outputs when an enable signal is applied; and
   (d) the outputs of the first and second gating means being coupled together to form an output means having a number of outputs equal to the number of pixels in a word with the significance of the order of connection of the outputs of the first gating means to the outputs of output means being reversed from the significance of the order of connection of the outputs of the second gating means to outputs of the output means.

45. A printing system comprising:
   (a) a font storage for storing a plurality of characters to be printed, each stored character being comprised of a plurality of lines of information having a first line, a plurality of intermediate lines, and a last line, each line having a plurality of successively addressed words each having a plurality of pixels, with the beginning word having the lowest address, with each successive word having a higher address, and with the last word having the highest address;
   (b) means, coupled to the font storage memory, for causing the readout of words stored in the font storage memory in either a first direction or a second direction, the first direction being from the first line thru the last line with each line being read out in a direction from the lowest addressed word to the highest addressed word and the second direction being from the last line thru the first line with each line being read out in a direction from the highest addressed word to the lowest addressed word and positions of individual pixels from words read out in the second direction being reversed from positions of pixels read out in the first direction with respect to the significance of the pixel positions, the font storage memory having a number of individual addressable word storage locations defined by an address field extending between a minimum address and a maximum address, and a subfield of contiguous addresses of words defining a single character being readable in either the first or second directions; and
   (c) printing means, coupled to the means for causing the readout of words, for printing on a printing medium the plurality of characters stored in the font storage memory.

46. A printing system in accordance with claim 45, further comprising:
   (a) a page memory for storing a page of information to be printed, coupled to the means for causing the readout of words, for storing individual characters which have been read out from the font storage memory for storing a plurality of characters in either the first or second direction; and
   (b) control means, coupled to the means for causing the readout of words, for selecting either the first or second direction of readout to cause a selected character to be stored in the page memory in a first orientation or a second orientation rotated 180° with respect to the first orientation.

47. A printing system in accordance with claim 46, wherein the font storage memory stores each character with orientations consisting of a first orientation and second orientation rotated 90° with respect to the first orientation.

48. A printing system in accordance with claim 47, wherein the means for causing the readout of the words comprises:
   (a) means for providing the addresses of sequential words to be read out from the font storage memory, the means for providing the addresses containing a counter which counts a total equal to the number of words which are contained in the font storage memory and capable of counting characters in ascending order from the minimum address to the maximum address when readout is occurring in the first direction and capable of counting in descending order from the maximum address to the minimum address when readout is occurring in the second direction, each pixel of the word having an address with the pixels varying from a most significant pixel to a least significant pixel; and
   (b) means, coupled to the font storage memory, for selectively reversing the order of outputting of pixels in a single word on an output having a number of lines equal to the number of pixels in a single word so as to either output the pixels in a first fixed order from the most significant pixel to the least significant pixel when the direction of readout is in the first direction or in a second fixed order, opposite the first fixed order with respect to the significance of the pixels, from the least significant pixel to the most significant pixel, when the direction of readout is in the second direction, and the output lines being coupled to the printing means.

49. A printing system in accordance with claim 48, wherein the means for selectively reversing the order of the outputting of words comprises:
   (a) an input means, coupled to an output of the character memory and having a number of inputs equal to the number of pixels in a word, for outputting a word fetched from the font storage memory;
   (b) a first gating means, having a number of inputs and a number of outputs equal to the number of pixels in a word with each output being coupled to a different one of the inputs when the gating means is enabled, for selectively gating pixel values on the inputs to the outputs when an enable signal is applied;
   (c) a second gating means having a number of inputs and a number of outputs equal to the number of pixels in a word with each input being coupled to a different one of the inputs, for selectively gating pixel values on the inputs to the outputs when an enable signal is applied; and (d) the outputs of the first and second gating means being coupled together to form an output means having a number of outputs equal to the number of pixels in a word with the significance of the order of connection of the outputs of the first gating means to the outputs of the output means being reversed from the significance of the order of connection of the outputs of the second gating means to outputs of the output means.

* * * * *